United States Patent
Sevindik et al.

(10) Patent No.: US 11,483,715 B2
(45) Date of Patent: Oct. 25, 2022

(54) APPARATUS AND METHODS FOR INTERFERENCE MANAGEMENT IN A QUASI-LICENSED WIRELESS SYSTEM

(71) Applicant: Charter Communications Operating, LLC, St. Louis, MO (US)

(72) Inventors: Volkan Sevindik, Parker, CO (US); Haider Syed, Parker, CO (US); Vijay Mechineni, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 16/921,785

(22) Filed: Jul. 6, 2020

(65) Prior Publication Data

US 2022/0007200 A1    Jan. 6, 2022

(51) Int. Cl.
*H04W 16/14* (2009.01)
*H04W 16/18* (2009.01)
(Continued)

(52) U.S. Cl.
CPC .......... *H04W 16/14* (2013.01); *H04B 17/345* (2015.01); *H04J 11/0056* (2013.01);
(Continued)

(58) Field of Classification Search
CPC ..... H04W 16/14; H04W 16/10; H04W 16/18; H04W 88/08; H04W 72/082; H04B 17/345; H04J 11/0056; H04L 27/2691
See application file for complete search history.

(56) References Cited

U.S. PATENT DOCUMENTS

| 5,991,308 A | 11/1999 | Fuhrmann et al. |
| 5,995,499 A | 11/1999 | Hottinen et al. |

(Continued)

FOREIGN PATENT DOCUMENTS

| EP | 3741168 A1 | 11/2020 |
| EP | 3797546 A1 | 3/2021 |

(Continued)

OTHER PUBLICATIONS

Souryal, Michael R., et al., "Effect of Federal Incumbent Activity or on CBRS Commercial Service", International Symposium on Dynamic Spectrum Access Networks (DySPAN), IEEE 2019, 5 pages.
(Continued)

*Primary Examiner* — Shukri Taha
(74) *Attorney, Agent, or Firm* — Patent Beach PC

(57) ABSTRACT

Apparatus and methods for providing interference management and load balancing in a wireless network. In one embodiment, the method and apparatus utilize quasi-licensed CBRS (Citizens Broadband Radio Service) wireless spectrum in conjunction with enhanced SAS (Spectrum Access System) and base station (e.g., CBSD) components to enable creation and management of virtual clusters of bases stations connected to the network, so as to enable (Continued)

inter-cluster interference mitigation, while also supporting load balancing between the base stations using coverage area overlap. In one implementation, the SAS reduces the coverage area (transmit power) of one or more base stations on a cluster edge to mitigate inter-cluster interference, and increases or adjusts the coverage of one or more base stations inside of the cluster to enable load balancing.

22 Claims, 26 Drawing Sheets

(51) Int. Cl.
  *H04L 27/26* (2006.01)
  *H04W 16/10* (2009.01)
  *H04B 17/345* (2015.01)
  *H04W 88/08* (2009.01)
  *H04J 11/00* (2006.01)

(52) U.S. Cl.
  CPC ......... *H04L 27/2691* (2013.01); *H04W 16/10* (2013.01); *H04W 16/18* (2013.01); *H04W 88/08* (2013.01)

(56) References Cited

U.S. PATENT DOCUMENTS

| | | | |
|---|---|---|---|
| 6,356,560 B1 | 3/2002 | Venters et al. |
| 6,771,953 B1 | 8/2004 | Chow et al. |
| 6,782,262 B1 | 8/2004 | Lundborg |
| 9,258,809 B2 | 2/2016 | Liao et al. |
| 9,386,496 B2 | 7/2016 | Gupta et al. |
| 9,526,056 B2 | 12/2016 | Tomici et al. |
| 9,769,692 B2 | 9/2017 | Freda et al. |
| 9,807,778 B2 | 10/2017 | Ma et al. |
| 9,813,148 B2 | 11/2017 | Syed et al. |
| 10,098,568 B2 | 10/2018 | Gazdzinski |
| 10,135,730 B2 | 11/2018 | Chou |
| 10,340,976 B2 | 7/2019 | Kakinada et al. |
| 10,368,351 B1 | 7/2019 | Syed et al. |
| 10,405,192 B2 | 9/2019 | Kakinada et al. |
| 10,484,876 B2 | 11/2019 | Shah et al. |
| 10,492,204 B2 | 11/2019 | Kakinada et al. |
| 10,499,409 B2 | 12/2019 | Shattil |
| 10,506,456 B2 | 12/2019 | Lou et al. |
| 10,531,309 B1 | 1/2020 | Li et al. |
| 10,536,859 B2 | 1/2020 | Gunasekara et al. |
| 10,680,883 B2 | 6/2020 | Hall et al. |
| 10,764,841 B2 | 9/2020 | Syed et al. |
| 10,805,562 B2 | 10/2020 | Nakamura et al. |
| 10,945,161 B2 | 3/2021 | Syed et al. |
| 11,026,205 B2 | 6/2021 | Hmimy et al. |
| 11,219,026 B2 | 1/2022 | Kakinada et al. |
| 2002/0126748 A1 | 9/2002 | Rafie et al. |
| 2004/0001021 A1 | 1/2004 | Choo et al. |
| 2006/0188004 A1 | 8/2006 | Kizu et al. |
| 2008/0097913 A1 | 4/2008 | Dicks et al. |
| 2008/0220786 A1 | 9/2008 | Beacham |
| 2008/0220788 A1 | 9/2008 | Stanwood et al. |
| 2009/0028182 A1 | 1/2009 | Brooks et al. |
| 2009/0034443 A1 | 2/2009 | Walker et al. |
| 2009/0129273 A1 | 5/2009 | Zou |
| 2009/0253438 A1 | 10/2009 | Chater-Lea et al. |
| 2010/0094956 A1 | 4/2010 | Zuckerman et al. |
| 2010/0128608 A1 | 5/2010 | Zou et al. |
| 2010/0234042 A1 | 9/2010 | Chan et al. |
| 2011/0014924 A1 | 1/2011 | Hwang et al. |
| 2011/0292970 A1 | 12/2011 | Lansford et al. |
| 2013/0122903 A1 | 5/2013 | Farnsworth et al. |
| 2013/0281092 A1 | 10/2013 | Gassend |
| 2013/0288675 A1 | 10/2013 | Gassend |
| 2013/0303145 A1 | 11/2013 | Harrang et al. |
| 2013/0315124 A1 | 11/2013 | Rapaport et al. |
| 2013/0336175 A1 | 12/2013 | Um et al. |
| 2014/0194068 A1 | 7/2014 | Coppage et al. |
| 2014/0241187 A1 | 8/2014 | Barkay et al. |
| 2014/0269526 A1 | 9/2014 | Mitola, III |
| 2014/0308986 A1 | 10/2014 | Yang et al. |
| 2015/0055623 A1 | 2/2015 | Li et al. |
| 2015/0071239 A1 | 3/2015 | Zhang et al. |
| 2015/0208262 A1 | 7/2015 | Siomina |
| 2015/0280847 A1 | 10/2015 | Somasundaram et al. |
| 2015/0334664 A1* | 11/2015 | Sawai ............... H04W 52/241 370/338 |
| 2016/0007147 A1 | 1/2016 | Zhang et al. |
| 2016/0128001 A1* | 5/2016 | Tsuda ................ H04W 52/24 370/329 |
| 2016/0165066 A1 | 6/2016 | Yang et al. |
| 2016/0182134 A1 | 6/2016 | Kol et al. |
| 2016/0212031 A1 | 7/2016 | Jain et al. |
| 2016/0234746 A1 | 8/2016 | Gopal et al. |
| 2016/0330743 A1 | 11/2016 | Das et al. |
| 2016/0381600 A1 | 12/2016 | Aksu |
| 2017/0026203 A1 | 1/2017 | Thomas et al. |
| 2017/0155703 A1 | 6/2017 | Hao et al. |
| 2017/0164326 A1 | 6/2017 | Worrall |
| 2017/0208540 A1 | 7/2017 | Egner et al. |
| 2017/0295497 A1 | 10/2017 | Macmullan et al. |
| 2017/0295578 A1 | 10/2017 | Khoshnevisan et al. |
| 2017/0303138 A1 | 10/2017 | Barmettler et al. |
| 2017/0311290 A1 | 10/2017 | Adjakple et al. |
| 2017/0318472 A1 | 11/2017 | Yu et al. |
| 2018/0007587 A1 | 1/2018 | Feldman et al. |
| 2018/0063736 A1 | 3/2018 | Sadeghi et al. |
| 2018/0063758 A1 | 3/2018 | Velu |
| 2018/0115903 A1 | 4/2018 | Badic et al. |
| 2018/0124613 A1 | 5/2018 | Kang et al. |
| 2018/0132112 A1 | 5/2018 | Khoshnevisan et al. |
| 2018/0146058 A1 | 5/2018 | Somayazulu et al. |
| 2018/0146408 A1 | 5/2018 | Meylan et al. |
| 2018/0167948 A1 | 6/2018 | Egner et al. |
| 2018/0199214 A1 | 7/2018 | Shen |
| 2018/0234403 A1 | 8/2018 | Casella et al. |
| 2018/0235007 A1 | 8/2018 | Gou et al. |
| 2018/0242184 A1 | 8/2018 | Yerramalli et al. |
| 2018/0255576 A1 | 9/2018 | Bhorkar et al. |
| 2018/0279212 A1 | 9/2018 | Malik et al. |
| 2018/0316563 A1 | 11/2018 | Kumar et al. |
| 2018/0323938 A1 | 11/2018 | Takeda et al. |
| 2019/0021012 A1 | 1/2019 | Beck et al. |
| 2019/0028182 A1* | 1/2019 | Smyth ................ H04B 7/0413 |
| 2019/0037480 A1 | 1/2019 | Sun et al. |
| 2019/0044614 A1* | 2/2019 | Khoshnevisan ...... H04L 5/1469 |
| 2019/0081690 A1 | 3/2019 | Mueck et al. |
| 2019/0082447 A1 | 3/2019 | Harsha et al. |
| 2019/0098510 A1 | 3/2019 | Guo et al. |
| 2019/0098632 A1 | 3/2019 | Martin et al. |
| 2019/0104551 A1 | 4/2019 | Deenoo et al. |
| 2019/0150182 A1 | 5/2019 | Koorapaty et al. |
| 2019/0182895 A1 | 6/2019 | Di Girolamo et al. |
| 2019/0222266 A1* | 7/2019 | Cui ................ H04W 72/0473 |
| 2019/0239190 A1 | 8/2019 | Patel et al. |
| 2019/0296789 A1 | 9/2019 | Yu et al. |
| 2019/0319814 A1 | 10/2019 | Das |
| 2019/0349848 A1 | 11/2019 | Bali |
| 2019/0364565 A1 | 11/2019 | Hmimy et al. |
| 2019/0373615 A1 | 12/2019 | Cimpu et al. |
| 2019/0393926 A1 | 12/2019 | Kakinada et al. |
| 2019/0394678 A1 | 12/2019 | Syed et al. |
| 2019/0394790 A1 | 12/2019 | Damnjanovic et al. |
| 2020/0021689 A1 | 1/2020 | Sultana et al. |
| 2020/0025629 A1 | 1/2020 | Zinger et al. |
| 2020/0053545 A1 | 2/2020 | Wong et al. |
| 2020/0059795 A1 | 2/2020 | Kakinada et al. |
| 2020/0084759 A1 | 3/2020 | Liu et al. |
| 2020/0128540 A1 | 4/2020 | Syed et al. |
| 2020/0187150 A1 | 6/2020 | Eisner |
| 2020/0221392 A1* | 7/2020 | Xue .................... H04W 16/14 |
| 2020/0228993 A1 | 7/2020 | Gunasekara |
| 2020/0252933 A1 | 8/2020 | Hmimy et al. |
| 2020/0275457 A1 | 8/2020 | Hmimy |
| 2020/0344515 A1 | 10/2020 | Wong et al. |
| 2021/0014693 A1 | 1/2021 | Syed et al. |

(56) References Cited

U.S. PATENT DOCUMENTS

| | | | |
|---|---|---|---|
| 2021/0051653 A1 | 2/2021 | Park et al. | |
| 2021/0076424 A1 | 3/2021 | Mukherjee et al. | |
| 2021/0105633 A1 | 4/2021 | Vaidya et al. | |
| 2021/0126662 A1 | 4/2021 | Solichien | |
| 2021/0127423 A1 | 4/2021 | Park et al. | |
| 2021/0136838 A1 | 5/2021 | Khalid et al. | |
| 2021/0204322 A1 | 7/2021 | Lou et al. | |
| 2021/0227396 A1 | 7/2021 | Khalid et al. | |
| 2021/0235495 A1 | 7/2021 | Xu et al. | |
| 2021/0266914 A1* | 8/2021 | Yoo | H04W 16/14 |
| 2021/0274499 A1 | 9/2021 | Hmimy et al. | |
| 2021/0297979 A1 | 9/2021 | Hmimy et al. | |
| 2022/0007374 A1 | 1/2022 | Sevindik et al. | |
| 2022/0078804 A1 | 3/2022 | Hmimy | |

FOREIGN PATENT DOCUMENTS

| | | |
|---|---|---|
| GB | 2585394 A | 1/2021 |
| JP | 2021510973 A | 4/2021 |
| WO | WO-2013020599 A1 | 2/2013 |
| WO | WO-2017130494 A1 | 8/2017 |
| WO | WO-2019140461 A1 | 7/2019 |
| WO | WO-2019226838 A1 | 11/2019 |
| WO | WO-2020160403 A1 | 8/2020 |
| WO | WO-2021 050957 A1 | 3/2021 |
| WO | WO-2021 067810 A1 | 4/2021 |
| WO | WO-2021086986 A1 | 5/2021 |

OTHER PUBLICATIONS

Banerji S., et al., "On IEEE 802.11: Wireless LAN Technology", vol. 3 (4), 2013, 19 pages.

Deering, S., et al., "Internet Protocol, Version 6 (IPv6) Specification", Internet Engineering Task Force (IETF) RFC 2460, Dec. 1998, 39 pages.

"Internet Protocol, DARPA Internet Program, Protocol Specification", IETF RCF 791, Sep. 1981, 50 pages.

Kadir E.A., et al., "Performance Analysis of Wireless LAN 802.11 Standard for e-Learning", 2016 International Conference on Information and Communication Technology, 6 pages.

Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.

"Wi-Fi Peer-to-Peer (P2P) Specification", Version 1.5, 2014, Wi-Fi Alliance, 90 pages.

IEEE Std. 802.11 or related standards including 802.11 a/b/g/n/s/v/ac/ax/ay/ba or 802.11-2012/2013, 802.11-2016.

Schwengler, Thomas, "Wireless and Cellular Communications", First Edition, Dec. 2019.

Palola M., et al., "Field Trial of the 3.5 GHz Citizens Broadband Radio ServiceGoverned by a Spectrum Access System (SAS)," IEEE International Symposium on Dynamic Spectrum Access Networks, 2017, 9 pages.

* cited by examiner

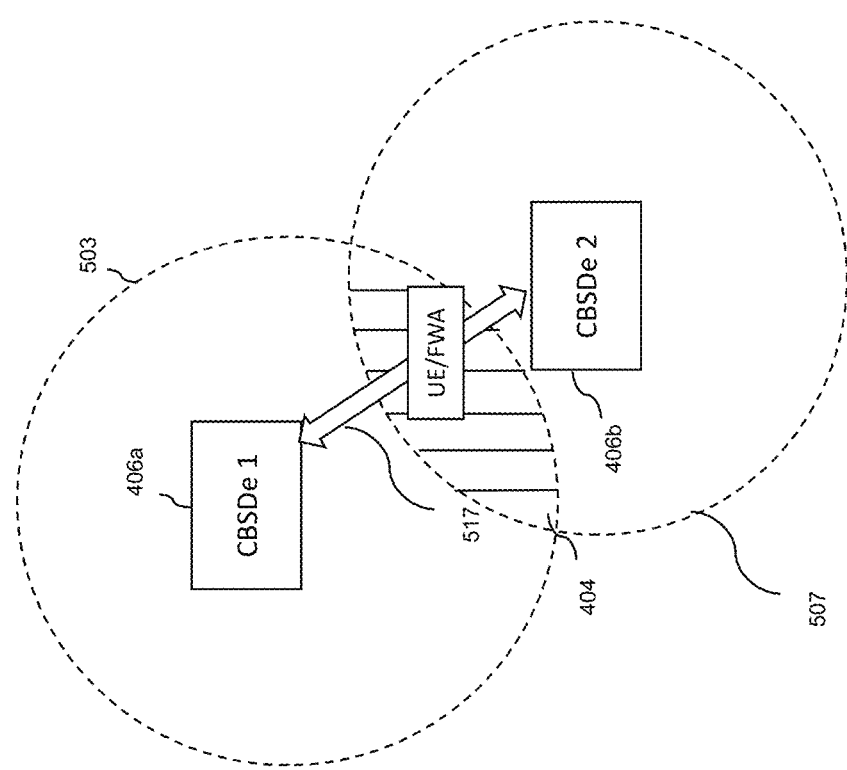

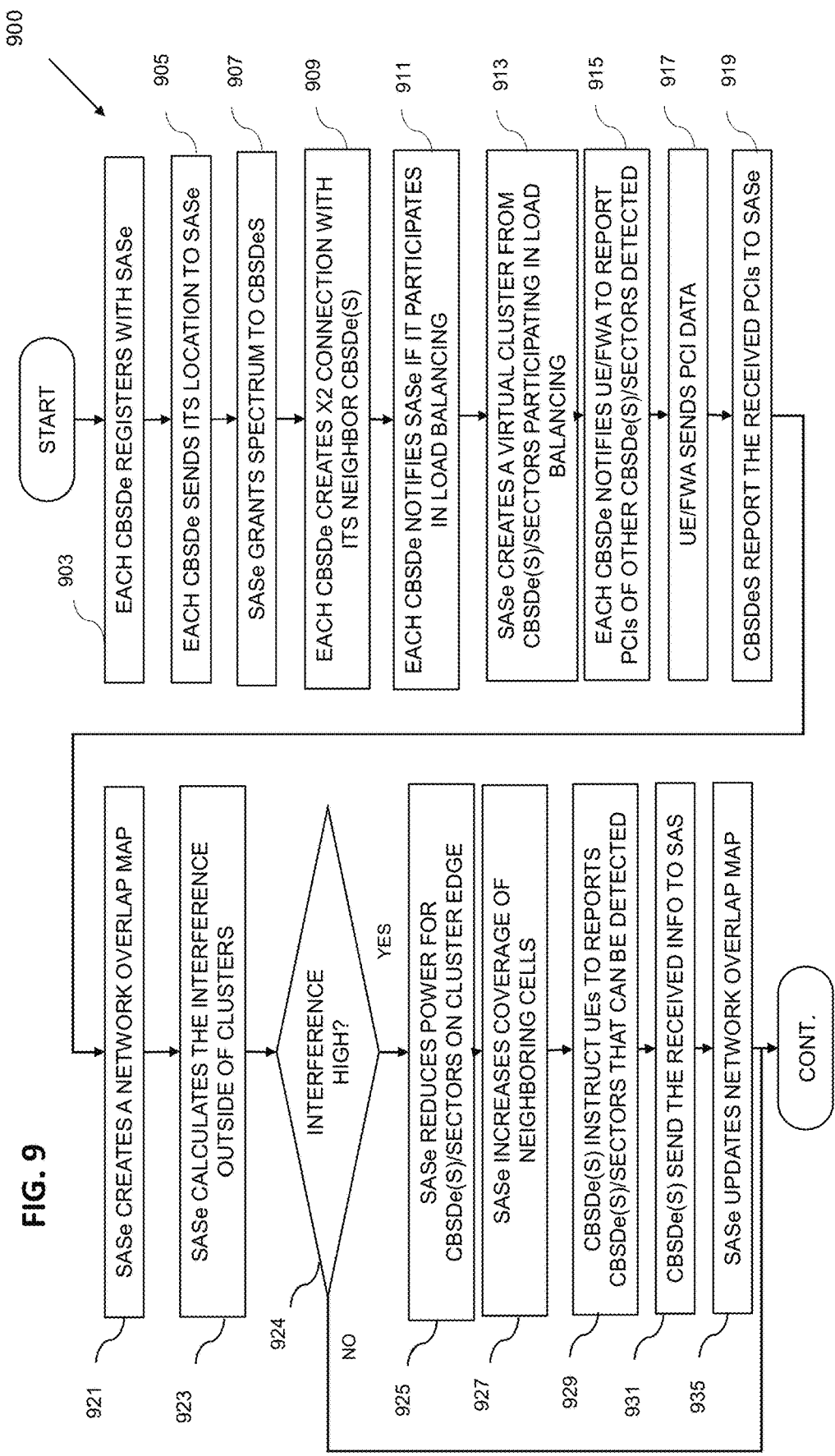

APPARATUS AND METHODS FOR INTERFERENCE MANAGEMENT IN A QUASI-LICENSED WIRELESS SYSTEM

RELATED APPLICATIONS

The subject matter of this application is generally related to co-owned and co-pending U.S. patent application Ser. No. 16/214, 070 filed Dec. 8, 2018 and entitled "METHODS AND APPARATUS FOR TRANSMISSION POWER MANAGEMENT OF CITIZEN BROADBAND SERVICE," Ser. No. 16/221951 filed Dec. 17, 2018 and entitled "PRIORITY ACCCESS LICENSE HOLDER," and U.S. Pat. No. 10, 368, 351B1 issued Jul. 30, 2019 and entitled "METHODS AND APPARATUS FOR ESTIMATING CITIZENS BROADBAND SERVICE NETWORK COVERAGE," 16/013, 103 filed Jun. 20, 2018 and entitled "CAPACITY MANAGEMENT METHODS AND APPARATUS FOR USE IN A CITIZENS BROADBAND RADIO SERVICE NETWORK," and Ser. No. 16/718, 518 filed Dec. 18, 2019 and entitled "METHODS AND APPARATUS FOR ESTIMATING WIRELESS NETWORK COVERAGE," each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks and specifically, in one or more exemplary embodiments, to apparatus and methods for interference management and load balancing utilizing radio frequency spectrum, such as for example those providing connectivity via technologies such as Citizens Broadband Radio Service (CBRS), Licensed Shared Access (LSA), TV White Space (TVWS), or Dynamic Spectrum Allocation (DSA).

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules. In the United States, regulatory responsibility for the radio spectrum is divided between the U.S. Federal Communications Commission (FCC) and the National Telecommunications and Information Administration (NTIA). The FCC, which is an independent regulatory agency, administers spectrum for non-Federal use (i.e., state, local government, commercial, private internal business, and personal use) and the NTIA, which is an operating unit of the Department of Commerce, administers spectrum for Federal use (e.g., use by the Army, the FAA, and the FBI). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
| --- | --- |
| 3G | 850 MHz Cellular, Band 5 (GSM/GPRS/EDGE). |
|  | 1900 MHz PCS, Band 2 (GSM/GPRS/EDGE). |
|  | 850 MHz Cellular, Band 5 (UMTS/HSPA+ up to 21 Mbit/s). |
|  | 1900 MHz PCS, Band 2 (UMTS/HSPA+ up to 21 Mbit/s). |
| 4G | 700 MHz Lower B/C, Band 12/17 (LTE). |
|  | 850 MHz Cellular, Band 5 (LTE). |
|  | 1700/2100 MHz AWS, Band 4 (LTE). |
|  | 1900 MHz PCS, Band 2 (LTE). |
|  | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
| --- | --- | --- | --- | --- |
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |

TABLE 2-continued

| Frequency range | Type | Center frequency | Availability | Licensed users |
|---|---|---|---|---|
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a "hotspot," a physical location at which the user may obtain access by connecting to modems, routers, APs, etc. that are within wireless range.

CBRS and Other "Shared Access" Systems

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider.

Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 102, (ii) Priority Access tier 104, and (iii) General Authorized Access tier 106. See FIG. 1. The three tiers are coordinated through one or more dynamic Spectrum Access Systems (SAS) 202 as shown in FIG. 2 and Appendix I (including e.g., Band 48 therein).

Incumbent Access (existing DOD and satellite) users 102 include authorized federal and grandfathered Fixed Satellite Service (FSS) users currently operating in the 3.5 GHz band shown in FIG. 1. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 104 (including acquisition of spectrum for up to three years through an auction process) consists of Priority Access Licenses (PALs) that will be assigned using competitive bidding within the 3550-3650

MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 106 (for any user with an authorized 3.5 GHz device) is licensed-by-rule to permit open, flexible access to the band for the widest possible group of potential users. General Authorized Access (GAA) users are permitted to use any portion of the 3550-3700 MHz band not assigned to a higher tier user and may also operate opportunistically on unused Priority Access License (PAL) channels. See FIG. 2*a*.

The FCC's three-tiered spectrum sharing architecture of FIG. 1 utilizes "fast-track" band (3550-3700 MHz) identified by PCAST and NTIA, while Tier 2 and 3 are regulated under a new Citizens Broadband Radio Service (CBRS). CBSDs (Citizens Broadband Radio Service Devices—in effect, wireless access points) 206 (FIG. 2) can only operate under authority of a centralized Spectrum Access System (SAS) 202. Rules are optimized for small-cell use, but also accommodate point-to-point and point-to-multipoint, especially in rural areas.

Under the FCC system, the standard SAS 202 includes the following elements: (1) CBSD registration; (2) interference analysis; (3) incumbent protection; (4) PAL license validation; (5) CBSD channel assignment; (6) CBSD power limits; (7) PAL protection; and (8) SAS-to-SAS coordination. As shown in FIG. 2, these functions are provided for by, inter alia, an incumbent detection (i.e., environmental sensing) function 207 configured to detect use by incumbents, and an incumbent information function 209 configured to inform the incumbent when use by another user occurs. An FCC database 211 is also provided, such as for PAL license validation, CBSD registration, and other functions.

An optional Domain Proxy (DP) 208 is also provided for in the FCC architecture. Each DP 208 includes: (1) SAS interface GW including security; (2) directive translation between CBSD 206 and domain commands; (3) bulk CBSD directive processing; and (4) interference contribution reporting to the SAS.

A domain is defined is any collection of CBSDs 206 that need to be grouped for management; e.g.: large enterprises, venues, stadiums, train stations. Domains can be even larger/broader in scope, such as for example a terrestrial operator network. Moreover, domains may or may not use private addressing. A Domain Proxy (DP) 208 can aggregate control information flows to other SAS, such as e.g., a Commercial SAS (CSAS, not shown), and generate performance reports, channel requests, heartbeats, etc.

CBSDs 206 can generally be categorized as either Category A or Category B. Category A CBSDs have an EIRP or Equivalent Isotropic Radiated Power of 30 dBm (1 Watt)/10 MHz, fixed indoor or outdoor location (with an antenna <6m in length if outdoor). Category B CBSDs have 47 dBm EIRP (50 Watts)/10 MHz, and fixed outdoor location only. Professional installation of Category B CBSDs is required, and the antenna must be less than 6m in length. All CBSD's have a vertical positioning accuracy requirieren of +/−3m. Terminals (i.e., User devices akin or corresponding tot UE) have 23 dBm EIRP (0.2 Watts)/10 MHz requirements, and mobility of the terminals is allowed.

In terms of spectral access, CBRS utilizes a time division duplex (TDD) multiple access architecture.

Disabilities with Interference Management in Shared Access Systems

Extant shared access architectures (such as e.g., CBRS), while useful from many standpoints, currently lack mechanisms for interference management between different base stations (e.g., CBSD/xNBs) that are suitable for operational scenarios where maintenance of prescribed coverage area is critical. Specifically, there may be two or more base stations (e.g., CBSD/xNB 206*b* and nd CBSD/xNB 206*c* as shown in FIG. 3) that have an overlap 311 of their coverage areas, and hence one or more base stations (e.g., CBSD/xNB 206*b*) are considered as "interferers" to the other base stations (e.g., CBSD/xNB 206*c*) by the SAS 202, the latter which implements interference mitigation as part of the current CBRS architecture and protocols.

In the architecture 300 shown in FIG. 3, the coverage area of each base station (e.g., CBSD/xNB 206*a*, 206*b*, 206*c*) indicates the service area within which the user devices (e.g., 3GPP UEs) 314 are served by each base station. Coverage area is typically determined by the service provider (e.g., MxO, which may be for instance a cable MSO or MNO), and depends on several factors such as radio frequency/spectrum being used, cell geography and buildings, user density, and technology (e.g., 3GPP 4G/4.5G/5G, or other). The core network 307 and MxO backbone 308 provides the backhaul for the CBSDs for delivery of high-speed data to/from the UEs 314, such as to/from the Internet 309. The access network 310 (which may or may not be part of the network operator infrastructure) provides connectivity between the DP and SAS and the MxO core and CBSDs, although the backbone and Internet may be used for such purposes in some configurations.

As described previously, the SAS 202 manages spectrum access to the base stations, by setting the operating channel and power for the CBSDs and e.g., FWA (fixed "UE") whether using GAA or PAL spectrum. Data regarding the spectrum allocated to each base station/CBSD, as well as its physical location, is maintained by the SAS. Additionally, the interference between CBSDs (e.g., in in the overlap 311 between the different coverage areas for the two CBSDs 206*b*, 206*c* of FIG. 3) is measured, and reported to SAS 202.

In the existing CBRS architecture, the interference management is performed and controlled by SAS. Once the SAS 202 receives data such as interference measurement reports from the base stations, it evaluates the data to identify the existence of unacceptable levels of interference between the base stations. Once such interference has been identified via the foregoing evaluation, the SAS 202 removes the interference by reducing the transmission power (EIRP) of one or more of the base stations identified as interferers.

However, such reduction of CBSD power also necessarily reduces the coverage area for that CBSD, thereby potentially resulting is reduction of signal strength to receivers such as UE's disposed at the edge of the current coverage area (e.g., UE/FWA 314*c* for CBSD 206*c* in FIG. 3). Depending on severity, this power reduction will at best reduce data performance at the UE/FWA (i.e., throughput, due to having to reduce the MCS of the link between the CBSD 206*c* and the UE/FWA 314*c*), and at worst produce a complete loss of service to that UE/FWA (and perhaps others) via a coverage "gap."

Such reduction of transmitter power can also impact load balancing between different frequency bands. As a brief aside, when a network is deployed with different bands and frequencies, operators often desire to manage and balance user traffic load across different frequency bands. When too high, the traffic in one band is loaded or moved onto another band; such movement can be performed in various operational conditions (e.g., either in "idle" mode or "connected" mode in 3GPP systems). Such capability is often critical to maintaining proper customer servicing and the desired level of user experience.

However, in order to support such load balancing across different frequency bands (e.g., within the CBRS spectrum of 3.550-3.700 GHz), at least some overlap between the coverage areas of the CBSDs operating in the different bands must exist, so that a user operating in one band can be handed over to a different (target) band without loss of continuity (i.e., the user's UE will not be able to connect to the new CBSD providing the service in the target frequency band until they are within the coverage area of that CBSD, such as to enable sounding of new channel conditions, etc.). For mobile UE (e.g., smartphones or the like), while not desirable or ideal from a user experience standpoint, the UE can feasibly move from one cell/coverage area to another in such scenarios, eventually re-establishing connectivity via the new (target) band and cell. However, for fixed UE such as CBRS FWA (e.g., antennae and associated equipment installed on e.g., a user premises rooftop or building facade), there is no opportunity for movement, and as such any opportunity for load balancing across frequency bands supplied by different cells or sectors is nonexistent if the SAS reduces power for e.g., the target CBSD such that the FWA is no longer in its coverage area.

Thus, at a high level, the SAS's operational fundamentals can in many cases conflict with a service provider's traffic/load management strategy in the field, especially in e.g., densely populated urban areas, where a high number of base stations (e.g., CBSDs 206) may be deployed in a relatively small geographic area. This type of scenario also lends itself to the possibility of "multi-way" interference; i.e., the foregoing example of FIG. 3 considers a more simplistic case of two CBSDs (206b and 206c) interfering with one another—however, if the first CBSD (206a) of FIG. 3 is also deployed proximate the other CBSDs, two-way, three-way, or N-way (N>3) interference may exist, thereby further complicating the problem. In such cases, the SAS 202 may decide to reduce power on one, two or even three of the CBSDs in order to reduce interference, and accordingly a number of UE/FWA devices 314 may fall out of coverage (or at least the ability to load-balance across different CBSDs as previously described).

Existing technologies such as (i) use of a high device antenna gain or directionality; (ii) use of Multiple-Input-Multiple-Output (MIMO) system; (iii) Orthogonal Frequency Division Multiplexing (OFDM) (iv) advanced error control coding (e.g. Low Density Parity Check Codes (LDPC) or Turbo codes) are known in the prior art to increase the throughput and coverage area. All of these techniques, while effective and implemented in typical 3GPP-based systems underlying CBRS installations such as those described above, do not inherently mitigate the effects of interference, and thereby alone do not effectively address the root problem; i.e., the innate tension between having to reduce transmit power of one or more CBSDs (or sectors thereof) by the SAS in order to mitigate interference, and having to maintain overlapping coverage areas to permit cross-CBSD load balancing or other such functions.

Hence, based on the foregoing, improved apparatus and methods for interference management and network operation are needed. Such improved apparatus and methods should effectively mitigate interference between base stations (and individual sectors thereof) such that their coverage areas can overlap, and support load-balancing across different frequency bands (and CBSDs) to enhance network throughput and coverage area.

SUMMARY

The present disclosure addresses the foregoing needs by providing, inter alfa, apparatus and methods for interference management and load-balancing in a wireless services network, such as one using quasi-licensed spectrum.

In a first aspect of the disclosure, a method of operating a wireless network having a plurality of base stations is described. In one embodiment, the method comprises: determining locations for each of a subset of the plurality of base stations; identifying a radio frequency (RF) interference condition associated with at least one of the subset of the plurality of base stations; reducing a transmission power associated with the at least one base station; and increasing a transmission power of another of the subset of the plurality of base stations to compensate for a loss of coverage area resulting from the reducing.

In one variant, the determining locations for each of a subset of the plurality of base stations includes determining a location for at least one base station of the subset; determining a location for at least one other of the plurality of base stations that is geographically proximate to the at least one of the subset; and forming a virtual grouping comprising (i) the at least one base station, and (ii) the at least one other base station.

In another variant, the identifying a radio frequency (RF) interference condition associated with at least one of the subset of the plurality of base stations includes performing computer modeling using one or more path loss or propagation models, the computer modeling based at least on the determined locations.

In a further variant, the subset of the plurality of base stations form a shape having an outer boundary; the reducing a transmission power associated with the at least one base station includes reducing transmission power of at least one base station having a coverage area which intersects the outer boundary; and the increasing a transmission power of another of the subset of the plurality of base stations to compensate for a loss of coverage area resulting from the reducing includes increasing transmission power of a base station having a coverage area which does not intersect the outer boundary.

In one implementation thereof, the plurality of base stations comprise a plurality of CBRS (Citizens Broadband Radio Service) compliant Citizens Broadband Radio Service Devices (CBSDs); and the reducing transmission power of at least one base station having a coverage area which intersects the outer boundary and the increasing transmission power of a base station having a coverage area which does not intersect the outer boundary, are performed so as to maintain an overlap of respective coverage areas of at least two of the subset of base stations so as to enable inter-base station load balancing, the load balancing comprising inter-CBSD load balancing between two frequency bands each between 3.550 GHz and 3.700 Ghz, the two bands assigned to respective ones of two CBSDs participating in the load balancing process.

In another aspect of the disclosure, a wireless access point apparatus for use within a wireless network is described. In one embodiment, the apparatus includes: radio frequency interface apparatus; digital processor apparatus in data communication with the radio frequency interface apparatus; and computer readable apparatus in data communication with the digital processor apparatus and comprising storage medium, the storage medium comprising at least one computer program comprising a plurality of instructions. In one variant, the instructions are configured to, when executed on the digital processor apparatus, cause the wireless access point apparatus to: generate and transmit a message to a network entity to notify its participation in a computerized optimization process; establish a connection with one or more neighboring wireless access point apparatus; generate and transmit at least one first message to one or more user devices utilizing the wireless access point apparatus to obtain and report data relating to other ones of wireless access point apparatus; and generate and transmit at least one second message to the network entity, the at least one second message comprising at least a portion of the reported data relating to the other ones of wireless access point apparatus.

In one variant, the computerized optimization process includes an inter-wireless access point apparatus load balancing process; and the at least portion of the reported data relating to the other ones of wireless access point apparatus enables the network entity to create one or more virtual groupings or clusters of wireless access point apparatus within the wireless network, the one or more virtual groupings or clusters enabling performance of said inter-wireless access point apparatus load balancing process.

In one implementation thereof, the wireless access point apparatus includes a CBRS (Citizens Broadband Radio Service) compliant Citizens Broadband Radio Service Device (CBSD), and the inter-wireless access point apparatus load balancing process includes inter-CBSD load balancing between two frequency bands each between 3.550 GHz and 3.700 Ghz, the two bands assigned to respective ones of two CBSDs participating in the inter-wireless access point apparatus load balancing process. In one configuration thereof, the network entity includes either (i) a SAS (spectrum allocation system) in data communication with the wireless network, or (ii) a SAS proxy entity within the wireless network. For example, the network entity may comprise the SAS proxy entity within the wireless network; and the SAS proxy entity, the wireless access point apparatus, and the other ones of wireless access point apparatus are each operated by a common managed network operator.

In another variant, the reported data relating to other ones of wireless access point apparatus includes at least one of PCI (physical cell identifier) or transmit power.

In a further variant, the wireless network includes a wireless network utilizing 3GPP (Third Generation Partnership Project) 4G (fourth Generation) Long Term Evolution or 5G (Fifth Generation) New Radio compliant infrastructure utilizing Citizens Broadband Radio Service (CBRS) spectrum within the frequency range of 3.550 GHz to 3.700 GHz, and the network entity includes a CBRS SAS (spectrum allocation system).

In another aspect, a method of operating a base station within a wireless network is disclosed. In one embodiment, the method includes: transmitting the data relating to a location of the base station to a computerized base station management process; establishing at least one communication channel between the base station and one or more geographically proximate base stations; obtaining data from the one or more geographically proximate base stations via the at least one communication channel; causing provision of at least a portion of the obtained data to the computerized base station management process; receiving from the computerized base station management process network data relating to one of increasing or decreasing a transmission power of the base station, the data relating to the one of increasing or decreasing derived based at least on the at least portion of the obtained data provided to the computerized base station management process; and causing adjustment of the transmission power of the base station based at least on the received data.

In one variant, the method further includes notifying the computerized base station management process network that the base station intends to participate in a load balancing process controlled by the wireless network.

In another variant, the method further includes receiving from the computerized base station management process network data indicating that the base station must participate in a load balancing process controlled by the wireless network.

In yet another variant, the base station includes a base station disposed on the edge of a virtual cluster formed by the computerized base station management apparatus; and the receiving from the computerized base station management process network data relating to one of increasing or decreasing a transmission power of the base station, includes receiving data relating to a decreasing of transmission power to reduce interference with another base station.

In another variant, the base station includes a base station disposed on a non-edge portion of a virtual cluster formed by the computerized base station management apparatus; and the receiving from the computerized base station management process network data relating to one of increasing or decreasing a transmission power of the base station, includes receiving data relating to an increasing of transmission power to compensate for a loss of coverage area within the virtual cluster based on a transmission power reduction of another base station within the virtual cluster.

In a further aspect, a method for traffic load balancing among base stations connected to a wireless network is disclosed. In one embodiment, the base stations utilize CBRS-band quasi-licensed spectrum, and the method includes: identifying the base stations; reporting the identified base stations to a network process; and using the network process to determine potential interference between two or more of the identified base stations, and make power adjustments to mitigate interference but also permit load balancing. In one variant, the method includes: identifying the base stations participating in the load balancing; creating one or more virtual clusters from the base stations participating in the load balancing; identifying the base stations at the edge of the one or more clusters creating interference on one or more neighboring clusters; and enabling a mechanism to mitigate the effect of the interference from the base stations at the cluster edge on the neighboring one or more clusters while preserving some level of coverage area overlap.

In one variant, the base stations participating in the load balancing transmit their identification, and update their location information, to a CBRS Spectrum Access System (SAS).

In another variant, each of the base stations participating in the load balancing instructs its served client devices (e.g., 3GPP UEs) to report Physical Cell Identities (PCI) of the other bases station participating in the load balancing which the UEs can detect.

In yet another variant of the method, the SAS creates a virtual 'network overlap map' from the reported PCI data received from the base stations.

In a further variant of the method, estimating the interference level created from the base stations includes estimating interference at one or more clusters edges by at least selecting an interference model fitted to the wireless channel propagation from the model stored in the SAS database; computing the interference power from the selected model affecting the neighboring the one or more clusters by the base stations disposed at the one or more cluster edges.

In further variant of the method, the enabling a mechanism to mitigate the effect of the interference from the base stations placed at the cluster edge on the neighboring one or more clusters includes: identifying the base stations placed on the one or more cluster edges creating interference on the neighboring one or more clusters; and causing a power reduction for the identified base stations; and causing an increase in power for one or more base stations within the neighboring one or more clusters to increase their coverage in order to compensate for the reduced coverage.

In another variant the method further includes dynamically performing the interference mitigation mechanism by, e.g., dynamically establishing or modifying one or more virtual clusters, and/or updating a 'network overlap map' created by the SAS.

In another aspect of the disclosure, a computerized method of creating a cluster including one or more base stations is disclosed. In one embodiment, the method includes: identifying the one or more base stations bearing a prescribed geometric or spatial relationship to one another; obtaining the information from the one or more base stations participating in load balancing as to at least their identification; and allocating the one or more base stations bearing the prescribed relationship at least temporarily to the cluster.

In one variant, the obtaining the information from the one or more base stations participating in the cluster related to at least their identification includes receiving the reported Physical Cell Identities (PCI) from one or more base stations.

In another aspect, a wireless base station is disclosed. In one embodiment, the wireless base station includes: a processor apparatus; a wireless modem chipset integrated circuit with the processor apparatus; a program memory in data communication with processor apparatus; an RF radio module; a network interface module interfacing to at least a core network; and a storage device in data communication with the processor apparatus. In one variant, the storage device includes at least one computer program which is configured to, when executed on the processor apparatus, implement load balancing between the base station and a different base station in the network.

In another implementation, the wireless base station includes a CBRS-compliant CBSD based on a 3GPP compliant eNB or gNB. In a further implementation, the wireless base station is a distributed unit (DU) of a 5G NR gNB.

In another aspect of the disclosure, computerized network apparatus for use in a wireless network is described. In one embodiment, the apparatus includes: a network data interface; processor apparatus in data communication with the at least one wireless interface; and storage apparatus in data communication with the processor apparatus. In one variant, the storage apparatus includes at least one computer program configured to, when executed by the processor apparatus: engage in communication with the one or more base stations; obtain data from the one or more base stations; create a 'network overlap map' from at least the obtained data; and create at least one cluster from the one or more base stations having partial overlap.

In one implementation, the computerized network apparatus includes a CBRS SAS configured to connect to an MSO network via an access network.

In a further aspect of the disclosure, computer readable apparatus including a non-transitory storage medium, the non-transitory medium including at least one computer program having a plurality of instructions is disclosed.

In a further aspect, a method of operating a base station is disclosed. In one embodiment, the method includes: registering the base station with network by its identity; transmitting the data relating to the base station location to the network; establishing communications to one or more neighboring base stations via a data link; notifying the network if the base station participates in a traffic load balancing controlled by the network; obtaining PCI values from neighboring base stations, and reporting them to the network; and receiving control data from the network relating to increasing or decreasing the base station coverage area in order to enable balancing of traffic load across the network.

In one variant, transmitting the data relating to the base station location includes the long and latitude location.

In another variant the method further includes dynamically updating the base station location information to the network such as when a new CBSD is installed or one is moved.

In another variant establishing communications to its neighboring base station includes, establishing a connection via X2 link via a wireline (e.g., DOCSIS 3.1 or 4.0) backhaul operated by an MSO who also operates the base stations.

In an additional aspect of the disclosure, computer readable apparatus is described. In one embodiment, the apparatus includes a storage medium configured to store one or more computer programs, such as a control system logic module of the above-mentioned SAS or CBSD devices. In one embodiment, the apparatus includes a program memory or HDD or SDD, and is part of a CBSD.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device includes a multi-logic block FPGA device.

In a further aspect, an integrated circuit controller apparatus for use in a base station such as a CBSD is disclosed.

In another aspect, methods and apparatus for bypassing or compensating for extant network interference management processes or policies to enable inter-cell load balancing are disclosed. In one variant, the network includes a CBRS-based network infrastructure with SAS-implemented interference mitigation policies which tend to eliminate coverage area overlap, and the method and apparatus are configured to enable maintenance of at least some overlap areas between CBSDs so as to support inter-CBSD load balancing.

In a further aspect, methods and apparatus for preventing an interference mitigation process (e.g., SAS) from interfering with MxO cluster management and load balancing is disclosed. In one variant, the methods and apparatus effectively compensate for SAS-based power reductions (and attendant loss of coverage area and overlap) via formation of virtual clusters of base stations, portions of which can be treated differently or without regard to SAS-based interference mitigation algorithms (and hence support maintenance of necessary overlap areas).

In a further aspect, methods and apparatus for determining an optimum number of base stations (e.g., CBSDs) within a virtual cluster are disclosed. In one embodiment, the methods and apparatus identify both potential benefits and detriments associated with various virtual cluster sizes and/or shapes (e.g., using computerized modeling algorithms performed at the SAS or an MxO process), including effects on or interactions with other clusters, and selecting an optimized size/shape based thereon. In one variant, multiple (two or more) adjacent clusters are modeled simultaneously, and each configured according to the optimization algorithms referenced above.

In another variant, a desired shape or directionality of interference mitigation is obtained via selective power modification of one or more edge CBSDs, such that e.g., irregular shapes can be created if desired, such as to allow contouring to man-made or natural features or for other considerations.

In a further aspect, methods and apparatus for selection and creation of virtual clusters are disclosed.

In another aspect, methods and apparatus for dynamic modification of membership and/or configuration of virtual clusters are disclosed.

In another aspect, methods and apparatus for use of client devices (e.g., UEs) for reporting data relating to base stations are disclosed. In one embodiment, the methods and apparatus are configured to cause the UE(s) to receive data requests from one or more base stations currently connected to the UE(s), and responsively collect PCI or other data relating to other base stations, and report that collected data to the connected base station.

In a further aspect, methods and apparatus for determining neighbor populations of potentially interfering base stations relative to a target base station are disclosed. In one embodiment, the methods and apparatus are configured to utilize RF signal detection data from one or more UEs associated with the target base station to identify other base stations ostensibly within RF range of the target base station.

In yet a further aspect, methods and apparatus for network planning are disclosed. In one embodiment, the methods and apparatus include disposition of base stations (e.g., CBSDs) at a plurality of geographic locations within a given geographic region, the locations based on actual or projected usage by users (e.g., "hotspots"). The placements may be irregular (unlike normal cellular cell planning which tends to be more regular), and any overlaps and interference between the CBSDs after placement is managed via use of the above-described clustering techniques and apparatus, including to allow maintenance of sufficient overlap for load balancing or other purposes. The above-referenced "directional shaping" can also be used to help shape various cluster boundaries to maintain desired levels of coverage overlap. In some variants, load balancing is applied via the overlap at prescribed locations and/or times of day/days of the week (e.g., on an as-needed basis during peak traffic times and within peak traffic areas).

In yet another aspect of the disclosure, methods and apparatus for clustering individual sectors of base stations are disclosed. In one embodiment, each individual cluster has a unique PCI value, and overlap between two sectors of different base stations (e.g., CBSDe devices) can be determined and managed. In one configuration of the methods and apparatus, each sector may be treated as an "edge" cell and individually managed in terms of power reduction. Likewise, individual sectors of interior or non-edge CBSDe devices can be managed to compensate for any lost coverage (including for directional shaping of coverage areas).

In yet a further aspect of the disclosure, methods and apparatus for determining geographically proximate base stations within a wireless network are disclosed. In one embodiment, the methods and apparatus utilize data obtained from communicative user devices (e.g., UE's which are connected to a given base station) to canvass the local area and report detected identifier (e.g., PCI) values for base stations (or sectors thereof) to the connected base station. The base station then forwards these values to a network process which uses the PCI values to correlate individual base stations to network addresses (and optionally their respective geographic locations). The forwarding base station can then utilize these network addresses to e.g., establish contact between the base stations, including for X2 links.

These and other aspects shall become apparent when considered in light of the disclosure provided herein.

BRIEF DESCRIPTION OF THE DRAWINGS

FIG. 5A is a graphical illustration showing the coverage areas and partial overlap between two base stations (e.g., CBSDe devices) according to one embodiment of the present disclosure.

FIG. 9 is a logical flow diagram illustrating another exemplary implementation of the generalized method of FIG. 7, in the context of a CBRS-based system with enhanced SAS (SASe) and enhanced CBSD (CBSDe) devices.

Figure 1:
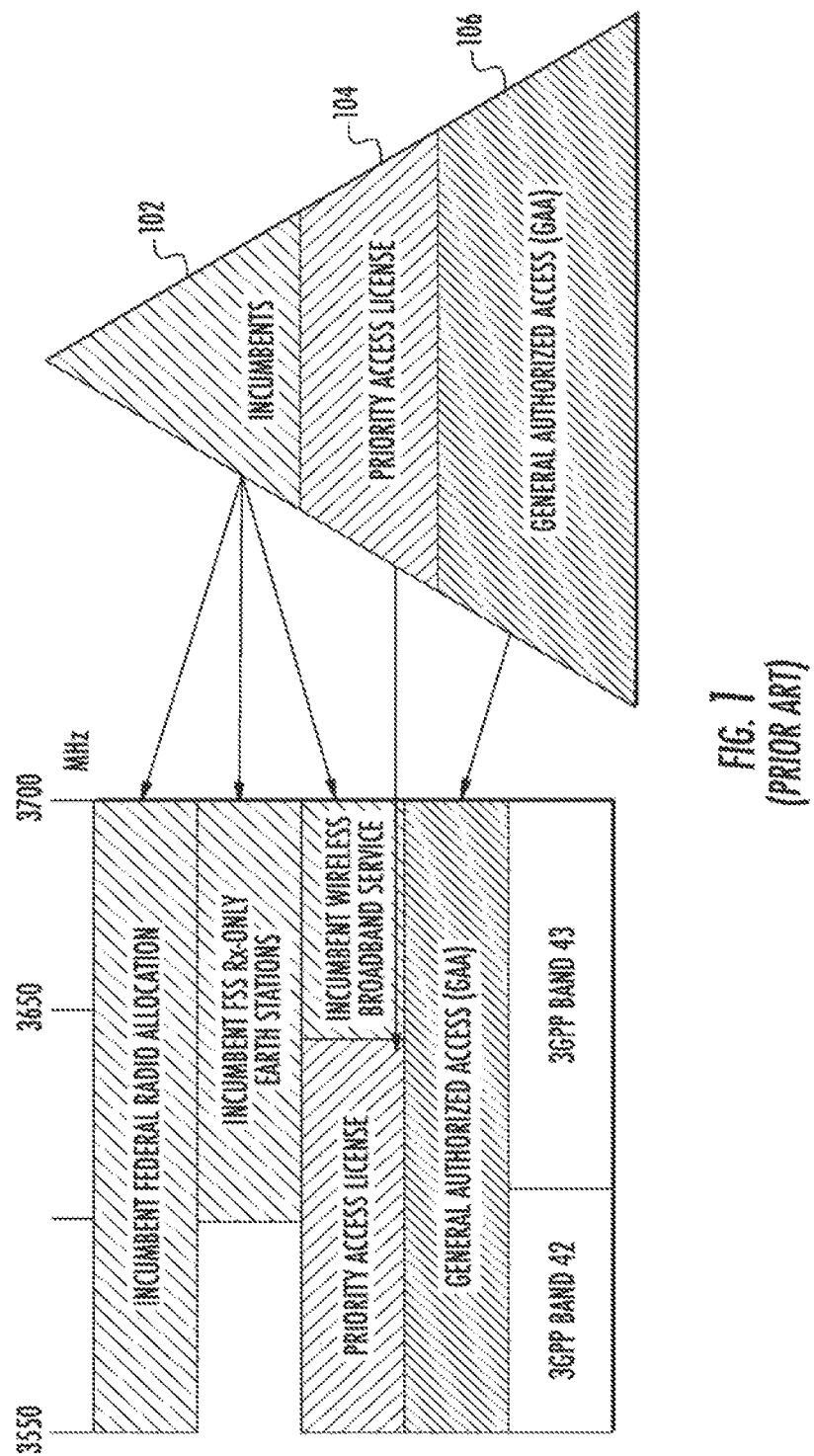
FIG. 1 is a graphical illustration of prior art CBRS (Citizens Broadband Radio Service) users and their relationship to allocated frequency spectrum in the 3.550 to 3.700 GHz band.
Figure 2:
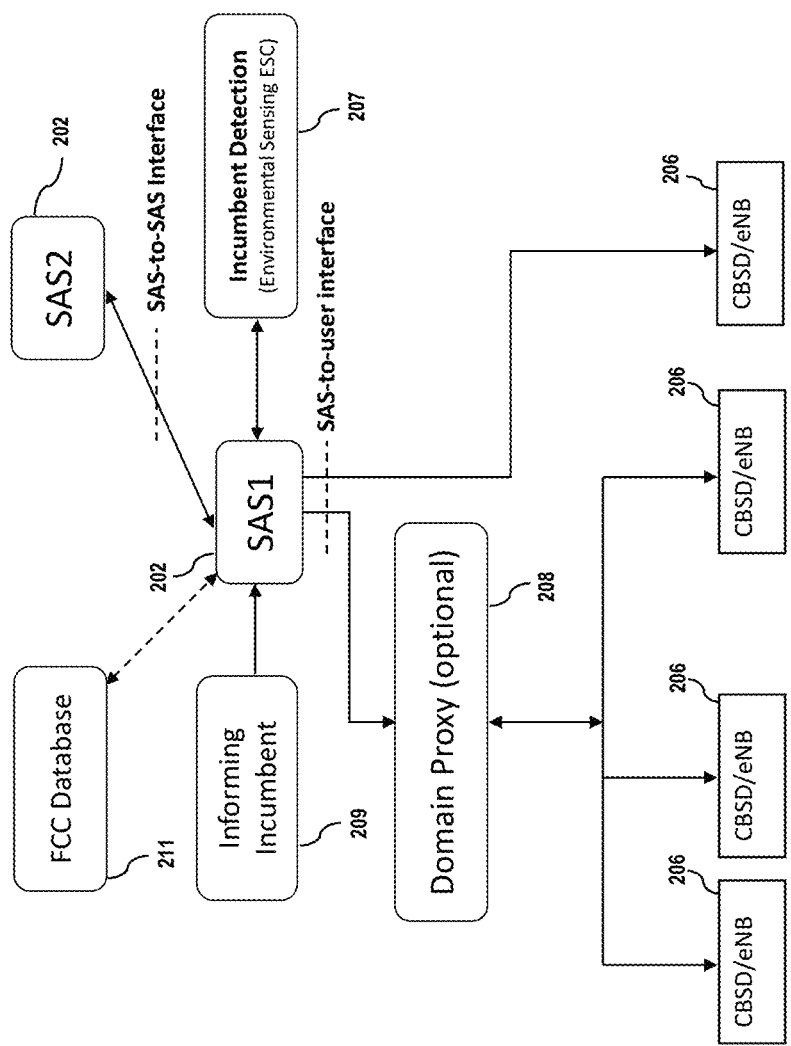
FIG. 2 is a block diagram illustrating a general architecture for the CBRS system of the prior art.
Figure 2A:
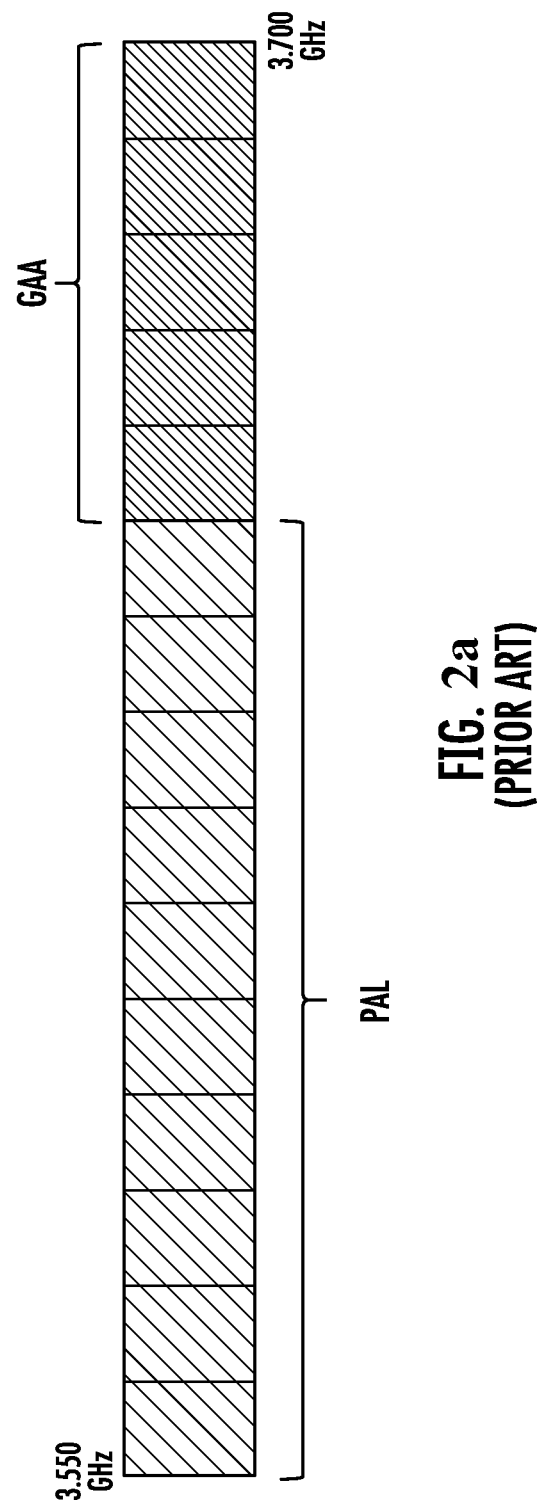
FIG. 2A is a graphical representation of allocations for PAL versus GAA users within the frequency band of FIG. 2.
Figure 3:
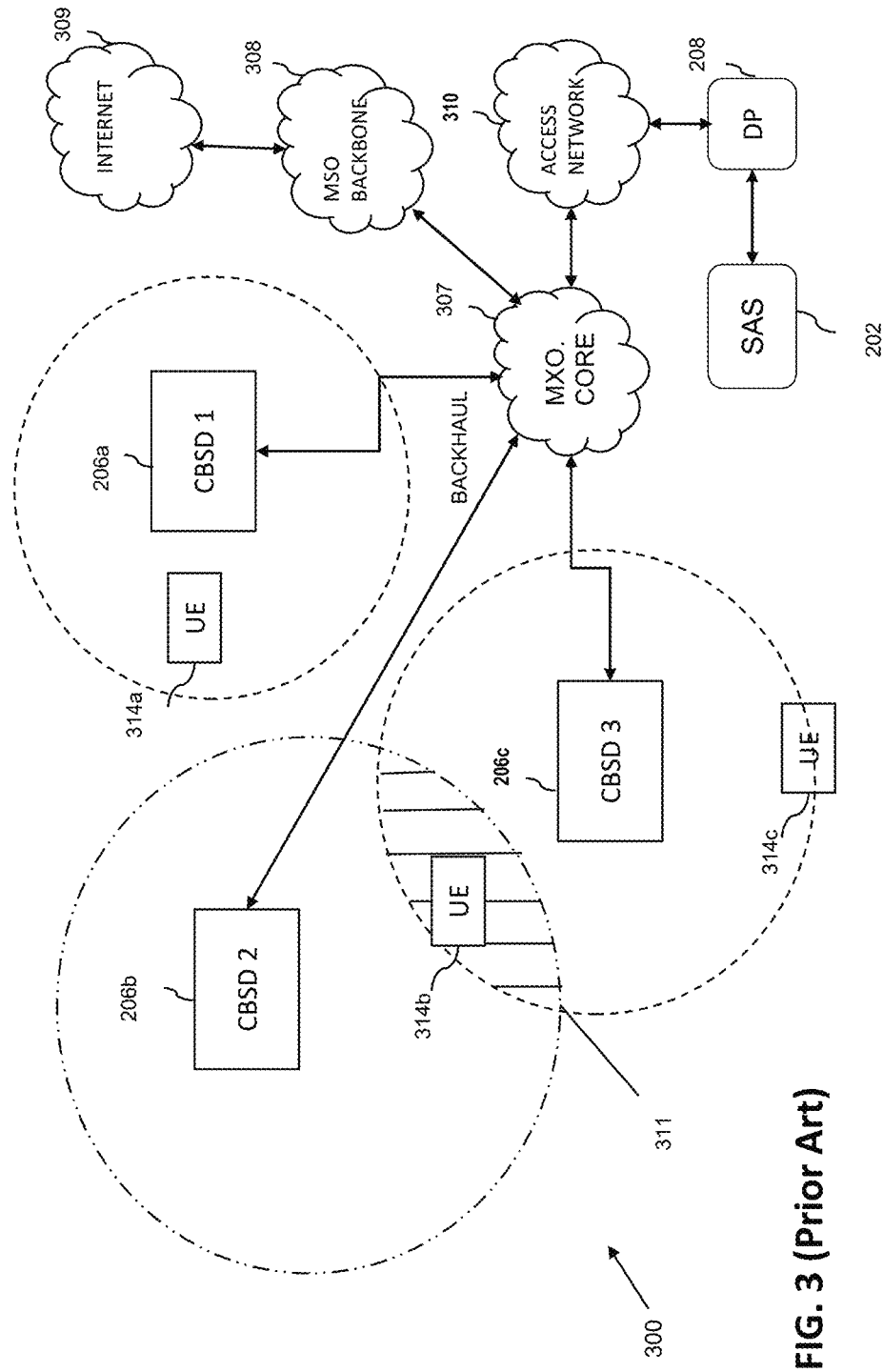
FIG. 3 is block diagram illustrating a prior art CBRS-based network architecture.

All figures © Copyright 2019-2020 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, FWA, or Wi-Fi AP.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment. As used herein, the term "CBRS" refers without limitation to the CBRS architecture and protocols described in *Signaling Protocols and Procedures for Citizens Broadband Radio Service (CBRS): Spectrum Access System (SAS)—Citizens Broadband Radio Service Device (CBSD) Interface Technical Specification*—Document WINNF-TS-0016, Version V1.2.1. 3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, CBRS FWAs, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable step s which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0.

As used herein, the term "headend" or "backend" refers generally to a networked system controlled by an operator (e.g., an MSO) that distributes programming to MSO clientele using client devices. Such programming may include literally any information source/receiver including, inter alfa, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with 3GPP Release 15, 16 and/or 17, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "quasi-licensed" refers without limitation to spectrum which is at least temporarily granted, shared, or allocated for use on a dynamic or variable basis, whether such spectrum is unlicensed, shared, licensed, or otherwise. Examples of quasi-licensed spectrum include without limitation CBRS, DSA, GOGEU TVWS (TV White Space), and LSA (Licensed Shared Access) spectrum.

As used herein, the term "SAE (Spectrum Allocation Entity)" refers without limitation to one or more entities or processes which are tasked with or function to allocate quasi-licensed spectrum to users. Examples of SAEs include SAS (CBRS). PMSE management entities, and LSA Controllers or Repositories.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "shared access" refers without limitation to (i) coordinated, licensed sharing such as e.g., traditional fixed link coordination in 70/80/90 GHz and the U.S. FCC's current rulemaking on potential database-coordinated sharing by fixed point-to-multipoint deployments in the C-band (3.7-4.2 GHz); (ii) opportunistic, unlicensed use of unused spectrum by frequency and location such as TV White Space and the U.S. FCC's proposal to authorize unlicensed sharing in the uplink C-band and other bands between 5925 and 7125 MHz; (iii) two-tier Licensed Shared Access (LSA) based on geographic areas and database assist such as e.g., within 3GPP LTE band 40 based on multi-year sharing contracts with tier-one incumbents; and (iv) three-tier shared access (including quasi-licensed uses) such as CBRS.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a CPE/FWA or CBSD, venue operators, third party service providers, or even entities within the MSO itself (e.g., a particular department, system or processing entity).

As used herein, the term "Wi-Fi" refers to, without limitation and as applicable, any of the variants of IEEE Std. 802.11 or related standards including 802.11 a/b/g/n/s/v/ac/ax/ay/ba or 802.11-2012/2013, 802.11-2016, as well as Wi-Fi Direct (including inter alfa, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term "xNB" refers to any 3GPP-compliant node including without limitation eNBs (eU-TRAN) and gNBs (5G NR).

Overview

In one exemplary aspect, the present disclosure provides improved methods and apparatus for interference management between two or more base stations (or individual sectors thereof) within a wireless system so that maximum throughput and coverage is achieved, including within densely packed deployment applications.

In one embodiment, the network is configured to utilize "quasi-licensed" CBRS spectrum and uses 3GPP-based infrastructure and protocols. In order to enable use of load-balancing algorithms that balance the traffic load between the individual base stations/sectors within the network, the base stations are specifically permitted to have overlaps in their coverage areas, and hence a user device connected to one band associated with one base station can be handed over or moved to another band associated to another base station. In one variant, an enhanced SAS (SASe)—or an operator based proxy therefor—is used to create a network overlap map, and divide the population of base stations (CBSDs) (including in some cases individual sectors thereof) into "virtual clusters" based on their locations and coverage overlaps. The virtual clusters can advantageously be dynamically created, modified, or torn down, such as based on network operational parameters (e.g., time of day) related to loading. Moreover, the virtual clusters can be shaped in various configurations (and numbers of CBSDs/sectors), and can have intersecting membership of CBSDs and/or their individual sectors.

In one implementation, the SASe (or proxy) first models the interference outside of the virtual clusters, and based on the interference model, estimates the interfering power of CBSDs on the outside edge or border of the cluster under consideration. The SASe may then cause reduction of transmit power on one or more cluster edge CBSDs if producing substantial levels of interfering power. One or more CBSDs within interior regions of the cluster can then be used to compensate for the "lost" coverage area and overlap created by the edge-CBSD power reduction(s) in needed.

The exemplary embodiment described above effectively improves, inter alfa, coverage area and enables inter-CBSD traffic load balancing, without the need to use excessive power at the CBSDs (and the various issues associated therewith), or alter the general operational paradigm of the network; i.e., SAS-based reduction of power to reduce interference.

In addition, the interference management and load balancing scheme referenced above increases overall network capacity without the need to install additional infrastructure such as CBSDs and associated backhaul, thereby effectively adding more customers to the network with a given CAPEX (capital expenditure). Operator flexibility in placement of CBSDs within a given area is also enhanced; operators may place CBSDs for example at identified usage "hot spots," and then via virtual clustering and load balancing, adapt operation of those CBSDs dynamically as operational conditions change (in contrast to e.g., a fixed-cell type of approach used in prior art cellular site planning).

The methods and apparatus described herein may also advantageously be extended to other shared-access architectures (i.e., other than CBRS) such as for example DSA, LSA, and TVWS systems.

Detailed Description of Exemplary Embodiments

Exemplary embodiments of the apparatus and methods of the present disclosure are now described in detail. While these exemplary embodiments are described in the context of the previously mentioned base station (e.g., CBSDs such as 3GPP-based xNB devices), using unlicensed or quasi-licensed spectrum associated with e.g., a managed network (e.g., hybrid fiber coax (HFC) cable architecture having a multiple systems operator (MSO), digital networking capability, IP delivery capability, and a plurality of client devices), or a mobile network operator (MNO), the general principles and advantages of the disclosure may be extended to other types of radio access technologies ("RATs"), networks and architectures that are configured to deliver digital data (e.g., text, images, games, software applications, video and/or voice or audio). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., indoors, outdoors, commercial/retail, or enterprise domain (e.g., businesses), or even governmental uses, such as those outside the proscribed "incumbent" users such as U.S. DoD and the like. Yet other applications are possible.

Also, while certain aspects are described primarily in the context of the well-known Internet Protocol (described in, inter alia, *Internet Protocol DARPA Internet Program Protocol Specification*, IETF RCF 791 (Sept. 1981) and Deering et al., *Internet Protocol, Version 6 (IPv6) Specification*, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while the current SAS framework is configured to allocate spectrum in the 3.5 GHz band (specifically 3,550 to 3,700 MHz), it will be appreciated by those of ordinary skill when provided the present disclosure that the methods and apparatus described herein may be configured to utilize other "quasi licensed" or other spectrum, including without limitations above 4.0 GHz (e.g., currently proposed allocations up to 4.2 GHz).

Additionally, while some embodiments are described in terms of GAA 106 spectrum allocation (see FIG. 1), the methods and apparatus described herein may also be adapted for allocation of other "tiers" of CBRS or other unlicensed spectrum (whether in relation to GAA spectrum, or independently), including without limitation e.g., so-called Priority Access License (PAL) spectrum 104, including selective allocation based on e.g., role, functionality, resources, availability, subscription level, geographic/topological considerations, and/or other such factors.

Moreover, while described in the context of quasi-licensed or unlicensed spectrum, it will be appreciated by those of ordinary skill given the present disclosure that various of the methods and apparatus described herein may be applied to delivery of heterogeneous services (including also allocation/assignment of spectrum or bandwidth to those services) within a licensed spectrum context; e.g., for cellular voice or data bandwidth/spectrum allocation, such as in cases where a given service provider must provide differentiated or heterogeneous service to users.

Moreover, while some aspects of the present disclosure are described in detail with respect to so-called "4G/4.5G" 3GPP Standards (aka LTE/LTE-A) and so-called 5G "New Radio" (3GPP Release 15/16/17 and TS 38.XXX Series Standards and beyond), such aspects—including allocation/use/withdrawal of CBRS spectrum—are generally access technology "agnostic" and hence may be used across different access technologies, and can be applied to, inter alia, any type of P2MP (point-to-multipoint) or MP2P (multipoint-to-point) technology, including e.g., Qualcomm Multefire.

Other features and advantages of the present disclosure will immediately be recognized by persons of ordinary skill in the art with reference to the attached drawings and detailed description of exemplary embodiments as given below.

Interference Management and Load Balancing Architecture

Figure 4:
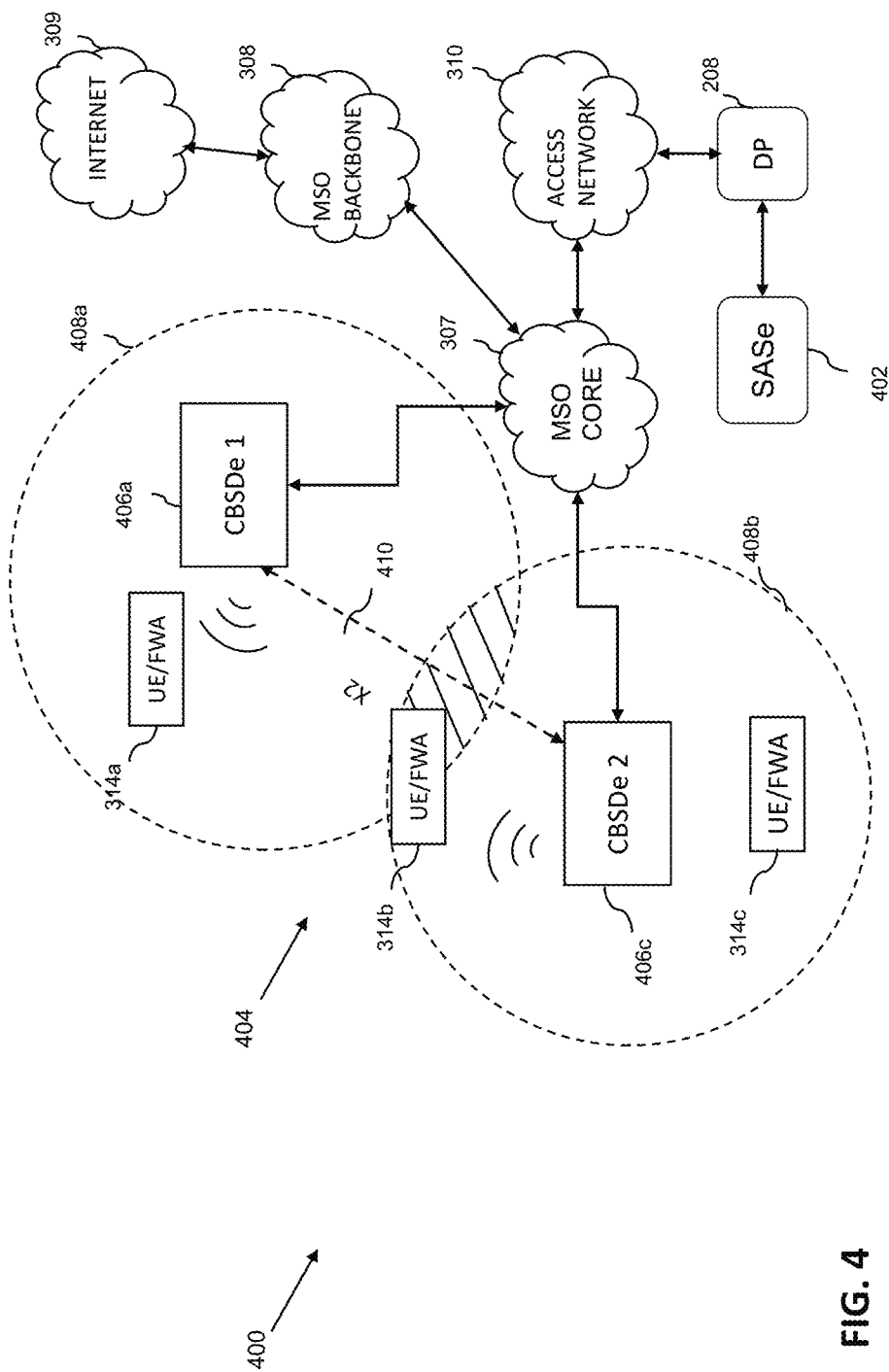
FIG. 4 is a block diagram illustrating one embodiment of a CBRS-based two-cell network architecture with interference and cluster management functionality according to the disclosure.

FIG. 4 is a block diagram illustrating one embodiment of a CBRS-based network architecture with interference and cluster management functionality (e.g., to support load balancing) according to the disclosure.

As shown, the architecture 400 of FIG. 4 includes two enhanced CBSDs (CBSDe) 406a, 406b having respective coverage areas 408a, 408b, which have overlap in their coverage areas, and serving the various UE/FWA devices 314a, 314b, 314c, 314d. These CBSDe devices are enhanced relative to prior art CBSDs at least in that each may perform the data collection, virtual clustering, and load balancing functions and operations described herein. It will be appreciated that while only two cells are shown in FIG. 4 for simplicity of illustration, more cells and different spatial relationships between the cells may be used consistent with the present disclosure (see, e.g., FIG. 4A).

It will also be appreciated that while the following discussion is cast primarily in terms of base stations such as the exemplary CBSDe devices, the various principles may be readily applied to individual sectors of those base stations where so equipped (e.g., where sectorized versus omnidirectional antenna elements are used).

As illustrated, the CBSDe devices 406a, 406b can communicate with each other via a 3GPP X2 link 410, as well as with network entities (e.g., SASe) tasked with evaluating interference between the CBSDe devices and logically grouping them into "clusters," as described in greater detail subsequently herein. The inter-CBSDe connectivity allows, inter alfa, exchange of data between CBSDe within logical groupings or "virtual clusters" of cells, such as to support load balancing and other types of cooperation between the individual cells.

The served UE/FWA 314a, 314b, 314c are within the coverage areas 408a, 408b of the CBSDe devices, and wirelessly connected to their serving CBSDe 406a, 406b respectively (e.g., via 3GPP *RRC-Connected* state). The UE/FWA 314b in this example is in the overlap region 404 b etween coverage areas 408a, 408b, and is connected to CBSDe 2 406b, and hence, due to the overlap, the UE 314b can seamlessly handover to CBSDe 1 406a (e.g., via transition to a different frequency band utilized by the recipient CBSDe). Herein lies a salient feature of the architecture of FIG. 4 (and those described subsequently herein); i.e., that the overlap 404 between the coverage areas 408 of each CBSDe are "intelligently" controlled and not eliminated, so as to permit the CBSDe 406 such handover opportunity for load-balancing, equipment failure, or other reasons. The other UE/FWA 314a, 314c which are not presently shown as being within any overlap region ostensibly cannot be load-balanced from cell to cell; however, those within the overlap regions can be transferred to offload common serving CBSDe devices, and moreover some UE/FWA devices may fall within our outside of overlap regions 404 dynamically, based on power adjustments by the SASe. Hence, a UE or FWA 314 that at one point in time is not within an overlap region may later find itself within an overlap region, such as after virtual cluster management is applied, or vice versa.

It will be appreciated that while mobile UE devices 314 may be connected to a given CBSDe and "handed over" as described above, the handovers described herein are to be distinguished from traditional cellular system handovers in that (1) fixed devices such as CBRS FWA can be "handed over" from cell to cell, and (ii) the handovers may be predicated entirely on load balancing, versus purely mobility in the case of mobile cellular UE.

In the embodiment of FIG. 4, the CBSDe devices 406 are managed and controlled by the MSO core 307, and are connected to the enhanced SAS (SASe) 402 via the MNO access network 310 and Domain Proxy (DP). An MSO backbone 308 also connects the core (and CBSDe devices) to the Internet 309 or other such untrusted internetwork, which in some alternative embodiments may also/alternatively be used as the medium for communication with the DP/SASe (i.e., instead of the access network).

The coverage areas 408a, 408b of the CBSDe devices 406a, 406b and re managed by the SASe 402. The SASe allocates the operating spectrum bands to the various CBSDe/sectors, determines transmitter power levels for each, and determines any interference (including in the overlap area). In some scenarios, where the interference between the CBSDe devices 406 is higher than a prescribed value, the SASe may reduce transmission power for one or more of the CBSDe, and boost transmission power for others, as described in greater detail subsequently herein.

It will be appreciated that instead of base stations such as CBSDe 406a, 406b, other types of devices may be used as the basis for providing services. For instance, other CPE/FWA apparatus configured for supplementation or out-of-coverage service within a given area may be used within the architecture 400, such as those described in U.S. patent application Ser. No. 16/738,889 filed Jan. 9, 2020 entitled "METHODS AND APPARATUS FOR SERVICE PROVISION TO OUT-OF-COVERAGE APPARATUS IN WIRELESS SYSTEMS", and issued as U.S. Pat. No. 11,368,853 on Jun. 21, 2022, as well as U.S. patent application Ser. No. 16/676,188 filed Nov. 6, 2019 and entitled "METHODS AND APPARATUS FOR ENHANCING COVERAGE IN QUASI-LICENSED WIRELESS SYSTEMS," each of the foregoing incorporated herein by reference in its entirety. For example, as described therein, wireless coverage for an exemplary unlicensed or quasi-licensed UE/FWA 314 that is at or beyond a coverage "edge" of a given network (or is otherwise experiencing less-than-adequate signal strength for whatever reason) may be provided service via "relay" and/or supplementation of services from a better-positioned "in coverage" CPE/FWA of the same network.

Figure 4A:
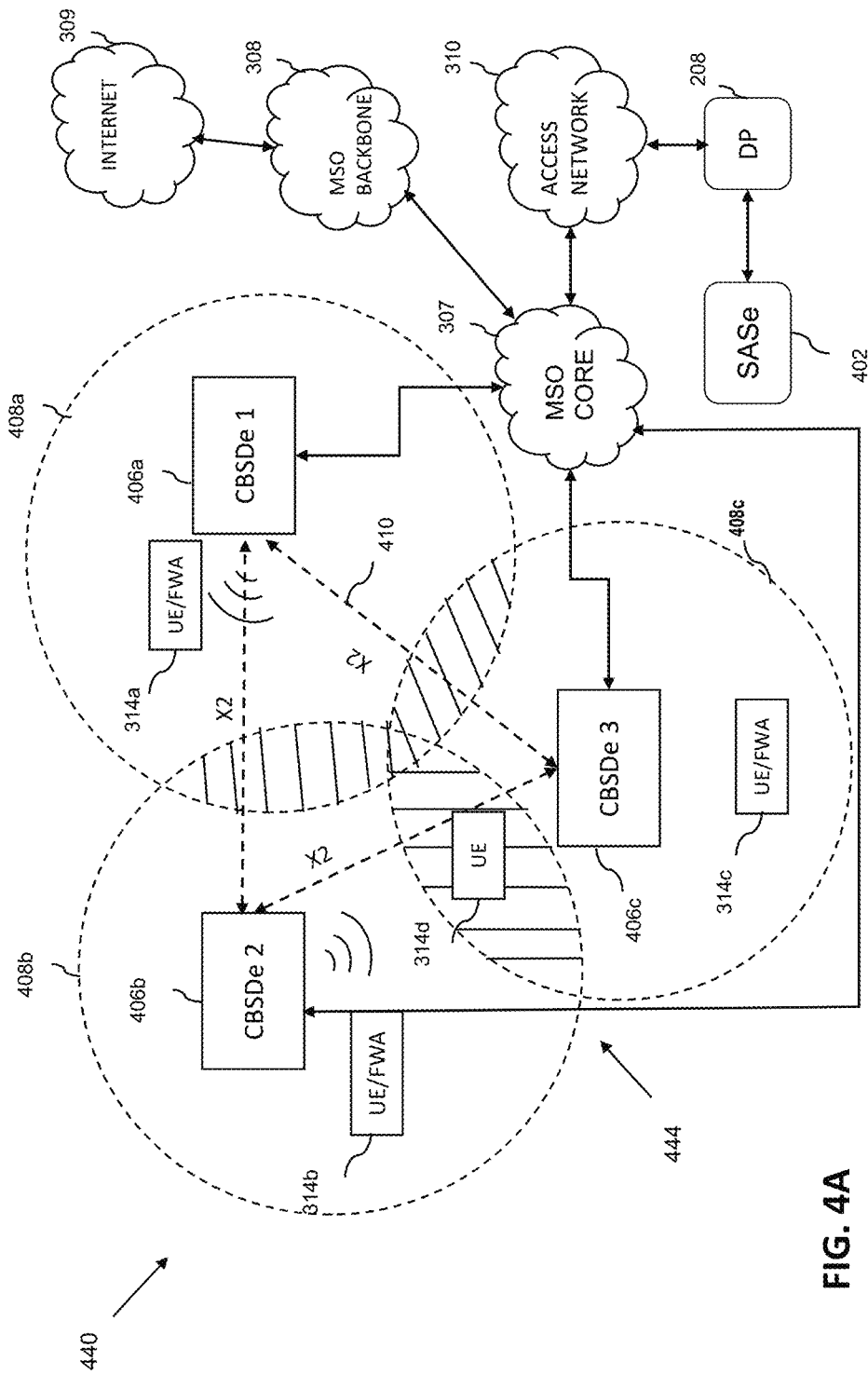
FIG. 4A is a block diagram illustrating another embodiment of a CBRS-based network architecture with interference and cluster management functionality according to the disclosure, wherein three cells (and CBSDe) are used.

FIG. 4A is a block diagram illustrating another embodiment of a CBRS-based network architecture 440 with interference and cluster management functionality according to the disclosure, wherein three cells (and CBSDe) are used. In this embodiment, three cells/CBSDe 404a, 406b, 406c are communicative with one another via respective X2 interfaces 410, and the three cell coverage areas 408a, 408b, 408c overlap in several areas 444. Served UE/FWA devices 314 may be within our outside of the overlap regions, depending on UE/FWA placement and CBSDe placement.

As a brief aside, typical cellular network planning involves placement of base stations (e.g., eNBs) at locations such that a "honeycomb" or other cell pattern is adhered to. This approach allows maximal coverage via interlocking cells that may overlap one another to a limited degree. In contrast, in exemplary embodiments of the present disclosure, disposition of base stations (e.g., CBSDe devices) at a plurality of geographic locations within a given geographic region is based on actual or projected usage by users (e.g., "hotspots"). The placements may be irregular (unlike normal cellular cell planning which tends to be more regular), and any overlaps and interference between the CBSDe devices after placement is managed via use of the above-described clustering techniques and apparatus, including to allow maintenance of sufficient overlap for load balancing or other purposes. "Directional shaping" of virtual clusters (discussed in greater detail below) can also be used to help shape various cluster (VC) boundaries to maintain desired levels of coverage overlap. In some variants, load balancing is applied via the overlap at prescribed locations and/or times of day/days of the week (e.g., on an as-needed basis during peak traffic times and within peak traffic areas). As such, the network operator (e.g., MSO or MNO) is free to place its base stations where demand/user density will most likely be high, and adjust for the desired degree of overlap through VC membership and policies (as well as individual CBSDe transmit power levels as imposed by the SASe 402).

FIG. 5A is a graphical illustration showing the coverage areas and partial overlap between two base stations (e.g., CBSDe devices of FIG. 4) according to one embodiment of the present disclosure. As can be appreciated, FIG. 5A (and other subsequent figures) treats each CBSDe as having a generally omnidirectional and uniform radiation pattern (represented by the generally circular areas shown) for purposes of illustration, although in reality such patterns may be more complex, and moreover may be affected by control of each CBSDe on an individual sector basis as described in greater detail subsequently herein.

As shown, load transfer 517 (i.e., of the UE/FWA within the overlap zone 404) between the two CBSDe devices can occur, such as under load balancing. As previously described, such load balancing may cause the UE/FWA to connect to the second CBSDe simultaneously while connected to the first CBSDe on a different frequency, and then terminate the connection to the first CBSDe so as to reduce load thereon. In this scenario, each CBSDe can be considered an interferer for the other CBSDe; their coverage areas 505, 507 have partial overlap 404. The SASe 402 may create a virtual cluster from just these two CBSDe' 406a, 406b, and store data relating to their coverage overlap 404, and any registered UE/FWA devices therein, in a network overlap map (as described in greater detail below).

Figure 5B:
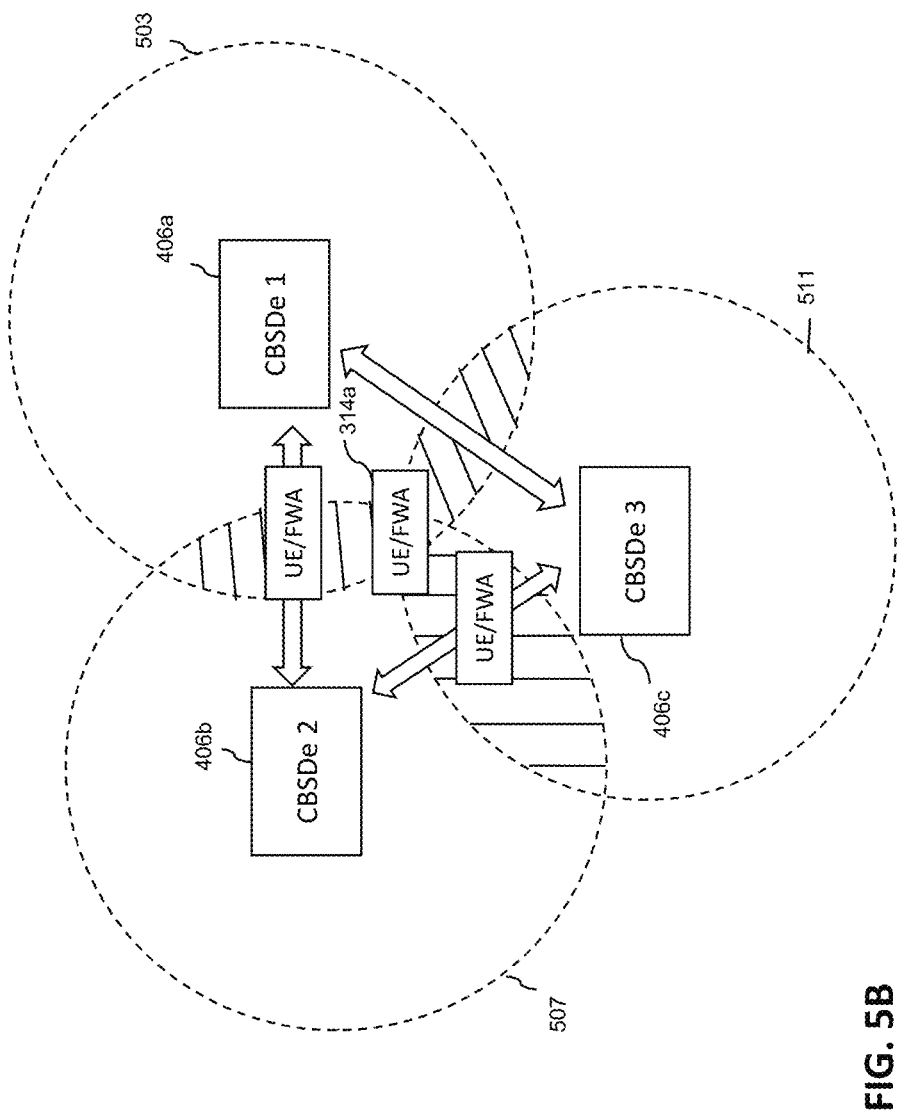
FIG. 5B is a graphical illustration showing the coverage areas and partial overlap between three base stations (e.g., CBSDe devices) according to another embodiment of the present disclosure.

FIG. 5B is a graphical illustration showing the coverage areas and partial overlap between three base stations (e.g., CBSDe devices) according to another embodiment of the present disclosure. As shown, the three coverage areas 503, 507, 511 each overlap with one another, and accordingly any UE/FWA within such overlap areas can be selectively migrated to other CBSDe devices. As shown, one UE/FWA 314a is within the common overlap areas of all CBDE's in this example, and hence can be migrated from and to any CBSDe shown. This illustrates another feature of the disclosure; i.e., the possibility for multi-layer overlap, which can in certain instances be used to add flexibility to load balancing algorithms without undue impact on interference between the CBSDe devices.

Figure 5C:
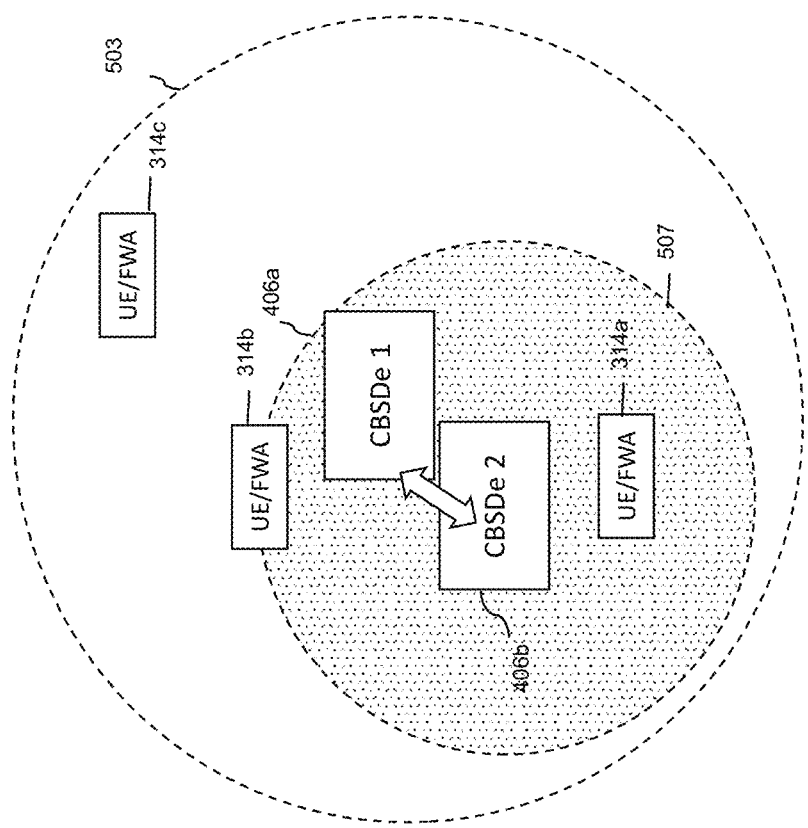
FIG. 5C is a graphical illustration showing the coverage areas and complete overlap between two "nested" base stations (e.g., CBSDe devices) according to another embodiment of the present disclosure.

FIG. 5C is a graphical illustration showing the coverage areas and complete overlap between two "nested" base stations (e.g., CBSDe devices) according to another embodiment of the present disclosure. In this scenario, the coverage area 507 of the second CBSDe 406b is completely subsumed within that 503 of the first CBSDe 406a, such that the second CBSDe is nested within the first (albeit with different physical locations for the individual CBSDe devices themselves). In this case, either of the first two UE/FWA devices 314a, 314b shown can be migrated between the two CBSDe devices, while the third device 314c cannot.

Figure 5D:
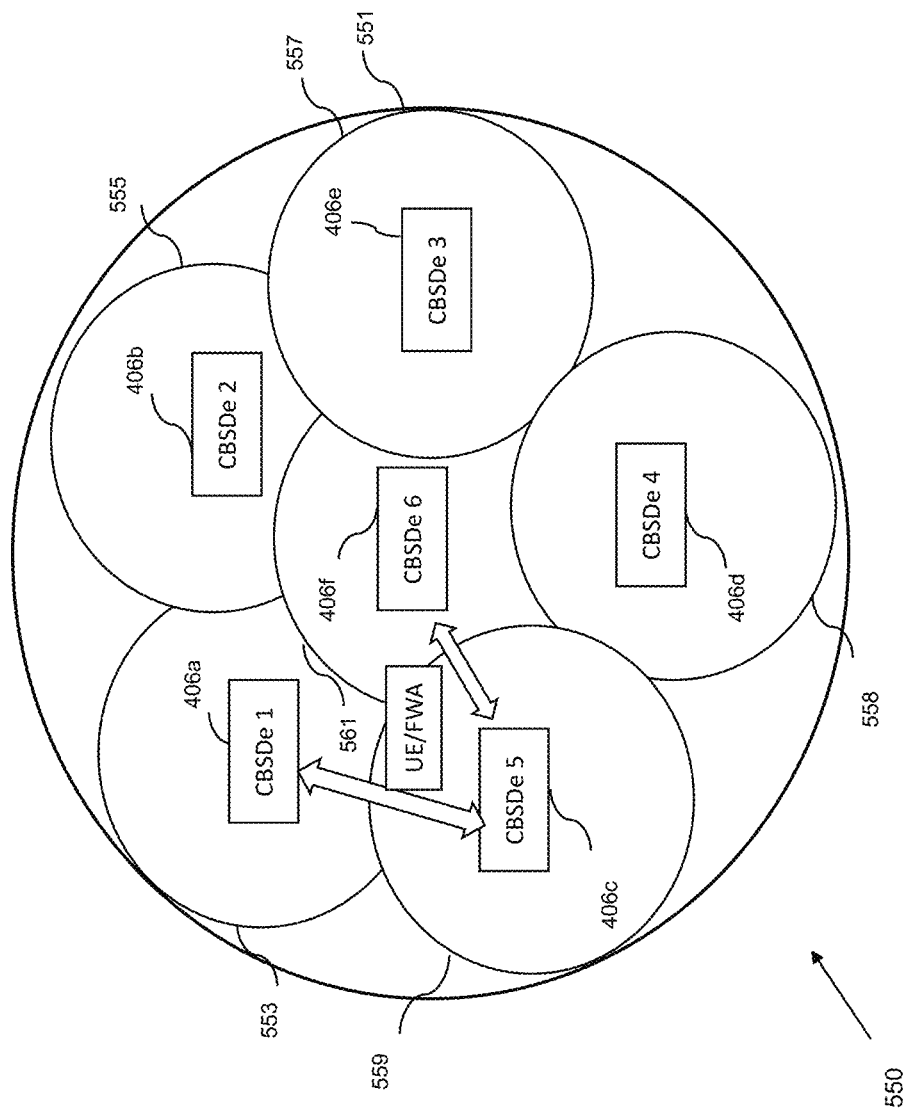
FIG. 5D is a graphical illustration showing the coverage areas and partial overlap between six base stations (e.g., CBSDe devices) within a common cluster, according to another embodiment of the present disclosure.

FIG. 5D is a graphical illustration showing the coverage areas and partial overlap between six base stations (e.g., CBSDe devices) within a common cluster, according to another embodiment of the present disclosure. As shown, each of the CBSDe 406a, 406b, 406c, 406d, 406e, 406f have coverage respective areas 553, 555, 557, 558, 559, 561. In this scenario, the outer CBSDe 1 through 5 406a, 406b, 406c, 406d, 406e, are considered edge CBSDe devices since they are on the boundary 551 of the cluster, while CBSDe 6 406f is an interior or non-edge CBSDe (and hence has no opportunity for interference with other cells outside of the cluster, or other adjacent clusters. Depending on overlap (deleted from this figure for clarity, as are all inter CBSDe X2 interfaces), UE/FWA devices can be migrated from (i) an edge CBSDe to/from another edge CBSDe; and (ii) an edge CBSDe to/from an interior CBSDe, as shown by the arrows in FIG. 5D.

Figure 5E:
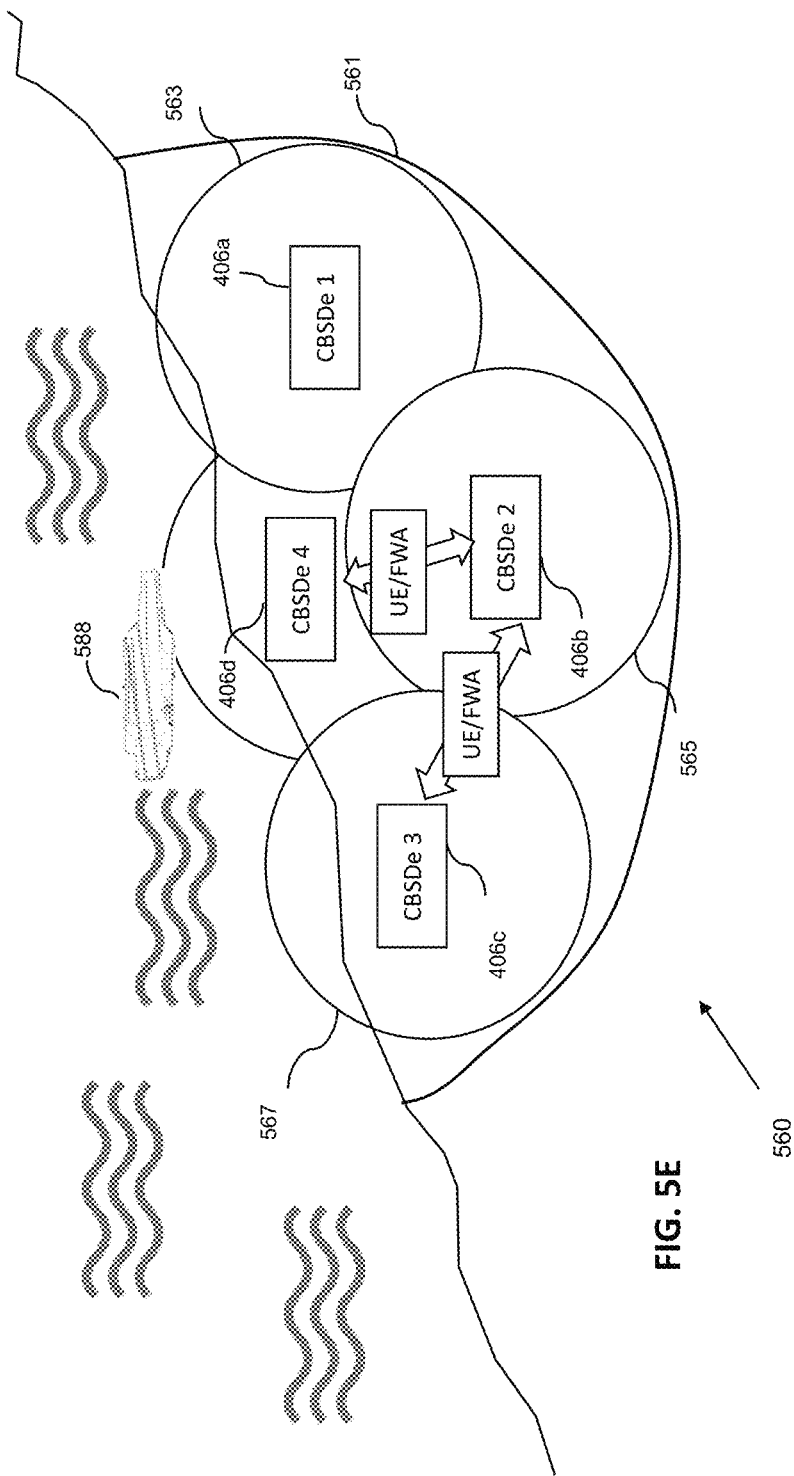
FIG. 5E is a graphical illustration showing the coverage areas and partial overlap between four base stations (e.g., CBSDe devices) within a common cluster and disposed proximate to a geographical feature such as a body of water, according to yet another embodiment of the present disclosure.

FIG. 5E is a graphical illustration showing the coverage areas and partial overlap between four base stations (e.g., CBSDe devices) within a common cluster and disposed proximate to a geographical feature such as a body of water, according to yet another embodiment of the present disclosure. As shown, the boundary 561 has three "edge" CBSDe devices 1-3 406a, 406b, 406c, and one interior or non-edge CBSDe 406d. The cluster 560 is effectively truncated since three cells 406a, 406c, and 406d back up to the body of water, and as such their respective coverage area may or may not present any interference to at least UE/FWA (since likely none are disposed on the body of water, at least in any number of significance). However, incumbents such as DoD assets 588 may be on the body of water, and as such the SASe 402 may be required to reduce transmit power or switch frequencies (due to withdrawal) for those three cells, which may also necessitate load balancing of UE/FWA between the CBSDe. As such, placement of the interior CBSDe 406d too close to the water body should be avoided, since it may inhibit the interior cell's ability to compensate for power reductions on the (land-side) edge cells 406a, 406b, 406c, because its power is capped to avoid incumbent asset interference on the body of water.

Figure 5F:
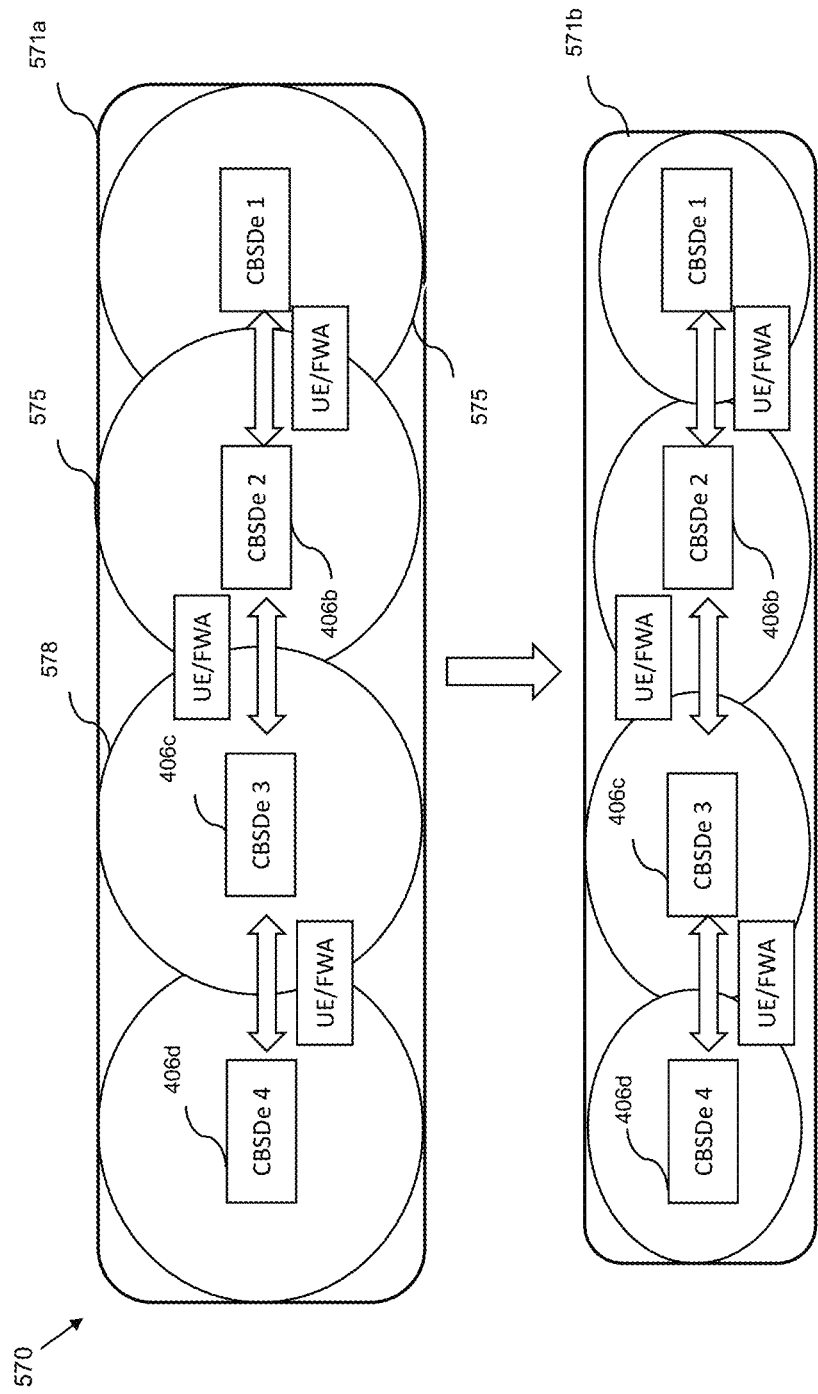
FIG. 5F is a graphical illustration showing the coverage areas and partial overlap between four base stations (e.g., CBSDe devices) within a common cluster and disposed in a linear array ("daisy chain"), according to yet another embodiment of the present disclosure.

FIG. 5F is a graphical illustration showing the coverage areas and partial overlap between four base stations (e.g., CBSDe devices) within a common cluster and disposed in a linear array ("daisy chain"), according to yet another embodiment of the present disclosure. As shown, this cluster 570 includes four CBSDe devices in linear arrangement, wherein each of the UE/FWA in the overlap areas can be migrated between two adjacent cells. In this instance, X2 interfaces (not shown) exist between each "pair" or adjacent cells (i.e., between CBSDe 1 and CBSDe 2, between CBSDe 2 and CBSDe 3 and between CBSDe 3 and CBSDe 4). All CBSDe devices are considered edge devices due to their proximity to the cluster boundary 571a. In this case, since there is no interior cell or CBSDe to compensate for reductions in coverage area of the edge cells (all are edge cells), loss of overlap between cells in the cluster may occur when the coverage area of edge cells is required. Accordingly, directional cell shaping as described herein (e.g., cell coverage area "flattening" in the instance of the bottom portion of FIG. 5F) may be utilized to maintain at least some overlap between adjacent cells. In the example of FIG. 5F, as the cluster boundary 571b is reduced from the previous boundary 571a (e.g., to reduce inter-cluster interference), the cell shapes can be distorted so as to allow such overlap for load balancing. This distortion from e.g., a perfect circle can be accomplished via power levels used on different sectors of each CBSDe such that regions within the cluster boundary are insulated from SASe interference mitigation (in effect, the ends of each ellipse in the bottom portion of FIG. 5F are treated as individual "interior CBSDe devices", while antenna sectors of the CBSDes facing the boundary 571b and re mitigated as required by the SASe.

Figure 5G:
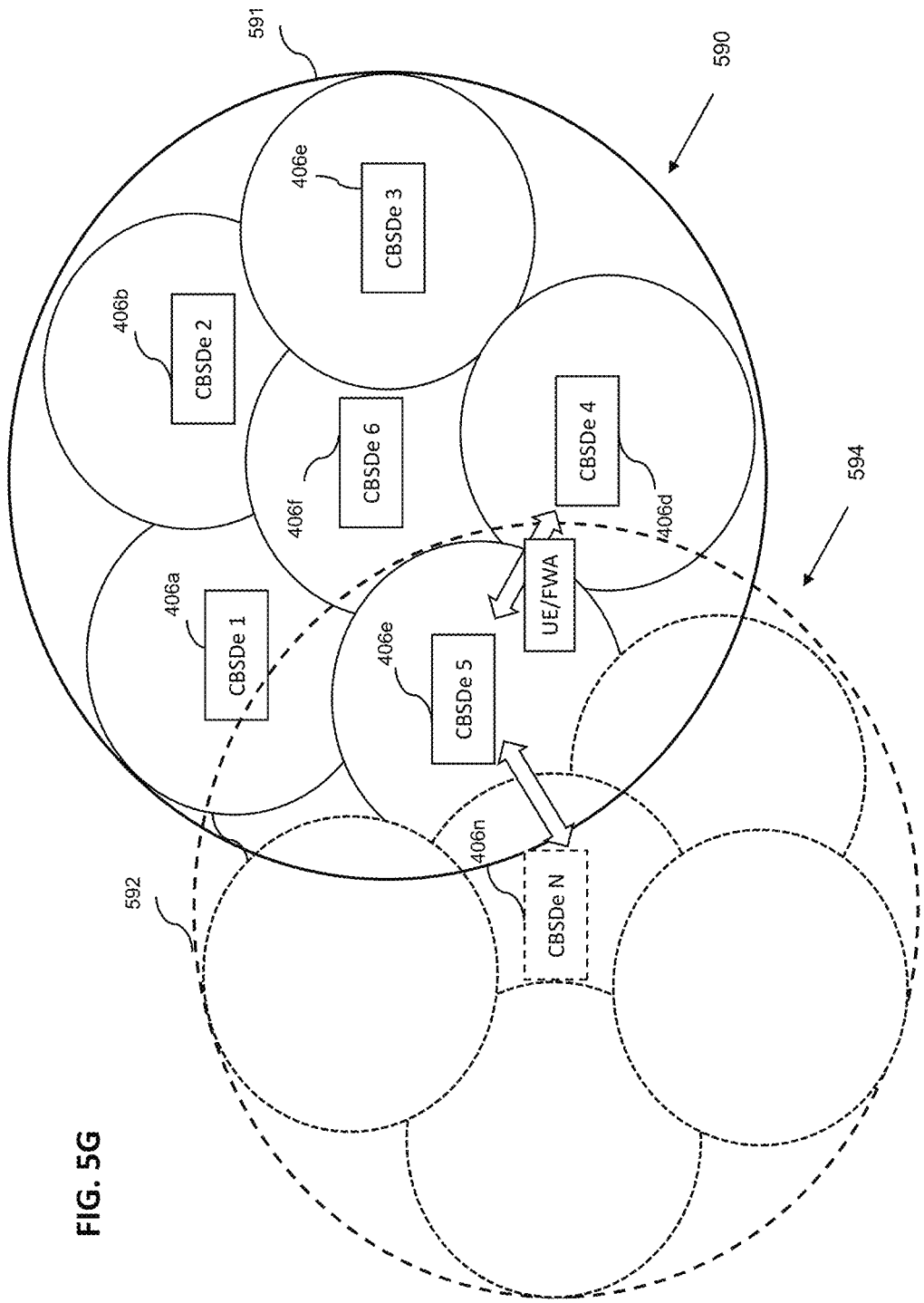
FIG. 5G is a graphical illustration showing the coverage areas and partial overlap between a first six-base station cluster and a second cluster, with one CBSDe having common membership.

FIG. 5G is a graphical illustration showing the coverage areas and partial overlap between a first six-base station cluster and a second cluster, with one cluster having common membership. As shown, the cluster 590 consists of CBSDes/xNBs 406a, 406b, 406c, 406d, 406e, 406f having respective coverage areas. The cluster edge or boundary 591 separates those CBSDe devices (e.g., CBSDe N 406n) that are outside of the cluster edge 591 from those which are inside of the cluster. In some variants, the edge CBSDe 5 406e, in the second cluster 594 may be shared between the different clusters, effectively maintaining membership in each. For instance, the UE/FWA shown may be migrated between CBSDe 4 and CBSDe 5 when CBSDe 5 is acting as either part of the first cluster 590 or the second cluster 594, and different rules may be applied under each different scenario.

Figure 5H:
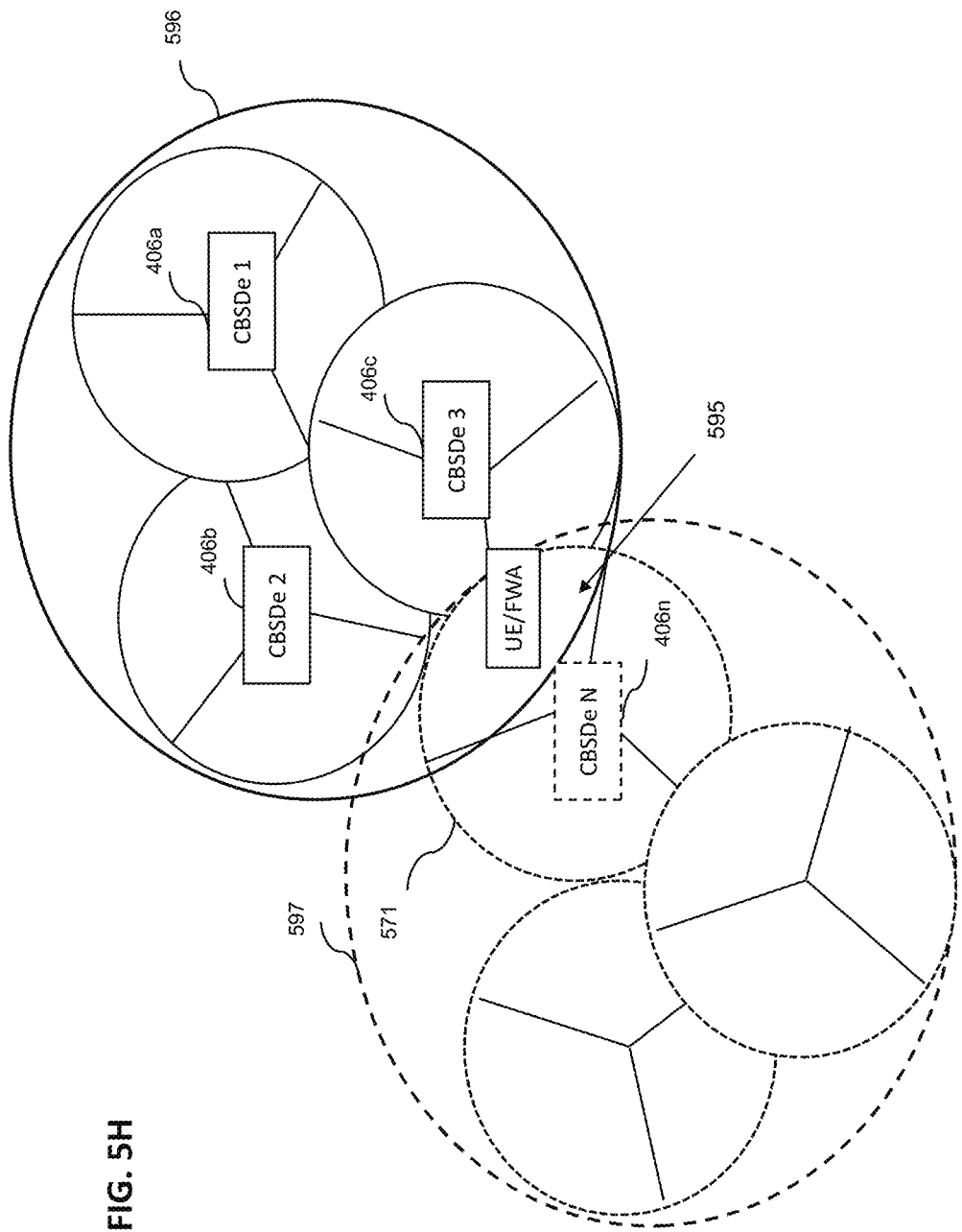
FIG. 5H is a graphical illustration showing the coverage areas and partial overlap between a first three-base station cluster and a second similar cluster, with one CBSDe having common membership by virtue of one or more individual sectors overlapping with one or more sectors of CBSDe(s) within another cluster.

It will also be recognized that normally, a CBSDe will not be part of two different virtual clusters. One way such "common membership" can arise is via individual CBSDe sector overlap. Specifically, in some implementations, each of the CBSDe devices has multiple sectors (e.g., 3 sectors of 120 degrees azimuth coverage each, as shown in FIG. 5H). Each sector covers a different effectively non-overlapping area within the total coverage area 571 of that CBSDe. As such, two sectors of the aforementioned CBSDe (e.g., CBSDe 406n in FIG. 5H) can be part of one virtual cluster 597, and the remaining sector 595 part of another virtual cluster 596. Note that each sector of the same CBSDe 406n will have a different PCI associated with it, and hence the VC model of the present disclosure also contemplates clustering based on PCI values (versus a per-CBSDe basis).

Hence, as shown in the example of FIG. 5H, the sector 596 of CBSDe N 406n oriented toward the other cluster 596 is logically grouped with the three 120-degree sectors of each of CBSDe 1 406a, CBSDe 2 406b, and CBSDe 3 406c of the other cluster 596, even though the other two sectors of CBSDe N are grouped with the first cluster 597.

It is noted that in the illustrated example, the coverage of sector 595 of CBSDe N and the coverage of two of the sectors of CBSDe 3 406c overlap, thereby allowing the UE/FWA 314 in FIG. 5H to be migrated between the two CBSDe's; however, such overlap is not a strict requirement for such cluster formations. For instance, the coverage of sector 595 of CBSDe N might not overlap with any of the sectors of CBSDe 3 or CBSDe 2, yet still maintain VC membership within the second cluster 596. For instance, the transmit power of the sector 595 may be adjusted so that coverage of desired service areas is obtained, yet with no real overlap (and hence minimized interference) with CBSDe 2 or CBSDe 3 of that cluster 596.

Moreover, it can be understood from the discussion above that individual sectors (versus entire CBSDe devices) can be considered "edge CBSD" devices as described elsewhere herein, and treated as such for purposes of e.g., load balancing or transmit power management.

It will be recognized that in each of the example configurations of FIGS. 5A-5H (and others), a mix of CBSDe and CBSD (non-enhanced) devices may be operated within the same network, and in fact even within a virtual cluster (VC). For instance, where a cluster maintains a sufficient number (depending on size/geometry) of enhanced CBSD 406, others of the VC population may be comprised of unenhanced CBSDs, such as e.g., the interior (non-edge) CBSDs, as (i) existence of these unenhanced devices can be determined by the CBSDe's in proximity thereto, and (ii) the CBSDs can be controlled in power by the SAS using prior art methods. As such, implementation of the architectures disclosed herein does not require a "blanket" upgrade or replacement of all CBSDs operating in a given network; rather, under one model, firmware upgrades to only a subset of CBSD devices to provide them with the enhanced capabilities of a CBSDe 406 may be performed.

Figure 6:
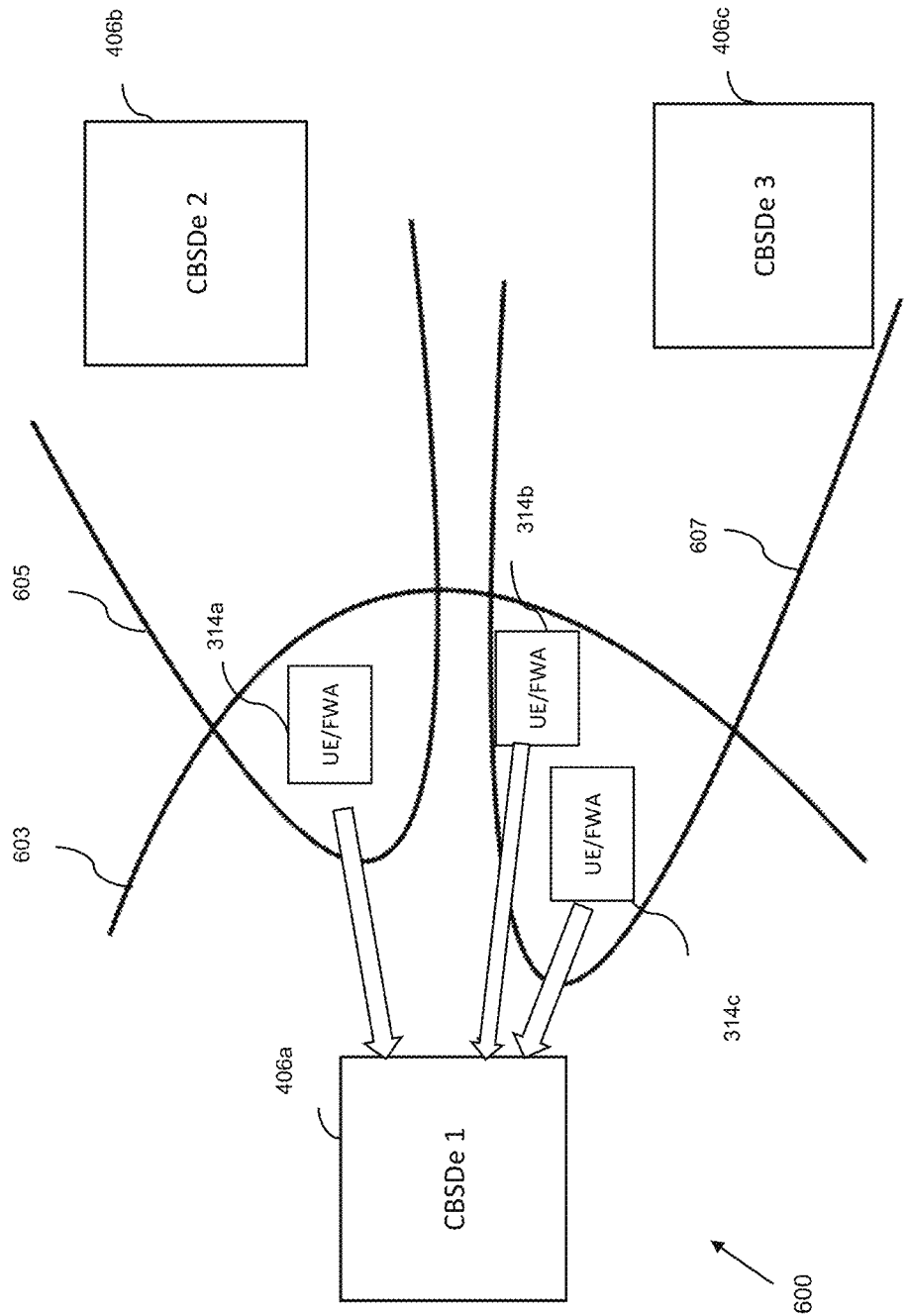
FIG. 6 is a graphical illustration showing UE traffic load balancing among three base stations with overlapping coverage, according to the present disclosure.

FIG. 6 is a graphical illustration showing UE traffic load balancing among three base stations with overlapping coverage, according to the present disclosure. In this example, CBSDe devices 2 and 3 406b, 406c of one cluster have respective coverage areas 605, 607, the areas which are located at the cluster edge, and are interfering with a CBSDe 1 406a having an overlapping coverage area 603. As shown, the UE?FWA 314a is located in the overlap between areas 603 and 605, and the UEs 314b, 314c located in the overlap between areas 603, 607, can be migrated and connected to CBSDe 1 406a. In one scenario, one or more of the UE/FWA devices 314 $d$ etect (and measure parameters associated with) the non-connected CBSDe devices and report such data to their host (connected) CBSDe devices. For instance, UE/FWA 314a can detect CBSDe 1 406a which it is initially not connected to, and report this detection to its host (CBSDe 2 406b). Similarly, UE/FWA 314b and nd 314c may detect CBSDe 1 406a and report to their host 9CBSDe 3 406c). After proper analysis, the SASe may responsively call for reduction of the transmit power of CBSDe 2 and 3 after the UE/FWA have all been migrated to CBSDe 1 406a. This approach intentionally collapses the overlap between areas 603 and 605, and similarly between areas 603 and 607, so as to mitigate interference, while also enabling load balancing of the UE/FWA's to CBSDe 1 (which may not have undergone any power reduction).

As previously noted, one primary attribute of the disclosure relates to its ability to balance the traffic load among the base stations (or individual sectors thereof) while mitigating the interference. Specifically, when the base stations have overlaps in their coverage areas, the UEs located in the overlap can experience high levels of interference from the other base stations (and thereby reduced data rates). It will be appreciated that depending on the type of antenna elements (e.g., directional or omni-directional) used in the base stations 406 (e.g., 406a, 406b, 406c), even a UE/FWA 314 located in the overlap area may not be able to achieve high data rates and high quality of performance if the antenna geometry of the base stations do not support it. As such, highly directional antenna elements may be utilized on the base stations (to mitigate the interference in the overlap area), and they are aligned to serve to the UEs in specific part of the cell (e.g., to form the elongated elliptical shapes shown in FIG. 6). In one implementation, the CBSDe devices 406 may also have "smart" antenna capability that can steer the antenna beam toward the desired target UE/FWA so as to maximize the received Signal-to-Interference-Plus-Noise in some part of the cell. This steering may be accomplished e.g., via beamforming techniques or so-called "massive MIMO" in 5G NR technology.

In another such implementation, the base stations 406 employing multiple directional antenna element technology are configured to measure the received signal (e.g., on an UL channel from a UE/FWA), and extract multipath wireless channel information relating to phase, amplitude and path loss from the received signal. Such information can be used to estimate the interference in the overlap area in such a way to form a directional beam towards the target area reducing the interference in the coverage overlap areas. Various other similar approaches for optimizing SINR or other signal-strength related parameters will be recognized by those of ordinary skill when given the present disclosure.

Methodology

Various methods and embodiments thereof for cluster-based interference management and load balancing via unlicensed or quasi-licensed (e.g., CBRS GAA or PAL)

spectrum according to the present disclosure are now described with respect to FIGS. 7-9A.

Figure 7:
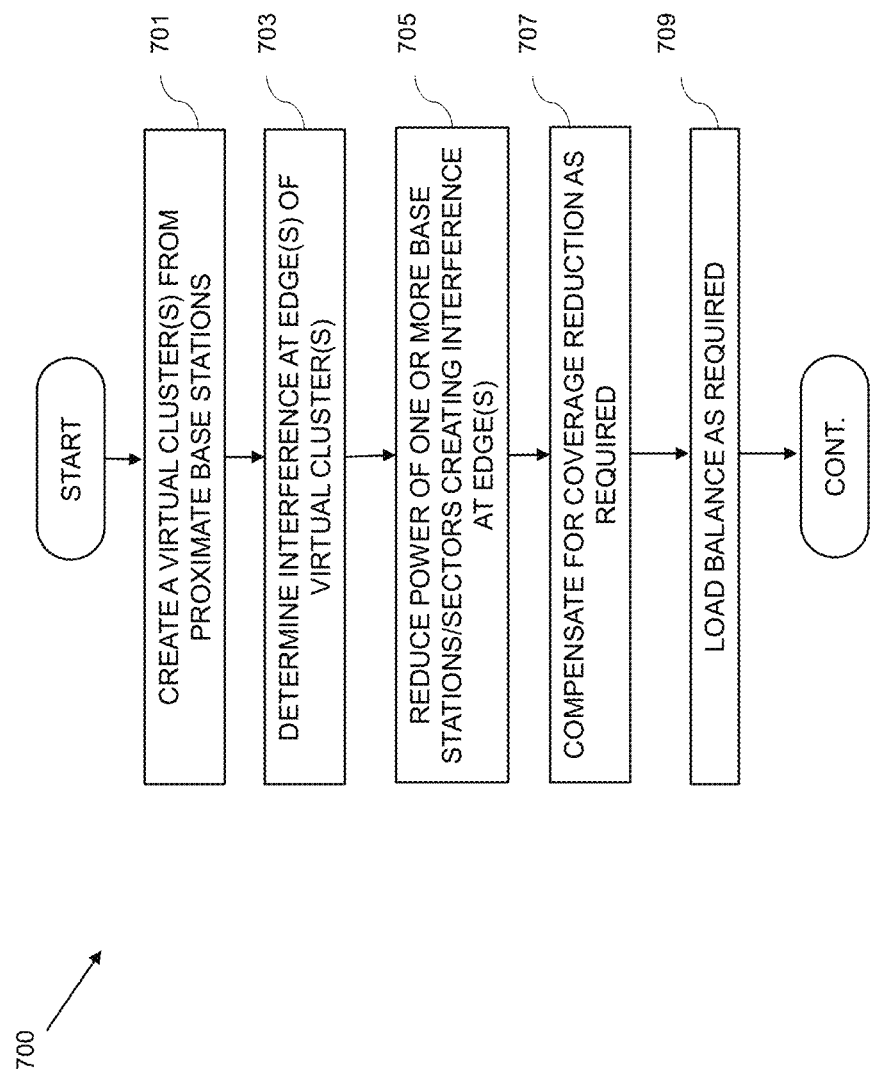
FIG. 7 is a logical flow diagram illustrating one embodiment of a generalized method for utilizing clusters for interference management according to the present disclosure.

FIG. 7 is a logical flow diagram illustrating one embodiment of a generalized method for utilizing clusters for interference management according to the present disclosure. As shown, the method 700 of FIG. 7 begins with first creating one or more virtual clusters (VCs) from proximate base stations per step 701. For instance, base stations which are disposed with one or more edges or points of contact can be considered immediately proximate for purposes of FIG. 7. As described in greater detail elsewhere herein, such proximity can be determined in any number of different ways, including UE/FWA-based reporting, geographic location data (e.g., lat/lon) analysis, and/or others.

Per step 703, interference is determined at one or edges of the formed cluster(s). For instance, the interference may be estimated such as via modeling (e.g., by the SASe 402), or actually measured/detected by e.g., CBSDe devices 406 or UE/FWA.

Per step 705, the transmit power of one or more base stations disposed at the edge of the cluster where the interference was estimated/detected is reduced, so as to mitigate the interference for at least one of the "conflicting" devices (which in reality may be both devices).

Per step 707, compensation for the reduction of coverage area resulting from the reduction of step 705 is performed (if required), such as by increasing power of an interior (non-edge) base station within the cluster. This compensation may be performed dynamically or transiently in some embodiments; e.g., to generate sufficient coverage overlap to enable handover of a user device from one base station to another, after which the overlap is collapsed.

Lastly, per step 709, any required load balancing is performed. In one embodiment, the load balancing is performed using methods and apparatus described in co-owned U.S. Patent Publication Nos. 20190394678A1 entitled "CAPACITY MANAGEMENT METHODS AND APPARATUS FOR USE IN A CITIZENS BROADBAND RADIO SERVICE NETWORK" and issued as U.S. Pat. No. 10,952,098 on Mar. 16, 2021, and 20200128540A1 entitled "METHODS AND APPARATUS FOR ESTIMATING WIRELESS NETWORK COVERAGE," and issued as U.S. Pat. No. 10,912,086 on Feb. 2, 2021, each of which is incorporated herein by reference in its entirety, although other methods and apparatus may be used consistent with the present disclosure.

Figure 8:
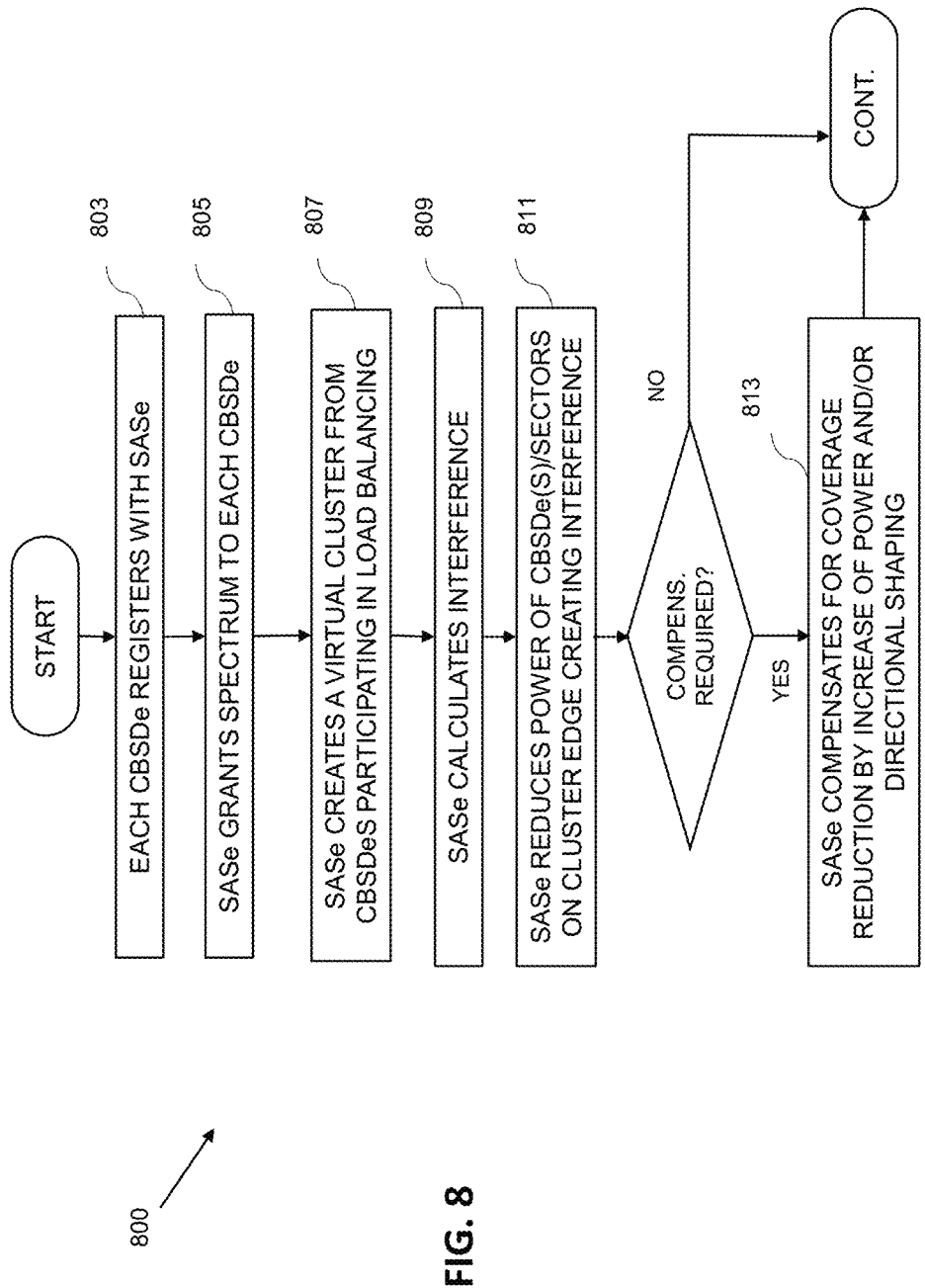
FIG. 8 is a logical flow diagram illustrating one exemplary implementation of the generalized method of FIG. 7, in the context of a CBRS-based system with enhanced SAS (SASe) and enhanced CBSD (CBSDe) devices.

FIG. 8 is a logical flow diagram illustrating one exemplary implementation of the generalized method of FIG. 7, in the context of a CBRS-based system with enhanced SAS (SASe) and enhanced CBSD (CBSDe) devices. As shown, in FIG. 8, the method 800 includes each CBSDe 406 (see FIG. 4) first registering with the cognizant SASe 402, according to known registration procedures within CBRS networks (step 803).

Next, per step 805, the SASe 402 grants spectrum (e.g., GAA or PAL) to each CBSDe with which each may operate. These bands may be the same as or different from those used by other CBSDe devices, but typically will have some level of diversity for load balancing purposes.

At step 807, the SASe (or a network proxy therefor) creates a virtual cluster comprised of neighboring CBSDe devices (including individual sectors thereof as applicable) within the network which are participating in load balancing. In some variants, each CBSDe may or may not participate in load balancing based on one or more factors (e.g., its own current load, presence of a neighboring CBSDe with frequency diversity, etc.), and may affirmatively opt in or out of the clustering process. This decision may also be made on behalf of the CBSDe by a network (e.g., MSO or MNO) proxy process which decides whether each individual CBSDe is properly included within load balancing at that point in time.

At step 809, the SASe 402 determines interference for the participating CBSDe devices 406. This determination may be (i) estimated, such as based on path loss modeling for the known spatial relationships between the various CBSDe devices (including distance between them, presence of topological or other features, extant transmit power levels and frequencies, etc.) as described in greater detail subsequently herein, and/or (ii) measured, such as by way of actual SINK, iPerf (i.e., packet throughput), BER/PER, or other measurements taken at a given CBSDe (or supplied by served UE/FWA). The interference is in one embodiment determined with respect to one or more other CBSDe devices external to the cluster (i.e., an adjacent CBSDe operating individually or in another cluster), but intra-cluster interference level (e.g., between two edge CBSDe devices in the same cluster) may also be determined.

Per step 811, the SASe directs one or more CBSDe devices on the edge of the established VC (or individual sectors thereof) to reduce transmit power in order to mitigate the determined interference. This may include for instance a step-wise reduction and evaluation process; e.g., reduce power in a first increment, evaluate interference or data throughput via actual measurements, and then continue reductions as required.

Moreover, the power of each of the CBSDe devices experiencing interference may also be reduced concurrently. In that two (or more) CBSDe devices may each interfere with one another when transmitting (for instance, where their respective transmit power levels are roughly equivalent) due to assumed symmetric path loss models, satisfactory reduction of interference may require that both devices reduce transmit power. Similarly, for three interfering CBSDe devices, reduction of power for all three may be needed.

As can be appreciated, such reduction(s) of power can produce significantly reduced coverage areas for each reduced CBSDe, including loss of overlap with its neighbors. While this may help with e.g., interference with respect to a neighboring cluster edge, it may reduce or even eliminate opportunities for load balancing within that cluster. As such per step 813 of the method 800, the SASe compensates for such coverage reduction (as needed) by boosting transmit power levels associated with one or more interior cluster cells, and/or use of directional shaping of certain cells as previously described. Note that the compensation of step 813 may in some case be required only on a transient basis; e.g., to create sufficient overlap for UE/FWA handover, after which the power increase and/or shaping can be reduced so as to limit interference while still maintaining sufficient signal level at the receiving UE/FWA devices being served by the affected CBSDe devices.

It will also be recognized that under the exemplary 3GPP protocols used herein, various features such as UE data collection and load balancing transfers can be performed either in "idle" mode or in "connected" mode, thereby adding operational flexibility.

Figure 8A:
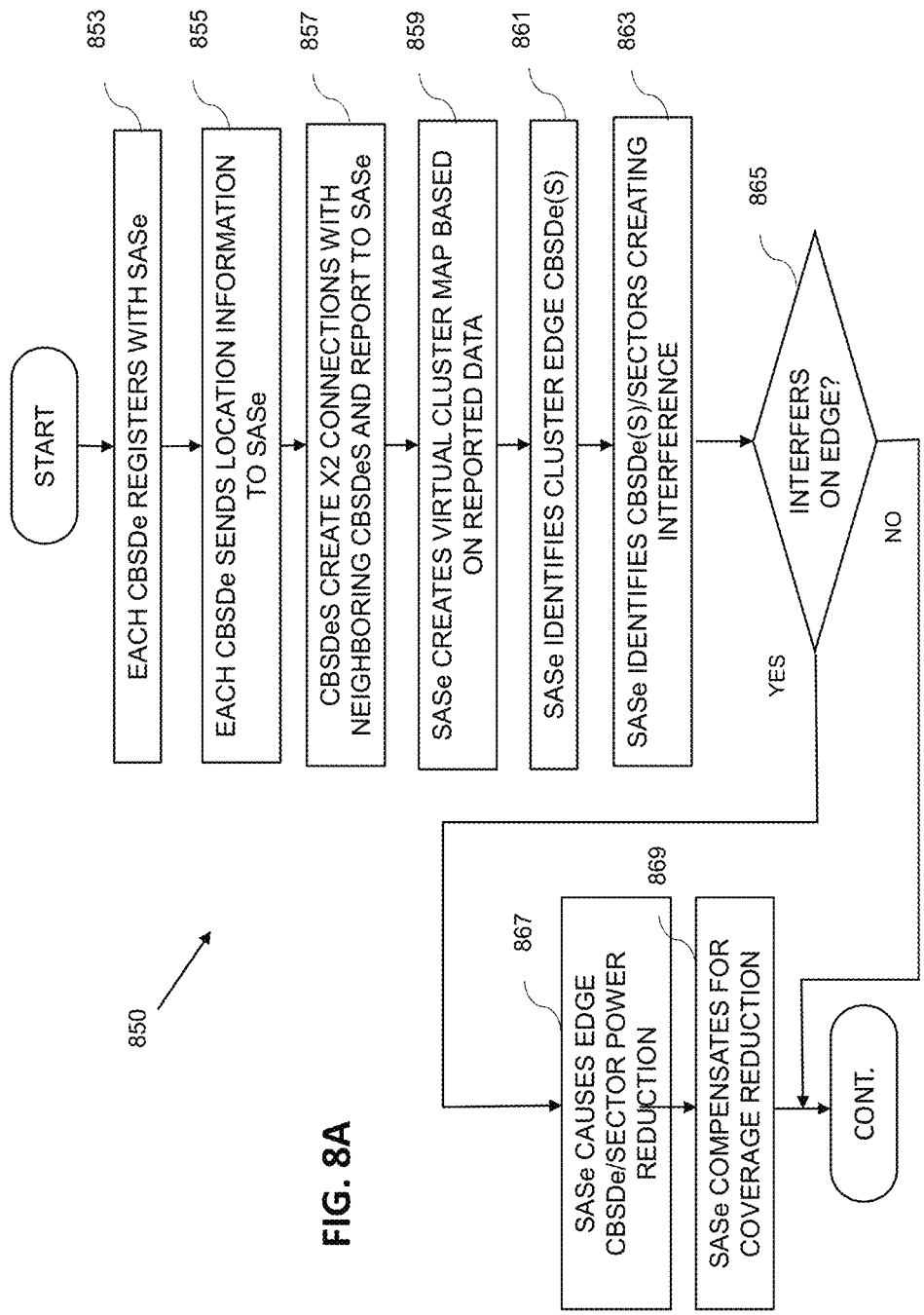
FIG. 8A is a logical flow diagram illustrating one specific variant of the method of FIG. 8.

FIG. 8A is a logical flow diagram illustrating one specific variant of the method of FIG. 8. In this method 850, the CBSDe devices each register with the SASe per step 853, and sends it location information to the SASe per step 855. Per step 857, each participating CBSDe also creates X2 connections with its neighboring CBSDe devices (i.e., those geographically proximate to it, as determined by e.g., the mechanisms described subsequently herein with respect to step 909 of FIG. 9) to support data exchange between the CBSDe devices, and such data is reported to the SASe.

Based on the location and other data reported to the SASe 402, the SASe creates per step 859 a virtual cluster map which groups two or more adjacent CBSDe devices into VCs within a given operating area or region. As discussed with respect to FIGS. 5A-5G supra, each of the VCs may comprise different numbers of CBDE's, different shapes, and each may or may not be contiguous with other VCs (e.g., some may merely be VC "islands" in a broader array of non-clustered CBSDe devices).

Per step 861, the SASe identifies cluster edge CBSDe devices, and per step 863, identifies instances of one-way or two-way interference (i.e., where only one CBSDe or sector interferes with another, but not vice versa, or mutual interference, respectively, such as via the modeling and/or measurements previously described. If the identified CBSDe interferers are disposed ion a VC edge per step 865, the SASe implements a power reduction (step 867) and compensation (step 869) such as interior cell power increase or directional coverage area shaping.

FIG. 9 is a logical flow diagram illustrating another exemplary implementation of the generalized method of FIG. 7, in the context of a CBRS-based system with enhanced SAS (SASe) and enhanced CBSD (CBSDe) devices.

At step 903 of the method 900, each CBSDe sends registration request data to the SASe 402; if the SASe approves the registration request, it responds to each CBS-DeB with a CBSD ID, and registers the CBSDe(s).

Per step 905, once the CBSDe devices are registered with the SASe, each sends the SAS its latitude and longitude information or other positional data enabling the SASe to determine its location (e.g., data such as azimuth of two or more other CBSDe devices or landmarks enabling triangulation). As can be appreciated, the location data may also be sent as part of the registration request.

Per step 907, after the SASe receives the position information from the CBSDe devices, the SASe allocates one or more PAL or GAA frequency channels to each CBSDe. The SASe response includes detailed information about the frequencies that are available for each CBSDe to use, and may include additional information which might be useful to the CBSDe when it selects a frequency range to utilize (such as an initial transmission power level). In one variant, the initial power level is selected based on (i) the maximum power allowed for the category (e.g., Category A or B as previously described herein), such that the power does not exceed such level, and (ii) its operational condition (e.g., initial post-installation startup, reboot, etc.). For example, in one such approach, the CBSDe includes logic which determines operational state (such as via one or more values loaded into registers on the CPSDe CPU or BB processor), and based on the determined state value, accesses a LUT or similar data structure to determine the appropriate "initial" power setting (none of which exceed its then-prevailing category limit).

Per step 909, each CBSDe creates an X2 connection with its neighbor CBSDe devices. The X2 interface is a peer-to-peer connection, and allows the CBSDe devices to share information related to e.g., load-balancing and management. For example, in one embodiment, load-balancing evaluation data (i.e., that needed to assess whether to move one or more UE/FWA devices 314 between CBSDe devices) and control/transfer data may be transacted over the X2 interface. In one variant, the X2 interface is implemented via the backhaul network of the MxO such as via a GbE or similar Layer 2/3 protocol, although other approaches may be used with equal success.

Various mechanisms can be used for determination of "neighbor" CBSD/CBSDe devices for a given CBSDe. In one approach, each CBSD/CBSDe maintains a neighbor list which lists the first-tier (i.e., immediately contiguous) neighbors of that device. This list can for example either be created manually (such as by the MSO at time of installation), or via use UE-based measurement reports as described elsewhere herein. For instance, a UE reports the PCI values of CBSDs that the UE can detect, and these reported PCI values are sent to core network by the CBSDe in order to obtain the IP address of the CBSD/CBSDe that transmits the given PCI (e.g., via a LUT or correlation process of the network which relates known CBSDs to then-assigned IP addresses, which notably may be either static or dynamically varied). In response to the look-up request, the core network sends the IP address for each requested PCI value back to the requesting CBSDe, and that CBSDe connects to the other (detected) CBSD/CBSDe using the provided IP address (once the X2 connection is established).

Per step 911, each CBSDe notifies the SASe whether it participates in traffic load balancing, such as by sending its unique identification data to a designated port/socket or API on the SASe. Alternatively, the SASe may poll CBSDe devices within a given area to determine if they are eligible to participate in load balancing, or an MSO node may inform the SASe on behalf of a group of CBSDe devices (e.g., via table or IE listing the participating CBSDe ID values) and a time window for eligibility. Myriad other approaches will be evident to those of ordinary skill given the present disclosure.

Per step 913, the SASe records each CBSDe participating in the traffic load balancing, and creates one or more VCs from the CBSDe devices (or individual sectors thereof) participating in the load balancing. It will be appreciated that the load balancing may be geographically or topologically restricted within the network, and as such the SASe may in some embodiments only consider limited subsets of the entire population feasibly available for load balancing at any given time when creating or configuring (including even tearing down) VCs. For instance, even though say thirty (30) CBSDe devices may be eligible for participating, the SASe may select a subset of only 15 for inclusion with one or more VCs at any given time, based on its analytical capabilities, the "optimum" size of a VC (from an efficacy or efficiency standpoint), and/or other factors.

Per step 915, each CBSDe notifies one or more UE/FWAs inside of its coverage area to report the Physical Cell Identities (PCI) of each other CBSDe/sector that each UE/FWA can measure. This data is reported back by the serving (connected) CBSDe 406 to the SASe 402. The latter which can use the data to identify proximate CBSDe devices for the serving CBSDe, including those which may be interfering or have overlap. For example, if a group of spatially proximate UE/FWA devices report a given PCI, then it can be presumed that the detected CBSDe is sufficiently proximate to the serving CBSDe, and has at least some degree of coverage overlap (i.e., if its signal can be detected it is at least sufficiently proximate to the serving CBSDe such that the UE/FWA could feasibly hand over to it at its current power level). Hence, in one approach, overlap can be presumed based simply on detection of a CBSDe. More sophisticated approaches may utilize e.g., curve-fitting for coverage area functions (e.g., based on "hits" or detection by multiple UE/FWA at different locations), the SASe can computationally determine a best-fit function representative of the coverage area, which may be in some cases an irregular shape in contrast to the simplified representations presented as examples herein.

It will be appreciated that the foregoing request/detect/reporting cycle can be conducted once, or repetitively or iteratively by UE/FWA devices, whether simultaneously or in sequence. Temporal coherence between UEs (i.e., reporting at roughly the same time) may be important for some classes of UE such as mobile devices, wherein their ability to detect a given CBSDe may vary with time.

It will also be appreciated that the foregoing detection can be used to validate cluster maps and/or path loss models or estimates generated by the SASe (or MSO proxy). For example, a SASe estimate may indicate the presence of an overlap area between two cells of a cluster; however, if an UE/FWA disposed within the putative overlap area cannot actually detect the second (non-connected) CBSDe, such as due to an atmospheric effect, topological feature, or other condition not properly accounted for within the modeling, then the model may be adjusted, and/or the calculated overlap area reduced. As such, the UE/FWA 314 can act as in situ detectors for the SASe when constructing cluster maps and performing/updating path loss estimates.

Returning again to FIG. 9, per step 917, once the UE/FWAs detect the PCIs (and any other data requested by the serving CBSDe), they report the collected data to their serving CBSDe.

Per step 919, once the CBSDe devices receive the PCIs from the UEs, and then report them to the SASe.

Per step 921, after the SASe receives the reported PCI from the CBSDe devices, it creates a network overlap map. In one embodiment, the map includes data indicative of (i) each CBSDe location, and (ii) coverage area of each CBSDe, based on a presumed or initial transmitter power level. It will be appreciated that this "map" may take any number of different forms, and may vary from quite simple to more detailed. For instance, in one variant, the map comprises a table or listing of each CBSDe, associated PCI, location (e.g., lat/lon), and a radius of coverage (e.g., in km) for a presumed power level (or sets of levels). Overlap can be calculated using readily known geometric/spatial relationships and equations, such as calculating the points of intersection of the two coverage area equations ($r_i^2 = x_i^2 + y_i^2$) centered at respective CBSDe locations. Exemplary methods and apparatus for determining wireless coverage area, power headroom, and other useful data are described in co-owned U.S. Pat. No. 10,368,351 issued Jul. 30, 2019 and entitled "METHODS AND APPARATUS FOR ESTIMATING CITIZENS BROADBAND RADIO SERVICE NETWORK COVERAGE", incorporated herein by reference in its entirety, although it will be recognized that other techniques and apparatus may be used consistent with the disclosure, the foregoing being merely illustrative.

Per step 923, the SASe estimates the interference from the CBSDe devices located at cluster edge on the neighbor cells or clusters in the network. Estimated SINR levels may be mapped for each location based on the calculated path loss and assumed transmitter power, treating the other CBSDe(s) as interferers for a given CBSDe being evaluated. More sophisticated approaches may be used as well (including multivariate modeling), consideration of topological features, known in-band emitters which may act as noise sources, etc. In some embodiment, the SASe receives the wireless propagation channels information from the CBSDe devices (e.g., phase amplitude, path loss), and estimates the interference based at least in part on these parameters.

Per step 924, the SASe compares the interference level with one or more criteria (e.g., a maximum threshold), and if interference is higher than the threshold, the method 900 proceeds to step 925, wherein a mechanism to mitigate the interference is employed.

For instance, in the illustrated embodiment, per step 925, the SASe may signal the edge CBSDe devices causing the interference to reduce power. This may in some embodiments be a "blanket" reduction; i.e., across all energized sectors of that CBSDe. Alternatively, the SASe may cause the edge CBSDe devices to adjust the shape of their coverage area, such as via reduction of power only on certain sectors; i.e., those "pointing" in azimuth towards the external cluster(s) experiencing the interference. The SASe may also implement a "trial and error" or other scheme to determine the effects on interference from incremental step reductions on various CBSDe sectors, whether singularly or in combination with others.

Per step 927, to account for any lost coverage area from power reduction that needs to be compensated, the SASe increase the coverage area of the neighboring cells (e.g., one within the same cluster adjacent to the cell(s) for which power was reduced. This may include compensation for two or more adjacent cells within the cluster (e.g., those on either side of the reduced cell), and may also include interior or non-edge cells within the cluster (if any). Directional shaping may also be used where possible to alter the shape of the coverage area, such as to achieve (i) closing of any gaps left in the coverage area of the power-reduced CBSDe, so as to avoid "stranding" of UE/FWA in such areas, and/or (ii) creating a desired overlap between two or more cells so as to facilitate load balancing or other functions which require such overlap.

Per step 929, after the coverage optimization is performed at step 927, the relevant CBSDe(s) instruct the UE/FWA to which they are connected to again measure the neighboring CBSDe signals, and report the detected PCI and other data for forwarding to the SASe at step 931. It will be appreciated that targeted subsets of the UE/FWA may be used for such purposes; e.g., those known to reside within a prescribed sector of the adjusted CBSDe, whether based on connection/association with that sector, or known location (e.g., via lat/lon data from time of installation). For instance, in one variant, the SASe 402 may instruct the adjusted CBSDe to poll specific UE/FWA devices only, or the CBSDe may simply issue a broadcast or blanket request to all served UE/FWA. As another alternative, only UE/FWA slated for transfer to another serving CBSDe (e.g., by way of load balancing) may be selected to report PCI and related data. Many such variants will be recognized by those of ordinary skill given the present disclosure.

Lastly, per step 935, the SASe updates its network overlap "map" according to the updated CBSDe detection data as correlated to various locations within the coverage area(s).

Figure 9A:
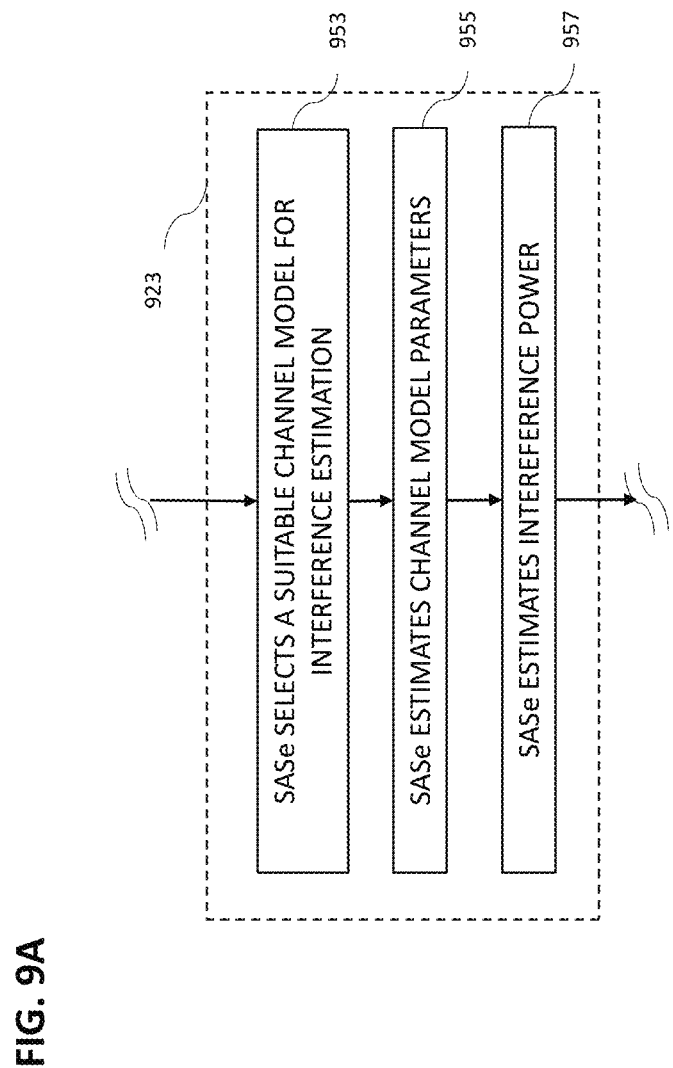
FIG. 9A is a logical flow diagram illustrating one exemplary variant of the method of FIG. 9.

Referring now to FIG. 9A, one specific implementation of step 923 of FIG. 9 (i.e., to estimate the interference in cluster edge) according to the present disclosure is shown and described.

As a brief aside, a short discussion on path loss propagation models is useful at this juncture.

Path Loss models are used to predict large-scale coverage for wireless communication system design, implementation and deployment. By using path loss models, processes such as the CPE/FWA 507 can estimate the received power as a function of e.g., distance, and can predict the SINR which should be achievable from e.g., certain sector of a CBSD transmitting at a certain power level.

The propagation models used generally indicate that average received signal power decreases logarithmically with the distance between transmitter and receiver. A path loss model for an arbitrary transmitter receiver separation can be expressed as a function of distance, and an exponent, n as in Eqn. (1):

$$PL(dB) = PL(d0) + 10n\log\left(\frac{d}{d0}\right) \qquad \text{Eqn. (1)}$$

Where:

n is the path loss exponent which indicates the rate at which path loss increases with distance;

d0 is the close-in reference distance; and d is the transmitter receiver distance.

Equation (1) shows that the power decreases proportional to $(1/d)^n$, as the distance d between transmitter and receiver increases. The exponent n depends on the specific propagation environment. Table 4 shows exemplary values of the exponent n for different environments.

TABLE 4

| Environment | Path Loss Exponent n |
|---|---|
| Free Space | 2 |
| Urban Area | 2.7 to 3.5 |
| Shadowed Urban Area | 3 to 5 |
| In Building Line-of-Sight | 1.6 to 1.8 |
| Obstructed in Building | 4 to 6 |
| Obstructed in Factories | 2 to 3 |

The reference model of Eqn. (1) is defined via field measurement at distance d0 from the transmitter.

Log-Normal Shadowing

The model in Eqn. (1) does not consider the fact the propagation environment can have different propagation characteristic. Therefore, in some scenarios where the environment surrounding transmitter and receiver are different, the estimated power from Eqn. (1) is vastly different than the measured signal. As the measurement in the field has shown, the path loss PL(d) at distance d from a transmitter is random has a log-normal distribution as defined by Eqns. (2) and (3):

$$PL(d) = PL(d0) + 10n\log\left(\frac{d}{d0}\right) + X\sigma \qquad \text{Eqn. (2)}$$

where $X\sigma$ is a zero-mean Gaussian random variable with standard deviation $\sigma$, and $$P_{RX}(d) = P_{TX}(d0) - PL(d) \qquad \text{Eqn. (3)}$$

The log-normal distribution describes the shadowing effects which occur in in applications which have the same transmitter receiver distance, but have different propagation environments such as different presence of obstacles (e.g., building, mountains, towers). The close-in reference distance d0, the path loss exponent n, and the standard deviation $\sigma$ define the path loss model for transmitter receiver separation distance d. The path-loss model of Eqn. (2) can be used to estimate the received power from a given CBSD 206 at the CPE/FWA antenna elements 723.

Table 5 below shows exemplary path loss exponent n values and shadowing standard variation $\sigma$ for different environments based on measurements, reported in "*Wireless and Cellular Communications*", Thomas Schwengler, First Edition, Dec. 2019 which is incorporated here herein by reference in its entirety.

TABLE 5

| Source | Frequency (GHz) | Path Loss Exponent n | σ(dB) | Comments |
|---|---|---|---|---|
| Seidel | 0.9 | 2.8 | 2.8 | Suburban |
| Erceg | 1.9 | 4.0 | 4.0 | Terrain category |
| Feuerstein | 1.9 | 2.6 | 2.6 | Medium Antenna height |
| Abhayawardhana | 3.5 | 2.13 | 2.13 | |
| Durgin | 5.8 | 2.93 | 2.93 | Residential |
| Porter | 3.7 | 3.2 | 3.2 | |
| Rautianinen | 5.3 | 4.0 | 4.0 | |
| Schwengler | 5.8 | 2.0 | 3.5 | LOS |
| | 5.8 | 3.5 | 9.5 | NLOS |
| | 3.5 | 2.7 | 11.7 | Near LOS |

The n and $\sigma$ values depend on different propagation environments (e.g., downtown, urban, rural) and operating frequencies as specified in Tables 1-2 above. The values n and $\sigma$ are initially determined at the time of the installation according to propagation environment as specified in Table 1-2. However, since the propagation environment may change, embodiment of the CPE/FWA 507 may dynamically perform parameter estimation and update n and $\sigma$ values during e.g., the training period of the received data frame, and report the new values to the SASe 802. The value PL(d0) is generally a fixed value, and is measured at the time of installation of CPE/FWA in close-in measurement at distance d0 from transmitter, such as by an installer or other approach.

Exemplary path loss models which may be used consistent with the present disclosure are also described in co-owned U.S. patent application Ser. No. 16/214, 070 filed Dec. 8, 2018 entitled "METHODS AND APPARATUS FOR TRANSMISSION POWER MANAGEMENT OF CITIZEN BROADBAND SERVICE," and issued as U.S. Pat. No. 10,764,841 on Sep. 1, 2020, and Ser. No. 16/221951 filed Dec. 17, 2018 and entitled "PRIORITY ACCESS LICENSE HOLDER," and U.S. Pat. No. 10,368,351 issued Jul. 30, 2019 and entitled "METHODS AND APPARATUS FOR ESTIMATING CITIZENS BROADBAND SERVICE NETWORK COVERAGE," each of the foregoing incorporated herein by reference in its entirety, although other approaches may be used consistent with the present disclosure.

Returning to FIG. 9A, at step 953, the SASe 402 selects a path loss model to use in modeling the effect of interference, such as from the cluster edge CBSDe devices on a neighboring cluster/cell. For instance, in one embodiment, the SASe selects the pass loss model based on analyzing the measurement data stored in its local database (or a network accessible database), and determines which models best fit the propagation environment characteristics. For example, evaluation algorithms might evaluate a predetermined (limited) set of parameters for each candidate model from a plurality of candidate models, based on in situ data obtained by the SASe (such as that reported by the individual CBSDe devices).

It will be appreciated that different models may be selected for different applications and contexts; for example, one model may be better suited to propagation characteristics in one geographic service area of a given geographic region (such as one with hills and valleys) as compared to another service area within the same region (e.g., one that is largely flat and backs up to a large body of water). At step 955, the SASe estimates the path loss model parameters for use with the model, including e.g., distance between the two nodes (e.g., two CBSDe devices) being modeled, exponent n, variance σ, etc., or retrieves these from a database of such data. The model parameters are estimated in one embodiment by application of curve fitting method that minimizes the mean error between the estimated values and real (measured) values. The distance d between transmitter and receiver is estimated from e.g., sounding reference signals, or can be determined by way of data provided to the SASe or the MSO proxy by the MSO core (the latter having knowledge of its own CBSDe placements) and the location of the CBSDe devices—e.g., via use of lat/lon data for both devices to determine straight-line distance.

Various aspects of the foregoing analysis and model/parameter selection can be performed by algorithms resident on the SASe (such as stored in program memory or mass storage), and/or can be offloaded in whole or part to e.g., cloud processes, including in more sophisticated approaches such as those based on ML or DL (machine learning or deep learning), whether within an MSO compute environment or an external cloud process such as AWS or Azure. As such, the MSO may also build their own more detailed or customized path loss models and parameter sets for its own CBSDe devices, rather than relying on more generic models which may be provided by the SASe 402 in some cases.

Lastly, per step 957 of the method of FIG. 9A, the SASe then calculates the interference power affecting the neighboring cluster/cell based on the model at step 957. For instance, this interference level might be determined via calculation of SINR values at each CBSDe pair (or group) being modeled, and/or at other locations of interest within each coverage area, with each CBSDe device's signal being modeled as "noise" relative to the other. As but one alternative, the SASe may develop a "heat map" or plot of SINR as a function of radius from each CBSDe under evaluation (e.g., two edge CBSDe devices) at prescribed transmission power levels; to the degree that any portions of the plot fall below minimum acceptable SINR values for UE/FWA which may be operating in those areas, the transmit power of the putative interferer is reduced and the effect on SINR for the given area of the coverage of the "interfered with" CBSDe evaluated until acceptable results (at least optimized for certain minimum power or other constraints) are achieved.

It will also be appreciated that the path loss model parameters depend on wireless channel characteristics, and are defined (primarily) at the time of the installation. Once a new CBSDe is installed, it performs an initialization process to determine the path loss model parameters. The CBSDe measures the reference signals to estimate its specific wireless channel information and path loss parameters. Since the SASe maintains data on the CBSDe transmit power, it utilizes the associated path loss model to estimate the interference power from this CBSDe on the neighboring cluster/cell.

Moreover, the CBSDe devices (as well as UE/FWA devices connected thereto) may also be configured to utilize one or more signals indigenous within the underlying air interface protocols (e.g., 3GPP LTE/LTE-A or 5G NR in the exemplary configurations) to assess signal quality (and hence interference level) for a given sector or at a given location within a coverage area, such as the CRS (cell-specific reference signal). As a brief aside, reference signals such as CRS in LTE support various functions, including channel estimation for MIMO decoding (demodulation), determination of PM/COI/RI feedback, and determination of multi-user resource allocation (scheduling). In a downlink (DL), the cell-specific reference signals (CRS) are transmitted by the xNB on unique resource elements for each antenna port, and are allocated in frequency and time. Since the CRS for each antenna port are mutually orthogonal to one another, channel estimation techniques such as interpolation can be used to determine estimates for the MIMO channel. This channel estimate can be used to derive PMI, CQI and RI feedback to determine the transmission scheme, and additional CQI reports may be requested from a given CPE/FWA by the xNB (CBSDe) for the purpose of multi-user scheduling.

Hence, the mechanisms for assessing channel quality present within for example the underlying LTE (or 5G NR) protocols may be leveraged by the logic of the CBSDe in gathering information for subsequent evaluation/analysis by the SASe 402 or MSO proxy process. For instance, a CBSDe may cause its connected UE/FWA to make channel measurements and provide such data back to the CBSDe for reporting to, and utilization by, the SASe in channel modeling or interference determination assessments, as well as development of the aforementioned heat map.

It will further be appreciated that while the SASe estimates the effect of the interference outside of or on an edge of a cluster in the embodiment of FIG. 9A, it does not need to estimate any interference inside the VC. In effect, interior regions of the VC are isolated from the SASe analysis, thereby allowing load-balancing or other overlap-related considerations to dominate.

It will be recognized that the foregoing approach also advantageously allows for a very low-overhead and efficient mechanism by which to both optimize coverage area (and hence served user count), and balance the traffic load among the participating CBSDe devices. Specifically, using an interference power estimation mechanism in the exemplary embodiments obviates more sophisticated analyses of channel conditions; the transmission power levels of the various CBSDe devices (known to the SASe) are readily determined and used in the pre-defined model in the SASe or MSO proxy node to estimate the interference level, and decide whether any coverage area optimization is required. In low-load environments (e.g., at off-peak times of day), no VC creation/optimization or load balancing may be used in certain parts of the infrastructure, or if used, it readily may be dynamically adjusted.

Figure 10A:
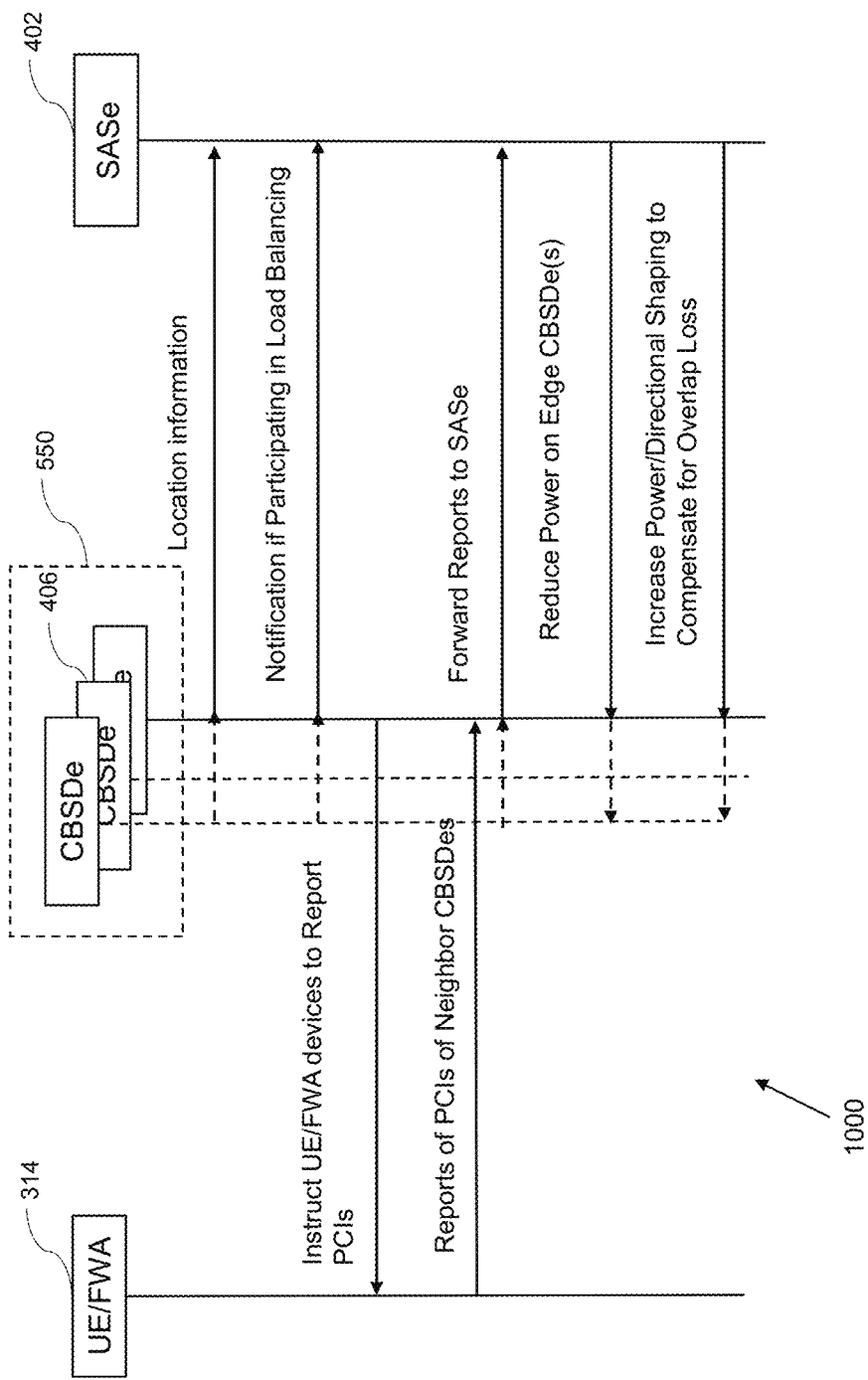
FIG. 10A is a ladder diagram illustrating one embodiment of a communication flow between one or more UE, enhanced SAS (SASe), and one or more enhanced CBSDs (CBSD e).

FIG. 10A is a ladder diagram illustrating one embodiment of a communication flow 1000 between one or more UE/FWA 314, enhanced SAS (SASe) 402, and one or more enhanced CBSDs (CBSDe) 406 within a cluster. In this flow, the enhanced SAS (SASe) 402 is configured to receive data from the individual CBSDe devices, including requests for participation in load balancing, and perform the above-described processes relating to overlap map generation, path loss estimation, power reduction, and compensation.

Figure 10B:
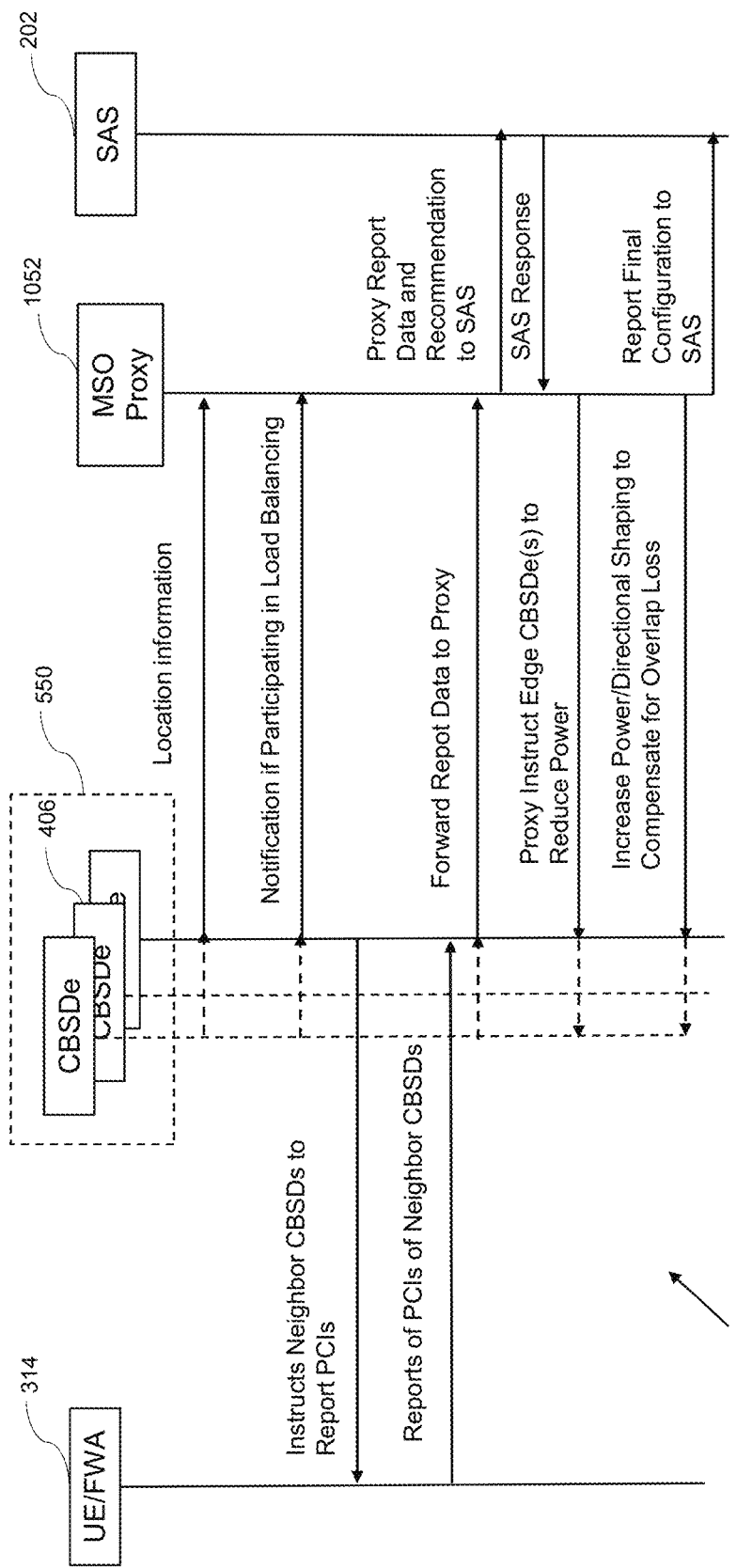
FIG. 10B is a ladder diagram illustrating another embodiment of a communication flow between one or more UE, unenhanced SAS, MxO Proxy, and one or more enhanced CBSDs (CBSDe).

FIG. 10B is a ladder diagram illustrating another embodiment of a communication flow 1050 between one or more UE/FWA, an unenhanced SAS 202, an MxO Proxy 1052, and one or more enhanced CBSDs (CBSDe) 406. In this model, the fact that a common entity (e.g., MxO, such as a cable MSO or an MNO) may operate all relevant equipment including the CBSDe devices and UE/FWA 314, and as such has detailed knowledge of each's position (for fixed devices) at any time, as well as other information such as blocked sectors (due to e.g., building facade installation), types of antennas (e.g., sectorized/omnidirectional), elevation, etc. which may allow the MxO to implement more precise path loss models. In that a s given SAS 202 may be cognizant over multiple different operator's networks, and/or may not have detailed information (at least to the level the installing/ operating MxO does), the approach of FIG. 10B contemplates use of an MxO network-side entity (e.g., a SAS proxy) 1052 with which the various CBSDe (and SAS 202) can communicate. In one variant, the Proxy 1052 includes functions such as data collection, determination of load balancing pool population, cluster formation and management, and power change and directional shaping determination, akin to the enhanced SASe of FIG. 10A. This offloads such responsibility/complexity from the SAS 202, and may provide better accuracy and performance due to the enhanced level of data available to the Proxy. In one implementation, the Proxy 1052 generates recommendations or requests to the SAS based on its generated calculations and estimates, and submits these to the SAS 202 for approval. This process, while shown as a single step in FIG. 10B, may be iterative in nature (e.g., a negotiation), with subsequent step s being based on completion of prior ones (e.g., such that the SAS can evaluate any repercussions of a given proposal/request, and implement changes in an incremental fashion). Using this architecture 1050, the load balancing and cluster formation may be completely invisible to the SAS; the SAS is unaware of the cluster logical abstraction or relationships created by the MxO in support of load balancing.

SASe Apparatus

Figure 11:
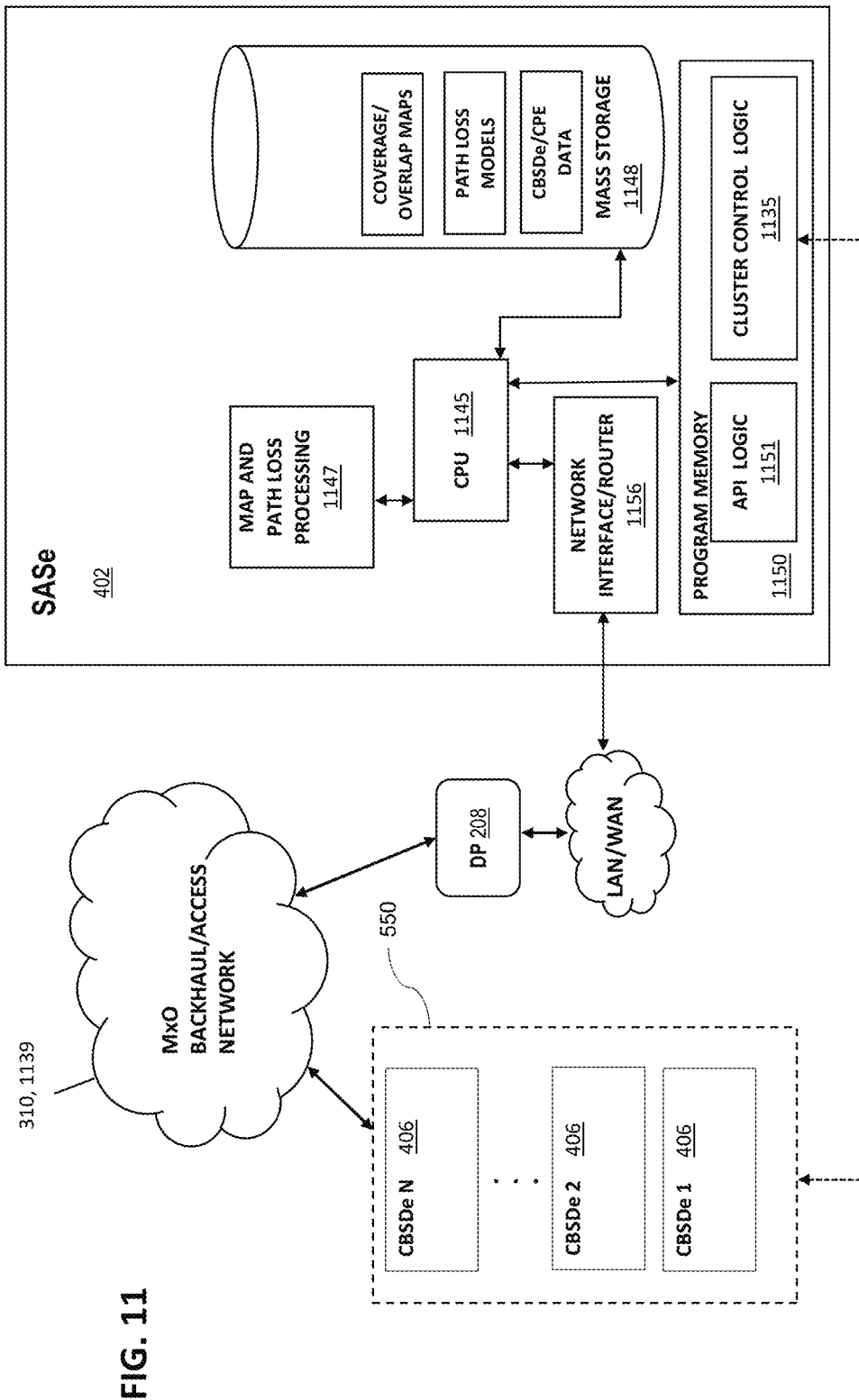
FIG. 11 is a block diagram illustrating one exemplary embodiment of SASe apparatus with cluster/interference management functionality according to the present disclosure.

FIG. 11 is a block diagram illustrating one exemplary embodiment of SASe apparatus with cluster/interference management functionality according to the present disclosure. In the illustrated variant, the SASe device 402 includes, a processor apparatus or subsystem 1145, a program memory module 1150, mass storage 1148 (e.g., HDD, SSD such as NAND-based flash memory, or other), cluster control logic 1135, map and path loss estimation module 1147, and network interfaces 1156 for communication with e.g., CBSDe 406, DP 208 (if any), and the MSO access network 310 and backhaul network 1139.

In the exemplary embodiment, the processor 1145 may include one or more of a CPU (e.g., multi-core CPU), digital signal processor, RISC core, microprocessor, field-programmable gate array, GPU, and/or plurality of processing components mounted on one or more substrates. The processor may also comprise an internal cache memory, and is in communication with a memory subsystem 1150, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 1145 or other data.

The processor 1145 is configured to execute at least one computer program stored in memory 1150 (e.g., a non-transitory computer readable storage medium); in the illustrated embodiment, such programs include logic to implement the cluster control (formation, modification, teardown, etc.) functions, as well as API logic 1151 which enables external devices such as the CBSDe devices or MxO network processes to access data from the SASe via application programming interface (API) calls. Other embodiments may implement such functionality within dedicated hardware, logic, and/or specialized co-processors (not shown).

Also included (not shown) is logic to manage spectrum allocation to the CBSDe devices across the three tiers of access (PAL, GAA, Incumbents).

The map and path loss processing module 1147 may be implemented as a separate co-processor or ASIC as shown, or alternatively as code executing on the CPU 1145. The map/path loss module 1147 utilizes path loss model data stored within the mass storage 1148 (or a network accessible storage device) to select and implement various path loss estimates as previously described herein. CPE (e.g., UE/FWA 314) data and CBSDe data, such as locations, number of sectors, azimuths of sectors, installed height, etc. may be maintained in the mass storage or network storage device(s) as well, so as to facilitate e.g., determination of spatial relations for the various components, and determination of path loss parameters for the various models. Cluster participation data may also be retained by the SASe, such as historical cluster membership, known "neighbors" for a given CBSDe, and the like.

In one variant the SASe includes data structures (such as LUTs with identities of CBSDe devices) which permit correlation of data such as location, CBSD/CBSDe ID, and other data. Transmit power and frequency band(s) assigned to each CBSDe may also be maintained in such structures, and dynamically modified as they change.

Figure 12:
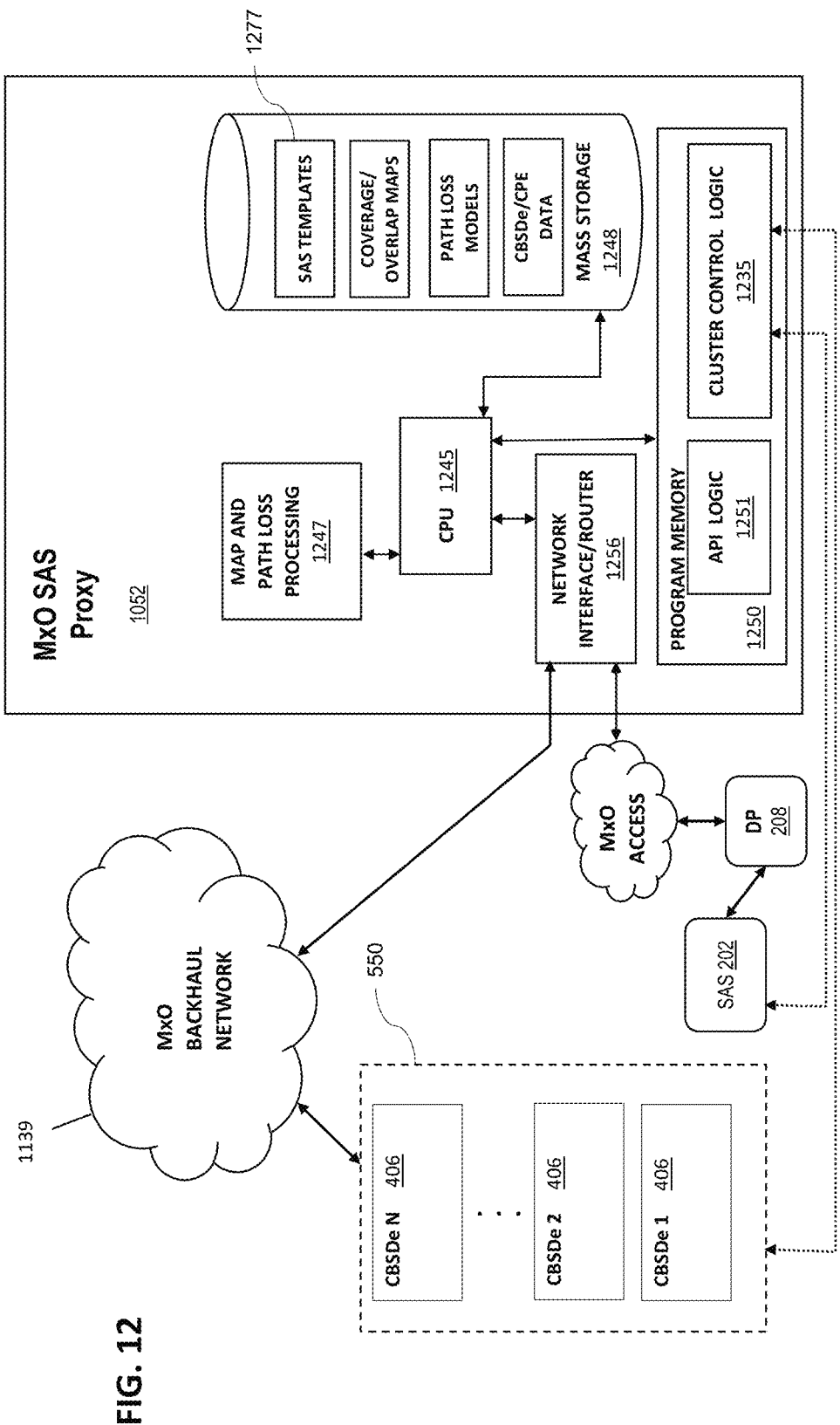
FIG. 12 is a block diagram illustrating one exemplary embodiment of MxO Proxy apparatus with cluster/interference management functionality according to the present disclosure.

FIG. 12 is a block diagram illustrating one exemplary embodiment of MxO Proxy apparatus with cluster/interference management functionality according to the present disclosure. In the illustrated variant, the Proxy device 1052 includes, a processor apparatus or subsystem 1245, a program memory module 1250, mass storage 1248 (e.g., HDD, SSD such as NAND-based flash memory, or other), cluster control logic 1235, map and path loss estimation processing module 1247, and network interfaces/router functionality 1256 for communication with e.g., the DP 208 (if any) and SAS 202 via the MSO access network 310, and with the CBSDe 406 via the MxO's backhaul network 1139.

As with the embodiment of FIG. 11, the processor 1245 may include one or more of a CPU (e.g., multi-core CPU), digital signal processor, RISC core, microprocessor, field-programmable gate array, GPU, and/or plurality of processing components mounted on one or more substrates. The processor may also comprise an internal cache memory, and is in communication with a memory subsystem 1250, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 1145.

The processor 1245 is configured to execute at least one computer program stored in memory 1250 (e.g., a non-transitory computer readable storage medium); in the illustrated embodiment, such programs include logic to implement the cluster control (formation, modification, teardown, etc.) functions, as well as API logic 1251 which enables external devices such as the CBSDe devices or SAS or DP to access data from the Proxy 1052 via application programming interface (API) calls. Other embodiments may implement such functionality within dedicated hardware, logic, and/or specialized co-processors (not shown).

The map and path loss processing module 1247, similar to that for FIG. 11, may be implemented as a separate co-processor or ASIC as shown, or alternatively as code executing on the CPU 1245. The map/path loss module 1247 utilizes path loss model data stored within the mass storage 1248 (or a network accessible storage device) to select and implement various path loss estimates as previously described herein. CPE (e.g., UE/FWA 314) data and CBSDe data, such as locations, number of sectors, azimuths of sectors, installed height, etc. may be maintained in the mass storage or network storage device(s) as well, so as to facilitate e.g., determination of spatial relations for the various components, and determination of path loss parameters for the various models. Cluster participation data may also be retained by the Proxy 1052, such as historical cluster membership, known "neighbors" for a given CBSDe, and the like. Advantageously, the MxO may have a wealth of data regarding individual CBSDe devices, as well as UE/FWAs operating within its network, and as such may be best situated to accurately model path loss, SINR values, etc. Moreover, the Proxy 1052 may be configured to make expanded use of UE/FWA devices for collection of PCI, SINR, or other types of data so that it can build extensive detailed coverage and heat maps.

As shown, the mass storage device 1248 may also include one or more SAS request "templates" 1277 which can be used for communication with the SAS. In one variant, the SAS 202 is effectively a COTS/prior art SAS (i.e., unenhanced), and as such is restricted in the types and content of data which it may receive, the processing it may perform, and the output it may provide. Hence, the Proxy 1052 may be configured to package its communications with the SAS 202 in proper/extant protocols and formats using the templates 1277, thereby maintaining compatibility between the SAS and the Proxy 1052. For instance, the Proxy 1052 may parse or disassemble more complex cluster-related data or requests into individual components which can be processed by the SAS, including via the sequential or incremental "negotiation" protocols referenced above.

CBSDe Apparatus

Figure 13:
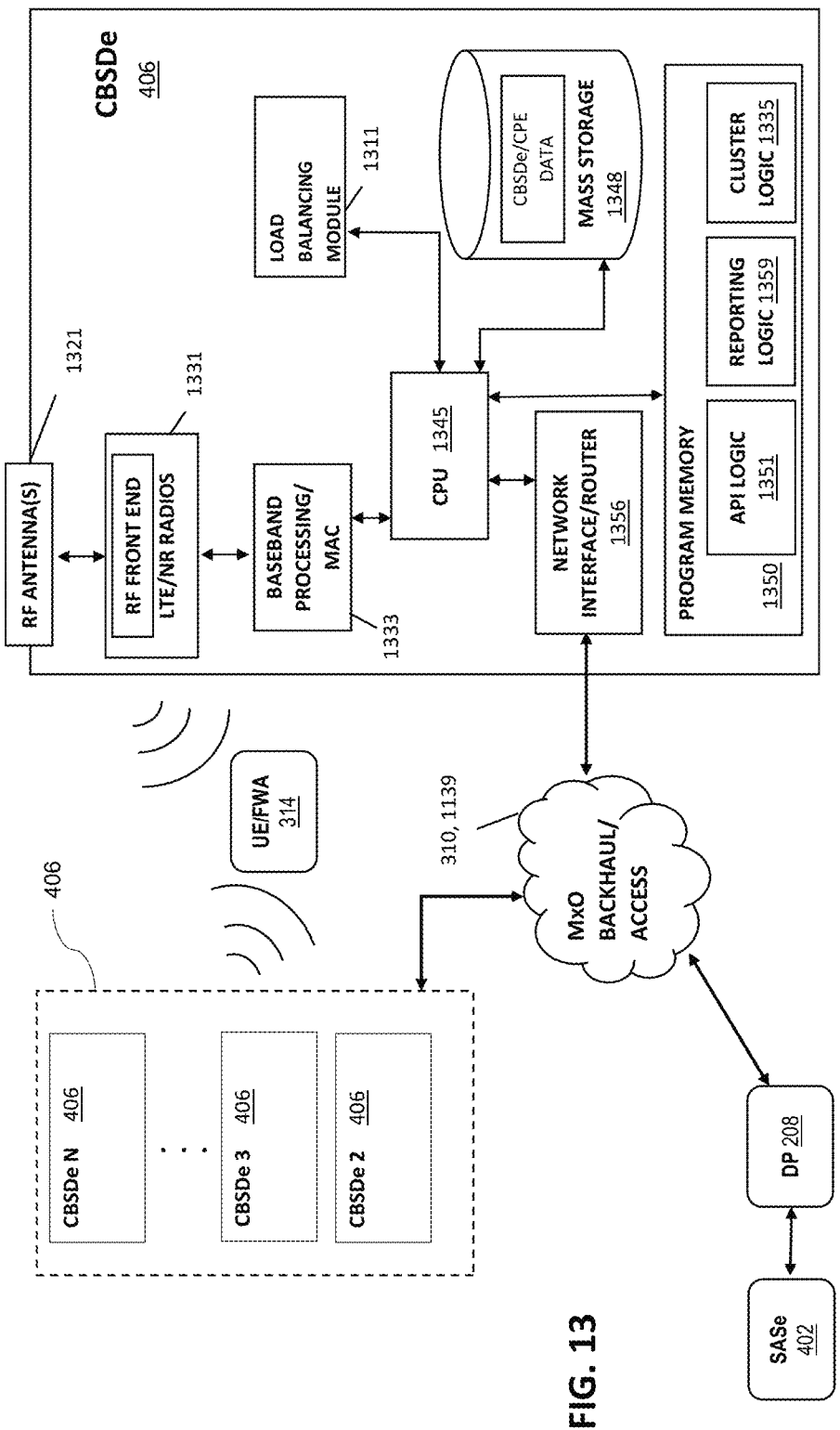
FIG. 13 is a block diagram illustrating one exemplary embodiment of CBSDe apparatus with traffic load balancing functionality according to the present disclosure.

FIG. 13 is a block diagram illustrating one exemplary embodiment of CBSDe apparatus with traffic load balancing functionality according to the present disclosure.

As shown, the CBSDe 406 includes, inter alia, a processor apparatus or subsystem 1345, a program memory module 1350, mass storage 1348 (e.g., HDD, SSD such as NAND-based flash memory, or other), baseband processor/MAC 1333, one or more network interfaces 1356, as well as one or more radio frequency (RF) devices (e.g., LTE or 5G NR radios) 1331 having, inter alia, antenna(e) 1321 and one or more RF front end modules for e.g., DAC/ADC, downconversion/upconversion/mixer functions, etc. Also included is a load balancing logic module 1311 which implements load balancing functions for the CBSDe. The radios 1331 may utilize for example OFDM-based modulation consistent with 3GPP protocols.

At a high level, the CBSDe maintains in effect two "stacks"; (i) a CBRS-compliant stack for communication of the CBSDe (acting as a CBRS-compliant entity) with other CBRS entities such as SASe/DP, according to e.g., the Signaling Protocols and Procedures for Citizens Broadband Radio Service (CBRS): Spectrum Access System (SAS)—Citizens Broadband Radio Service Device (CBSD) Interface Technical Specification—Document WINNF-TS-0016, Version V1.2.1. 3, January 2018, incorporated herein by reference in its entirety; and (ii) a 3GPP-coompliant LTE/LTE-A/5G NR "stack" for CBSDe (acting as a EUTRAN eNB or gNB) communications with 3GPP-compliant UEs (mobile devices or FWA 314—see FIG. 4). These two stacks are implemented and controlled via the logic of the CBSDe 406 such that CBSDe-to-SASe communication protocols and CBSDe-to-UE protocols are used in a coordinated fashion to enhance session continuity and perform the information reporting, channel grant, and load-balancing transfer functions as previously described.

The load balancing module 1311 (here, implemented as a separate ASIC or processor) manages the load balancing between different CBSDe 406. For example, in one embodiment, the LB module 1311 is configured to evaluate loading on the CBSDe 406 from e.g., UE/FWA 314, and determine situations where load balancing may be appropriate. Such situations may be e.g., where data throughput associated with a particular sector is approaching or at capacity, when the backhaul is depleted (e.g., high packet latency on a DOCSIS backhaul), or other such conditions exist. In such cases, the LB logic 1311 may generate a message or request to another CBSDe (e.g., via the X2 interface) to transfer load, such as by moving one or more served UE/FWA to the target CBSDe on another frequency band. In that load balancing may be best served via a network-wide view of all CBSDe devices, the LB module 1311 may also be communicative with a network-based LB logic module 1477 (see FIG. 14) which can (i) receive data from the CBSDe and other CBSDe devices relating to traffic throughput or data rate in UL/DL, load, latency, or other metrics of potential use, and (ii) process the data and generate load balancing recommendations or commands to be implemented by individual ones of the CBSDe devices. In this fashion, more coordinated or orchestrated load balancing within the broader network may be implemented, and individual CBSDe devices will not create "tail chasing" or "ripple" scenarios, such as where individual CBSDe devices transfer load, only to have the recipient CBSDe become overloaded eventually, and require another transfer to another CBSDe, and so forth, thereby reducing network load placement stability. Moreover, the network LB logic process may also have connectivity to the cluster logic 1335 for each CBSDe, such that it can make load balancing decisions based on cluster membership and availability of overlap between certain cells.

The CBSDe 406 of FIG. 13 also includes reporting logic 1359 whereby the detected or measured interfering CBSDe PCIs can be obtained from the UE/FWA 314 and reported to the SASe 402. Data reporting to/from other CBSDe devices 406 via the X2 interface may also be controlled by this logic 1359

The RF antenna(s) 1321 are configured to detect and transceive signals from radio access technologies (RATs) in the service area or venue with which the CBSDe is associated. For example, LTE (including, e.g., LTE, LTE-A, LTE-U, LTE-LAA) signals may be used as the basis of communication between the CBSDe 406 and the various mobile devices (e.g., UEs) and/or FWA devices. The antenna(s) 1321 may include multiple spatially diverse individual elements in e.g., a MIMO- or MISO-type configuration, such that spatial diversity of the transceived signals can be utilized, and likewise may be sectorized (e.g., wherein each of a plurality of elements only covers a prescribed azimuth or sector, as described with respect to FIG. 5H).

In the exemplary embodiment, the radio interface(s) 1331 comprise one or more LTE/5G-based radios compliant with 3GPP. Additional unlicensed, licensed, or quasi-licensed air interfaces may also be used within the CBSDe, including e.g., Wi-Fi, non-CBRS band LTE, 5G NR mmWave, or others. Moreover, the LTE radio functionality may be extended to incipient 3GPP-based 5G NR protocols; e.g., at maturation of LTE deployment and when 5G NR-enabled handsets are fielded, such adaptation being accomplished by those of ordinary skill given the contents of the present disclosure.

As a brief aside, NG-RAN or "NextGen RAN (Radio Area Network)" is part of the 3GPP "5G" next generation radio system. 3GPP is currently specifying Release 17 NG-RAN, its components, and interactions among the involved nodes including so-called "gNBs" (next generation Node B's or eNBs). NG-RAN will provide very high-bandwidth, very low-latency (e.g., on the order of 1 ms or less "round trip") wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

As such, the various aspects of the present disclosure can be readily adapted for use within the 5G NR context, including use of a CBSDe/gNB, and associated CU/DU functionality and "splits" to implement the cluster management and load balancing functions described herein. For instance, in one variant, the DU devices of a given CBSDe ("gNBe") may be individually managed as cluster participants, such as where a DU from one gNBe and a proximate DU from another gNBe are grouped into a common cluster and managed as such, even though their respective CUs may not be proximate to one another. Similarly, where a given gNBe has multiple DU (e.g., say ten), the individual DU can be clustered in subsets (and with DU of other gNBe) such that intra-gNBe clustering, overlap management, and load balancing can be performed.

Moreover, individual sectors of individual DU (each sector with its own PCI) can be grouped within clusters as previously described, and hence in some variants sectors of the same DU may be part of respective different VCs.

The RF radios 1331 in one embodiment comprises a digitally controlled RF tuner capable of reception of signals via the RF front end (receive chain) of the RF radio(s) in the aforementioned bands, including in one variant simultaneous reception of CBRS and non-CBRS bands (e.g., both 2.300 to 2.500 and 3.550 to 3.700 GHz bands at the same time).

Service Provider Network

Figure 14:
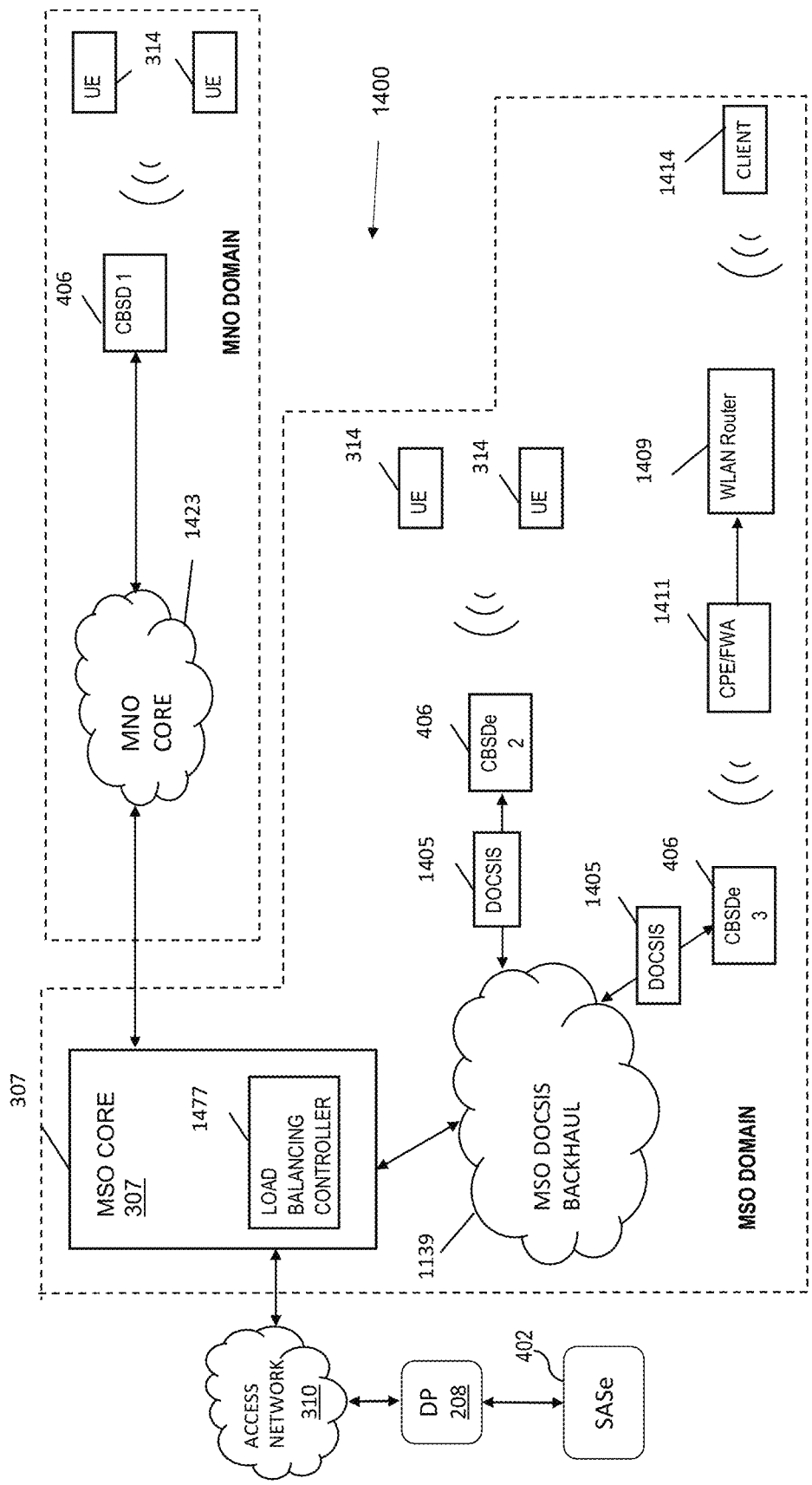
FIG. 14 is another functional block diagram of an exemplary MSO and MNO network architecture useful in conjunction with various principles described herein.

FIG. 14 is another functional block diagram of an exemplary MSO and MNO network architecture useful in conjunction with various principles described herein. In the illustrated embodiment, the service provider network architecture 1400 includes the enhanced CBSDe 406, and supports SASe 402 operation. It will be appreciated that while described with respect to such network configuration, the methods and apparatus described herein may readily be used with other network types and topologies, whether wired or wireless, managed or unmanaged.

The exemplary service provider network 1400 is used in the embodiment of FIG. 14 to provide backbone and Internet access from the service provider's wireless access nodes (e.g., CBSDe devices which backhaul Wi-Fi APs or other equipment operated or maintained by the MSO via FWA devices), and one or more stand-alone or embedded DOCSIS-compliant cable modems (CMs) 1405 in data communication therewith.

The individual CBSDe devices 406 are backhauled by the CMs 1405 to the MSO core 307, and the MSO core 307 includes at least some of the EPC/5GC core functions. Each of the CPE/FWA 1411 and UE 314 are communicative with their respective CBSDe devices 406 via CBRS wireless links. Client devices 1414 such as tablets, smartphones, SmartTVs, etc. at each premises are served by respective WLAN routers 1409, the latter which are backhauled to the MSO core or backbone via their respective CPE/FWA 1411.

In addition, some of the individual CBSDe devices 406 are backhauled by the MNO core 1423, and the MNO core includes at least some of the EPC/5GC core functions as well. Each of UE 314 are communicative with their respective CBSDe's 406. In one such scenario, UE users are customers of the MSO (e.g., subscribers), and the MSO and MNO have a contractual relationship to provide services to MSO subscribers when they are out of coverage areas maintained by the MSO (e.g., "out of network" for CBRS coverage, or roaming).

The approach of FIG. 14 has the advantage of, inter alfa, giving the MSO complete control over the service provider chain, including control over the xNBe devices so as to optimize service to its specific customers (versus the non-MSO customer-specific service that may be provided by an MNO), and the ability to construct its architecture to optimize incipient 5G NR functions such as network slicing, gNB DU/CU Option "splits", etc., as well as freedom for placement of CBSDe devices in "hotspot" locations as previously described (versus cellular-based planning which may have been used when placing the MNO CBSD (CBSD 1), which may be doubling as or co-located with a cellular eNB or gNB using licensed or other spectrum).

It will be recognized that while certain aspects of the disclosure are described in terms of a specific sequence of step s of a method, these descriptions are only illustrative of the broader methods of the disclosure, and may be modified as required by the particular application. Certain step s may be rendered unnecessary or optional under certain circumstances. Additionally, certain step s or functionality may be added to the disclosed embodiments, or the order of performance of two or more step s permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain step s and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain step s/processes simply cannot be performed by a human being in any viable fashion).

What is claimed is:

1. Computer readable apparatus comprising a non-transitory storage medium, the non-transitory storage medium comprising at least one computer program having a plurality of instructions, the plurality of instructions configured to, when executed on a processing apparatus, cause a computerized base station management apparatus to:

receive data relating to a location of a base station apparatus, the base station apparatus being one of a subset of a plurality of base station apparatus of a wireless network;

identify a radio frequency (RF) interference condition associated with at least one of the subset of the plurality of base station apparatus; and transmit data relating to one of increasing or decreasing a transmission power of the base station apparatus, the data relating to the one of the increasing or the decreasing (i) derived based at least on the identified RF interference condition and the data relating to the location, and (ii) configured to cause adjustment of the transmission power of the base station apparatus;

wherein the one of increasing or decreasing is part of a load balancing process conducted between two frequency bands each between 3.550 GHz and 3.700 Ghz, the two frequency bands assigned to respective ones of the subset of the plurality of base station apparatus participating in the load balancing process.

2. The computer readable apparatus of claim 1, wherein the plurality of instructions are further configured to, when executed on the processing apparatus, cause the computerized base station management apparatus to:

transmit data indicating that the base station apparatus must participate in the load balancing process controlled by the wireless network.

3. The computer readable apparatus of claim 1, wherein:

the base station apparatus comprises a base station disposed on an edge of a virtual cluster formed by the computerized base station management apparatus; and the transmission of the data relating to the one of the increasing or the decreasing of the transmission power of the base station apparatus, comprises transmission of data relating to a decreasing of the transmission power to reduce interference with another base station apparatus disposed within a second virtual cluster.

4. The computer readable apparatus of claim 1, wherein:

the base station apparatus comprises a base station disposed on a non-edge portion of a virtual cluster formed by the computerized base station management apparatus; and the transmission of the data relating to the one of the increasing or the decreasing of the transmission power of the base station apparatus, comprises transmission of data relating to an increasing of the transmission power to compensate for at least some of a loss of coverage area within the virtual cluster based on a transmission power reduction of another base station apparatus within the virtual cluster.

5. The computer readable apparatus of claim 1, wherein the plurality of instructions are further configured to, when executed on the processing apparatus, cause the computerized base station management apparatus to:

receive, from the base station apparatus, identifying data associated with one or more base station apparatus;

determine, based at least on the identifying data and the data relating to the location, that the one or more base station apparatus is geographically proximate to the base station apparatus; and based at least one the identifying data, transmit, to the base station apparatus, data indicative of one or more respective network addresses of one or more base station apparatus to enable the base station apparatus to establish data communication with the one or more base station apparatus.

6. The computer readable apparatus of claim 5, wherein:

the identifying data comprises one or more respective PCI (physical cell identifier) values associated with the one or more base station apparatus;

the data indicative of the one or more respective network addresses comprises one or more respective IP (Internet Protocol) addresses associated with the one or more base station apparatus; and the enablement of the base station apparatus to establish the data communication with the one or more base station apparatus comprises enablement of the base station apparatus to establish an 3GPP (Third Generation Partnership Project) X2 connection with the one or more base station apparatus.

7. The computer readable apparatus of claim 1, wherein the plurality of instructions are further configured to, when executed on the processing apparatus, cause the computerized apparatus to:

estimate a level of interference created from the subset of a plurality of base station apparatus, the estimation comprising an estimation of a level of interference at one or more clusters edges by at least a selection of an interference model fitted to wireless channel propagation; and compute an interference power from the selected interference model, the interference power caused by base station apparatus disposed at the one or more cluster edges and affecting one or more neighboring clusters that neighbor the one or more cluster edges;

wherein the load balancing process is implemented to mitigate the affecting of the interference power from the base station apparatus disposed at the one or more cluster edges on the one or more neighboring clusters.

8. The computer readable apparatus of claim 1, wherein the plurality of instructions are further configured to, when executed on the processing apparatus, cause the computerized base station management apparatus to:

receive one or more respective PCI (physical cell identifier) values associated with one or more base station apparatus of the subset of the plurality of base station apparatus; and based on the one or more respective PCI values, perform one of (i) a creation of, or (ii) an update to, a network overlap map associated with the subset of the plurality of base station apparatus.

9. The computer readable apparatus of claim 1, wherein:

the receipt of the data relating to the location of the base station apparatus comprises receipt of data indicative of a longitude and a latitude of the base station apparatus; and the plurality of instructions are further configured to, when executed on the processing apparatus, cause the computerized base station management apparatus to:

based on the data indicative of the longitude and the latitude, determine that the base station apparatus has been one of (i) installed or (i) moved; and update a location information database associated with the subset of the plurality of base station apparatus.

10. The computer readable apparatus of claim 1, wherein the plurality of instructions are further configured to, when executed on the processing apparatus, cause the computerized base station management apparatus to:
  form a virtual cluster of individual ones of plurality of base station apparatus, the formation of the virtual cluster comprising:
    a determination an optimum number of base station apparatus within one or more virtual clusters;
    an evaluation of data relating to potential benefits and detriments associated with at least one of (i) a sizes or (ii) a shape with respect to each of a plurality of virtual clusters, the data relating to the potential benefits and the detriments comprising data indicative of at least one of (i) effects on or (ii) interactions with other virtual clusters of the plurality of virtual clusters; and
    based on the evaluation of the data relating to the potential benefits and the detriments, select at least one of (i) an optimized size or (ii) optimized shape for the virtual cluster.

11. A computerized method of operating a wireless network having a plurality of Citizens Broadband Radio Service Devices (CBSDs), the computerized method comprising:
  determining locations for each of a subset of the plurality of CBSDs, the subset forming a shape having an outer boundary;
  identifying a radio frequency (RF) interference condition associated with at least one CBSD of the subset of the plurality of CBSDs, the at least one CBSD having a coverage area which intersects the outer boundary;
  reducing a transmission power associated with at least part of the at least one CBSD; and
  increasing a transmission power of at least part of another one of the subset of the plurality of CBSDs to compensate for a loss of coverage area resulting from the reducing, the another one of the subset of CBSDs having a coverage area which does not intersect the outer boundary;
  wherein the reducing and the increasing are performed so as to maintain an overlap of respective coverage areas of at least two of the subset of the plurality of CBSDs so as to enable inter-CBSD load balancing.

12. The computerized method of claim 11, wherein the inter-CBSD load balancing comprises load balancing between two CBRS (Citizens Broadband Radios Service) frequency bands assigned to respective ones of two CBSDs participating in the inter-CBSD load balancing.

13. The computerized method of claim 11, wherein the determining of the locations for each of the subset of the plurality of CBSDs comprises:
  determining a location for at least one CBSD of the subset;
  identifying at least one other CBSD of the plurality of CBSDs that is know to be geographically proximate to the at least one CBSD of the subset; and
  forming a virtual grouping comprising (i) the at least one CBSD, and (ii) the at least one other CBSD.

14. The computerized method of claim 13, wherein the forming of the virtual grouping comprising (i) the at least one CBSD, and (ii) the at least one other CBSD comprises forming the virtual grouping comprising only a subset of a plurality of radio frequency sectors of the one of (i) the at least one CBSD, or (ii) the at least one other CBSD.

15. The computerized method of claim 11, wherein the identifying of the radio frequency (RF) interference condition associated with the at least one of the subset of the plurality of CBSDs comprises performing computer modeling using one or more path loss or propagation models, the computer modeling based at least on the determined locations.

16. The computerized method of claim 11, wherein:
  the reducing the transmission power associated with the at least part of the at least one CB SD comprises reducing a transmission power for only a subset of a plurality of individual sectors of the at least one CBSD; and
  the increasing the transmission power of at least a portion of another of the subset of the plurality of CBSDs, comprises increasing a transmission power for only a subset of a plurality of individual sectors of another CBSD.

17. Computerized network apparatus configured for operation in a wireless network, the computerized network apparatus comprising:
  processor apparatus;
  network interface apparatus in data communication with the processor apparatus; and
  storage apparatus in data communication with the processor apparatus, the storage apparatus comprising at least one computer program configured to, when executed on the processor apparatus, cause the computerized network apparatus to:
    receive data representative indicative of participation by a plurality of wireless access point apparatus in a load balancing process;
    determine membership of each of the plurality of wireless access point apparatus within a prescribed subset, the prescribed subset having known location data related thereto;
    identify a radio frequency (RF) interference condition associated with at least one wireless access point apparatus of the plurality of wireless access point apparatus;
    cause reduction of a transmission power associated with the at least one wireless access point apparatus; and
    cause increase of a transmission power of at least one other wireless access point apparatus of the plurality of wireless access point apparatus to at least partly compensate for a loss of coverage area resulting from the reduction;
  wherein:
    the load balancing process comprises load balancing between two frequency bands each between 3.550 GHz and 3.700 Ghz, the two frequency bands assigned to respective ones of two wireless access point apparatus participating in the load balancing process.

18. The computerized network apparatus of claim 17, wherein the at least one computer program is further configured to, when executed on the processor apparatus, cause the computerized network apparatus to:
  obtain reporting data relating to at least a portion of the plurality of wireless access point apparatus; and
  based at least on the reporting data, create one or more virtual groupings or clusters of wireless access point apparatus within the wireless network, the one or more virtual groupings or clusters comprising the prescribed subset and enabling performance of the load balancing process.

19. The computerized network apparatus of claim 18, wherein the reporting data comprises at least one of (i) a PCI (physical cell identifier), or (ii) transmit power, associated with an individual one of a plurality of sectors of the at least one other wireless access point apparatus of the plurality of wireless access point apparatus.

20. The computerized network apparatus of claim 17, wherein the computerized network apparatus comprises one of: (i) a computerized network spectrum allocation process in data communication with the wireless network, or (ii) a computerized spectrum allocation proxy entity within the wireless network.

21. The computerized network apparatus of claim 20, wherein:
- the computerized network apparatus comprises the computerized spectrum allocation proxy entity within the wireless network; and
- the computerized spectrum allocation proxy entity, the at least one wireless access point apparatus, and the at least one other wireless access point apparatus are each operated by a common managed network operator.

22. The computerized network apparatus of claim 17, wherein the wireless network comprises a wireless network utilizing at least one of 3GPP (Third Generation Partnership Project) 4G (fourth Generation) Long Term Evolution or 5G (Fifth Generation) New Radio compliant infrastructure, and the computerized network apparatus comprises a Citizens Broadband Radio Service (CBRS) SAS (Spectrum Allocation System).

* * * * *